(12) United States Patent
Sakakibara et al.

(10) Patent No.: US 11,756,082 B2
(45) Date of Patent: Sep. 12, 2023

(54) CONTENT ARRANGEMENT PROGRAM, CONTENT ARRANGEMENT DEVICE, AND CONTENT ARRANGEMENT METHOD, WEBSITE CONSTRUCTION SUPPORT PROGRAM, WEBSITE CONSTRUCTION SUPPORT DEVICE, AND WEBSITE CONSTRUCTION SUPPORT METHOD, AND ECONOMIC SCALE OUTPUT PROGRAM, ECONOMIC SCALE OUTPUT DEVICE, AND ECONOMIC SCALE OUTPUT METHOD

(71) Applicant: Datascientist Inc., Tokyo (JP)

(72) Inventors: Naoya Sakakibara, Tokyo (JP); Yuki Hirobe, Tokyo (JP)

(73) Assignee: Datascientist Inc., Tokyo (JP)

( * ) Notice: Subject to any disclaimer, the term of this patent is extended or adjusted under 35 U.S.C. 154(b) by 0 days.

(21) Appl. No.: 17/638,616

(22) PCT Filed: Aug. 28, 2020

(86) PCT No.: PCT/JP2020/032707
§ 371 (c)(1),
(2) Date: Feb. 25, 2022

(87) PCT Pub. No.: WO2021/040003
PCT Pub. Date: Mar. 4, 2021

(65) Prior Publication Data
US 2022/0318854 A1 Oct. 6, 2022

(30) Foreign Application Priority Data

Aug. 30, 2019 (JP) ................ 2019-158706
Feb. 25, 2020 (JP) ................ 2020-028994
Jun. 3, 2020 (JP) ................ 2020-096678

(51) Int. Cl.
*G06Q 30/02* (2023.01)
*G06Q 30/0273* (2023.01)
*G06Q 30/0201* (2023.01)

(52) U.S. Cl.
CPC ..... *G06Q 30/0273* (2013.01); *G06Q 30/0206* (2013.01)

(58) Field of Classification Search
CPC .......... G06Q 30/0273; G06Q 30/0206; G06Q 30/02; G06Q 30/0254; G06Q 10/067; G06Q 30/0246; G06Q 30/0207
See application file for complete search history.

(56) References Cited

U.S. PATENT DOCUMENTS

2007/0100789 A1   5/2007  Malhotra et al.
2012/0191684 A1*  7/2012  Epstein ............. G06F 16/951
                                                707/706
(Continued)

FOREIGN PATENT DOCUMENTS

CN      1996280 A  *  7/2007  ............. G06F 17/30
CN   100478962 C  *  4/2009  ............. G06F 17/30
(Continued)

OTHER PUBLICATIONS

J. B. Killoran, How to Use Search Engine Optimization Techniques to Increase Website Visibility (English), IEEE Transactions on Professional Communication(vol. 56, Issue: 1, pp. 50-66), Mar. 11, 2013 (Year: 2013).*

(Continued)

*Primary Examiner* — Marilyn G Macasiano
(74) *Attorney, Agent, or Firm* — Studebaker & Brackett PC

(57) ABSTRACT

Provided is a content arrangement method, a website construction support method, and a website construction support method that automatically perform determination of a (Continued)

webpage that should be included, a content that should be included in each webpage, and a related webpage as a target of a hyperlink that should be included in each content, and support a work thereof by utilizing a search trend.

22 Claims, 67 Drawing Sheets

(56) References Cited

U.S. PATENT DOCUMENTS

| | | | | |
|---|---|---|---|---|
| 2014/0108436 A1* | 4/2014 | Vishria | ............... | G06F 16/9535 707/769 |
| 2015/0324468 A1* | 11/2015 | Okamoto | ............ | G06F 16/9535 707/706 |
| 2016/0148264 A1* | 5/2016 | Winstanley | ......... | G06F 16/9535 705/14.55 |
| 2018/0314762 A1* | 11/2018 | Rathod | ................. | G06F 16/951 |

FOREIGN PATENT DOCUMENTS

| | | | |
|---|---|---|---|
| CN | 101520785 B | * 9/2012 | ............. G06F 17/30 |
| JP | 2002-334107 A | 11/2002 | |
| JP | 2007-080061 A | 3/2007 | |
| JP | 2007-220058 A | 8/2007 | |
| JP | 2008-027207 A | 2/2008 | |
| JP | 2008-083803 A | 4/2008 | |
| JP | 2008-158893 A | 7/2008 | |
| JP | 2008-257659 A | 10/2008 | |
| JP | 2008-262339 A | 10/2008 | |
| JP | 2009-086786 A | 4/2009 | |
| JP | 2009-514102 A | 4/2009 | |
| JP | 2010-170436 A | 8/2010 | |
| JP | 2013-020461 A | 1/2013 | |
| JP | 2013-131227 A | 7/2013 | |
| JP | 2015-215797 A | 12/2015 | |
| JP | 2019-128622 A | 8/2019 | |

OTHER PUBLICATIONS

Deepak Sharma; Meenakshi Bansal, Improving webpage visibility by enhancing massive semantic content using on-page optimization technique (English), 2016 International Conference on Communication and Electronic Systems (ICCES)) (pp. 1-6), Oct. 1, 2016 (Year: 2016).*

Ardi Dramilio; Calvin Faustine; Stephen Sanjaya; Benfano Soewito, The Effect and Techniqu in Search Engine Optimization (English), 2020 International Conference on Information Management and Technology (ICIMTech (pp. 348-353), Aug. 1, 2020 (Year: 202).*
"Decision to Grant a Patent" Office Action issued in JP 2021-543071; mailed by the Japanese Patent Office dated May 24, 2022.
"Notice of Reasons for Refusal" Office Action issued in JP 2021-543071; mailed by the Japanese Patent Office dated Mar. 15, 2022.
Toshiyuki Kurosu "'Keyword tool' training course to make internet business advantageous" WD Web Designing, Dec. 22, 2015 (accession date), vol. 16, No. 1, serial No. 174, pp. 064-069; with partial translation.
Takahiro Watanabe "How to find profitable keywords, SEM keyword excavation method" SEO SEM Technique, Nov. 1, 2007, ISBN978-4-7981-1263-3, 1st edition, vol. 3, pp. 110-125; with partial translation.
Shakuya T. et al., "Lesson33 [Examining Keywords] Identifying Necessary Keywords and Unnecessary Keywords", Textbook [of the easiest listing advertisement], first edition, Oct. 21, 2018, pp. 105-109, Impress Corporation, Japan.
Watanabe T., "Overture Sponsored Search VS Google Adwords", iNTERNET Magazine, No. 108, Jan. 1, 2004, pp. 106-113, Impress Corporation, Japan.
Abe M., "Be careful with summary sites", The tricks of Effective Marketing Tactics, reprint, Jul. 5, 2019, pp. 184-185, Kadokawa Corporation, Japan.
Masui T., "Use data to choose the best option", first edition, Jul. 8, 2016, pp. 125-156, Socym Co., Ltd., Japan.
Hayashi Y. et al., "Technological trends in search services on the WWW", Information processing, vol. 39, No. 9, Sep. 15, 1998, pp. 861-865, Information Processing Society of Japan.
An Office Action; "Notice of Reasons for Refusal," mailed by the Japanese Patent Office dated Oct. 4, 2022, which corresponds to Japanese Patent Application No. 2022-100305; with English language translation.
An Office Action; "Notice of Reasons for Refusal," mailed by the Japanese Patent Office dated Oct. 4, 2022, which corresponds to Japanese Patent Application No. 2022-100306; with English language translation.
International Search Report issued in PCT/JP2020/032707; dated Dec. 1, 2020.
Toshiyuki Kurosu, "'Keyword tool' training course to make internet business advantageous", WD Web Designing, Dec. 22, 2015 (accession date), vol. 16, No. 1, serial No. 174, pp. 064-069.
Takahiro Watanabe, "How to find profitable keywords, SEM keyword excavation method", SEO SEM Technique, Nov. 1, 2007, ISBN978-4-7981-1263-3, 1st edition, vol. 3, pp. 110-125.

* cited by examiner

FIG.2

| SEARCH QUERY | NUMBER OF SEARCHES | COST PER CLICK | COMPETITIVENESS |
|---|---|---|---|
| AUTOMOBILE | 10,000 | 5,000 | LOW |
| AUTOMOBILE INSURANCE | 4,000 | 20,000 | HIGH |
| AUTOMOBILE FUEL ECONOMY | 1,500 | 2,000 | LOW |
| AUTOMOBILE DRIVING SCHOOL | 800 | 8,000 | HIGH |
| BICYCLE | 2,000 | 3,000 | LOW |
| BICYCLE CYCLING COURSE | 500 | 500 | LOW |
| BICYCLE PARTS | 150 | 1,500 | MIDDLE |

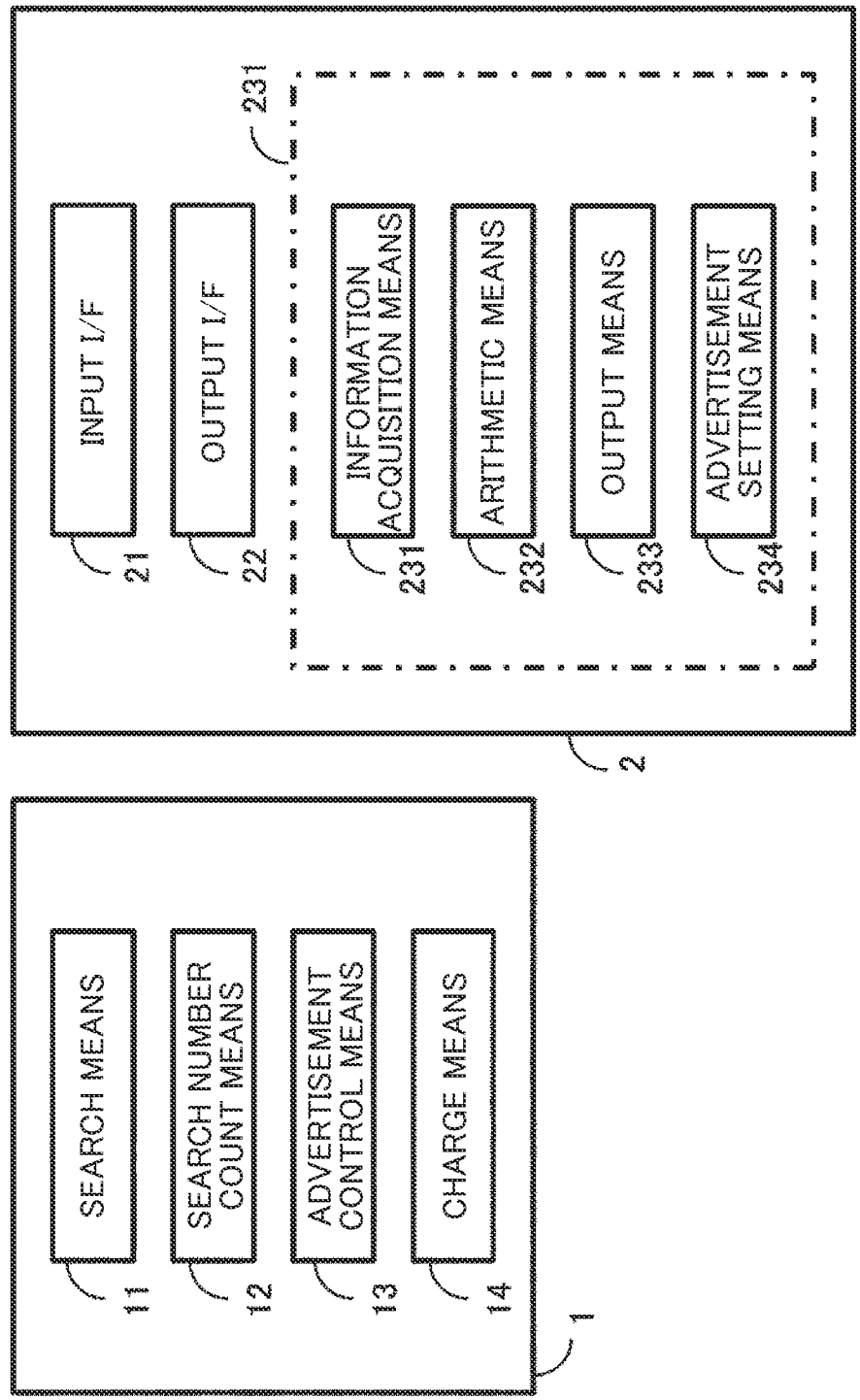

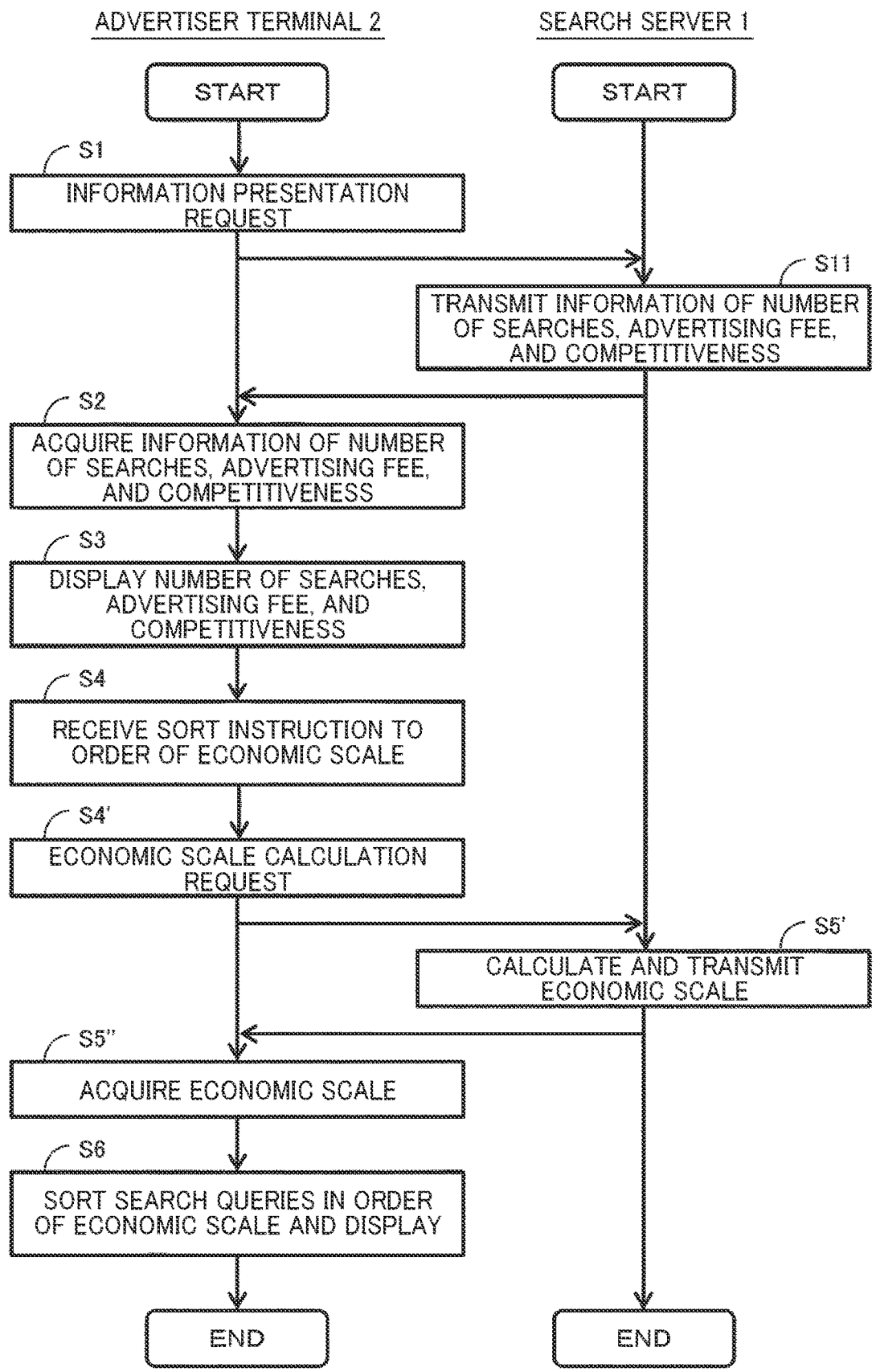

FIG.5A

| SEARCH QUERY | NUMBER OF SEARCHES | COST PER CLICK | COMPETITIVENESS |
|---|---|---|---|
| AUTOMOBILE | 10,000 | 5,000 | LOW |
| AUTOMOBILE INSURANCE | 4,000 | 20,000 | HIGH |
| AUTOMOBILE FUEL ECONOMY | 1,500 | 2,000 | LOW |
| AUTOMOBILE DRIVING SCHOOL | 800 | 8,000 | HIGH |
| BICYCLE | 2,000 | 3,000 | LOW |
| BICYCLE CYCLING COURSE | 500 | 500 | LOW |
| BICYCLE PARTS | 150 | 1,500 | MIDDLE |

SORT ~ 81

FIG.5B

| SEARCH QUERY | RANKING | NUMBER OF SEARCHES |
|---|---|---|
| AUTOMOBILE INSURANCE | FIRST | 4,000 |
| AUTOMOBILE | SECOND | 10,000 |
| AUTOMOBILE DRIVING SCHOOL | THIRD | 800 |
| BICYCLE | FOURTH | 2,000 |
| AUTOMOBILE FUEL ECONOMY | FIFTH | 1,500 |
| BICYCLE PARTS | SIXTH | 150 |
| BICYCLE CYCLING COURSE | SEVENTH | 500 |

FIG.7

| SEARCH QUERY GROUP | RANKING | NUMBER OF SEARCH QUERIES INCLUDED IN SEARCH QUERY GROUP | NUMBER OF SEARCHES |
|---|---|---|---|
| AUTOMOBILE | FIRST | 4 | 16,300 |
| BICYCLE | SECOND | 3 | 2,650 |

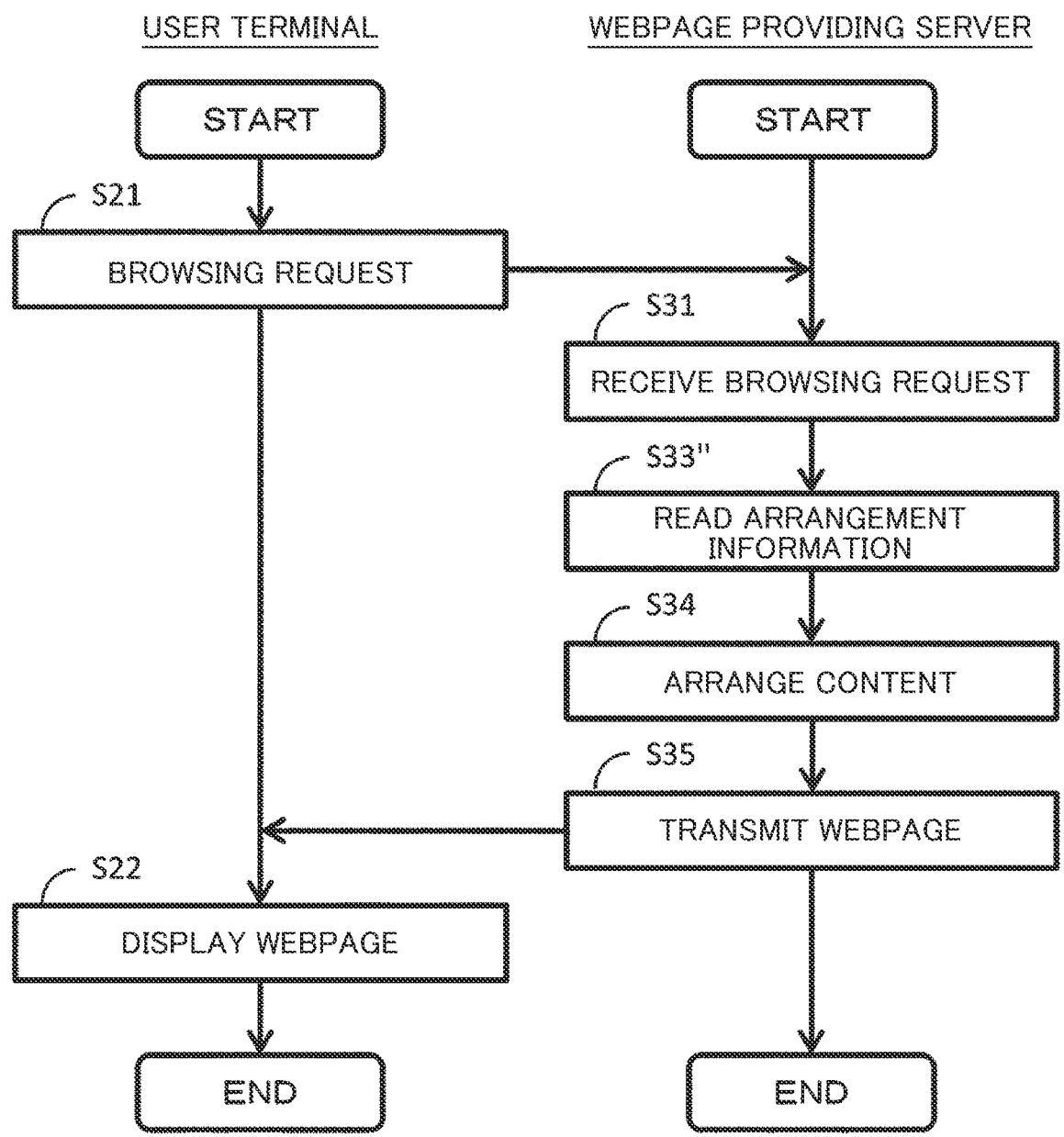

FIG.18

| SEARCH QUERY | NUMBER OF SEARCHES |
|---|---|
| B-Phone | 22,000 |
| B-Phone pro | 21,000 |
| B-Phone min | 20,000 |
| B-Phone min2 | 19,000 |
| B-Phone air | 18,000 |
| B-Phone pro 2018 | 17,000 |
| B-Phone PRICE | 16,000 |
| B-Phone CASE | 15,000 |
| B-Phone USED | 14,000 |
| B-Phone NEW MODEL | 13,000 |
| B-Phone min3 | 12,000 |

| SEARCH QUERY | NUMBER OF SEARCHES |
|---|---|
| B-Phone pro NEW MODEL | 11,000 |
| B-Phone min4 | 10,000 |
| B-Phone 2018 | 9,000 |
| B-Phone COVER | 8,000 |
| B-Phone pro PRICE | 7,000 |
| B-Phone pro INITIALIZATION | 6,000 |
| B-Phone pro USED | 5,000 |
| B-Phone pro KEYBOARD | 4,000 |
| B-Phone pro NEW MODEL PRICE | 3,000 |
| NEW MODEL B-Phone | 2,000 |
| B-Phone min PRICE | 1,000 |

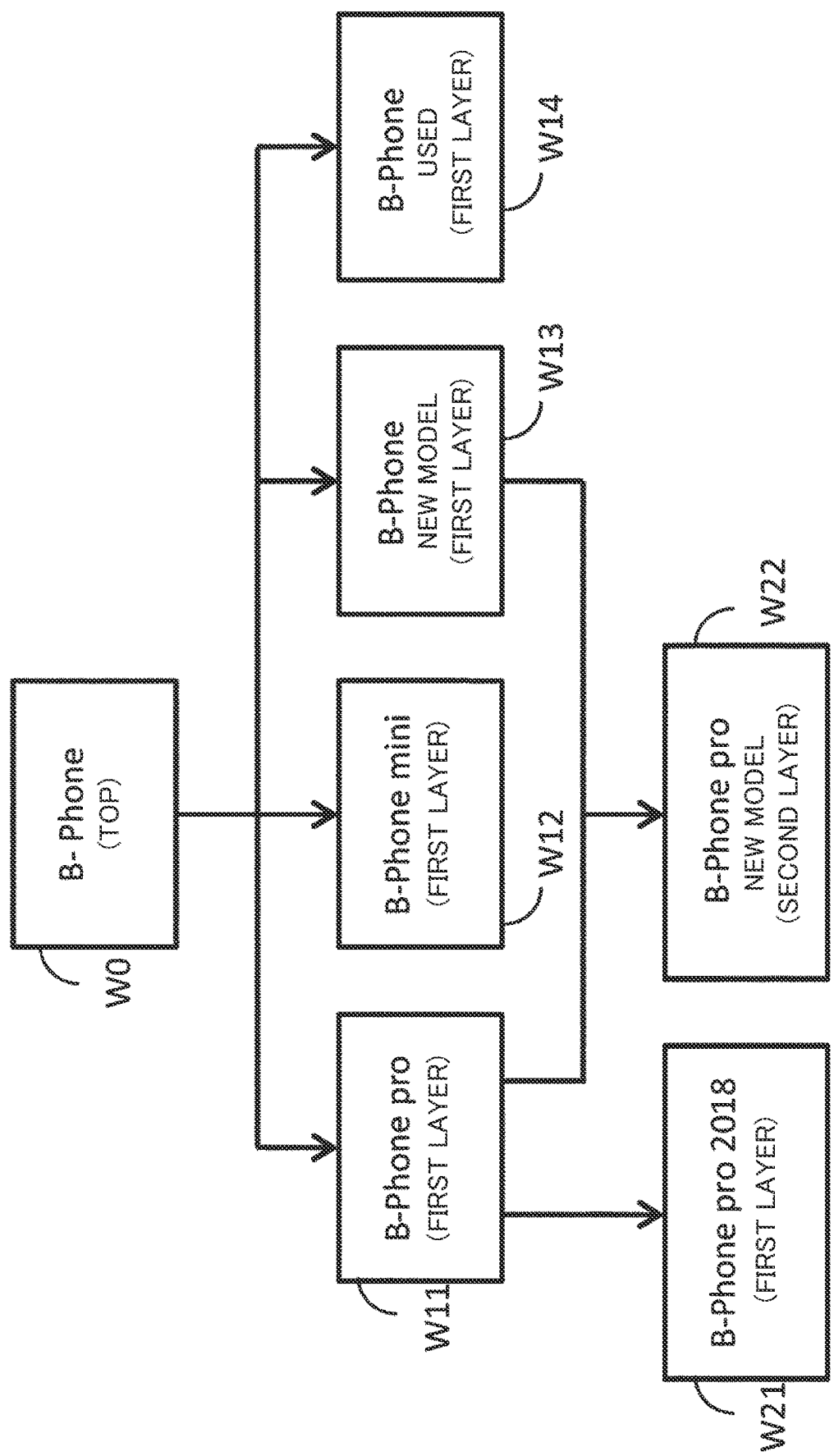

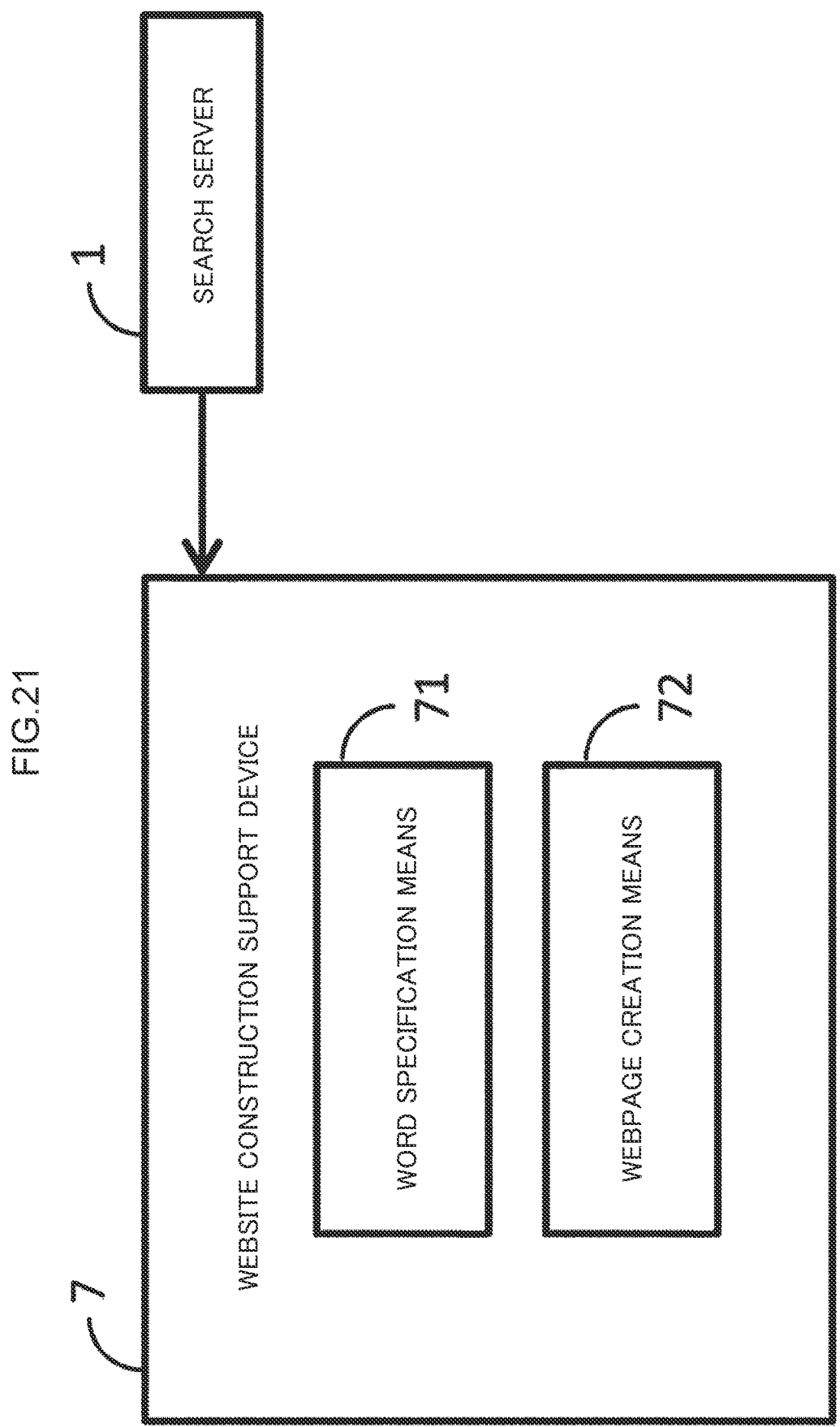

FIG.23A

URL: https://AAA.com/B-Phone

```
<html>
    <head>
        <title>B-Phone</title>
        <meta name="description" content = "pro, mini, NEW MODEL, USED>
        <meta name = "keyword" content ="B-Phone">
    </head>
    <Body>
        <div class="breadcrumbs">
            </ul>
                <li><a href="/">TOP </li>
                <li><a href="/B-Phone">B-Phone</li>
            </ul>
        </div>
        <h1>B-Phone</h1>
        <h2>pro</h2>
        <h3>pro, 2018</h3>
        <h3>pro, NEW MODEL </h3>
        <h2>mini</h2>
        <h2> NEW MODEL</h2>
        <h3> NEW MODEL, pro</h3>
        <h2> USED </h2>

</Body>
</html>
```

FIG.23B

URL: https://AAA.com/B-Phone/pro

```html
<html>
    <head>
        <titel>pro</title>
        <meta name="description" content = "2018, NEW MODEL">
        <meta name = "keyword" content ="pro">
    </head>
    <Body>
        <div class="breadcrumbs">
            </ul>
                <li><a href="/"> TOP </li>
                <li><a href="/B-Phone">B-Phone</li>
                <li><a href="/B-Phone/pro">pro</li>
            </ul>
        </div>
        <h1>pro</h1>
        <h2>2018</h2>
        <h2> NEW MODEL </h2>
    </Body>
</html>
```

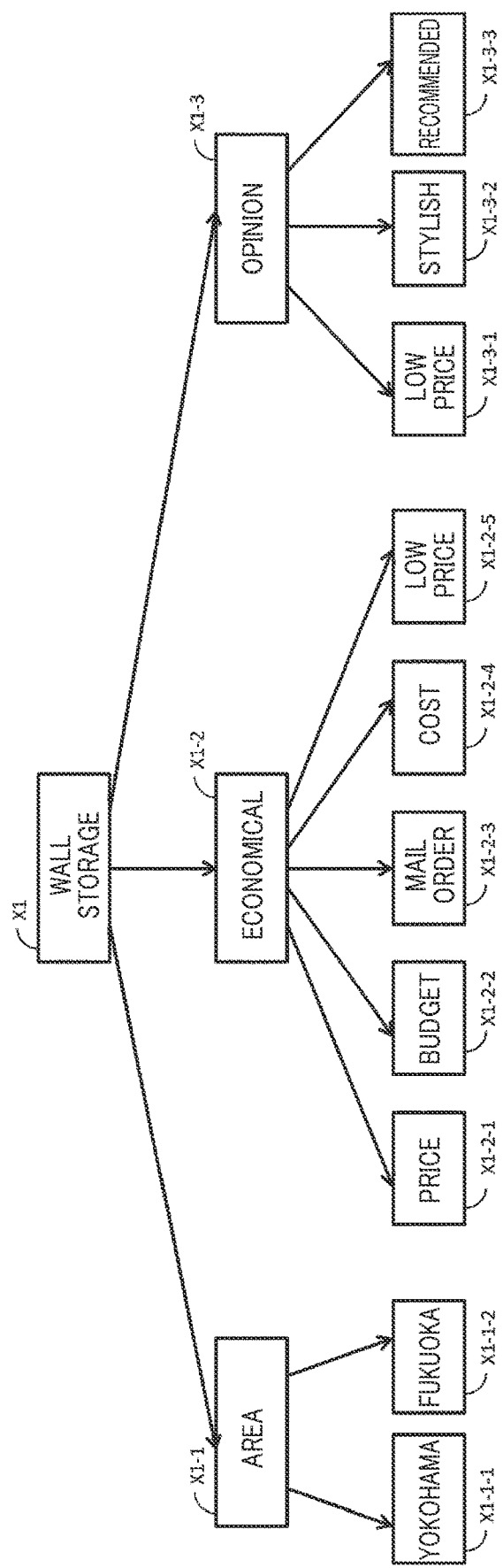

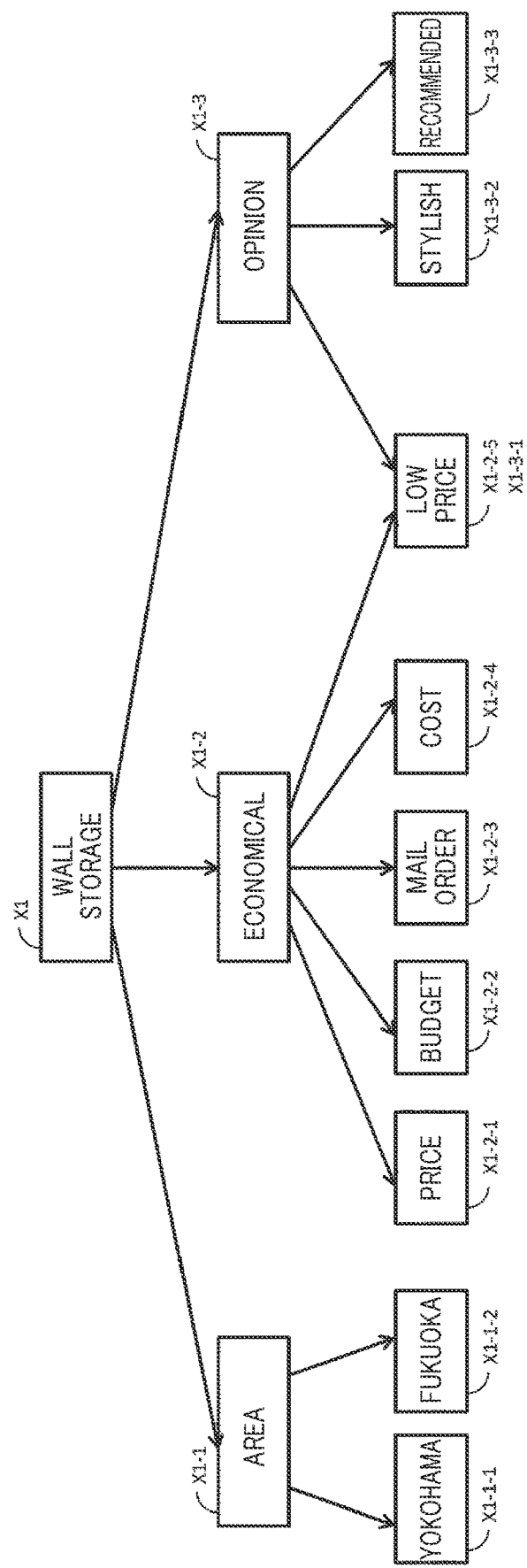

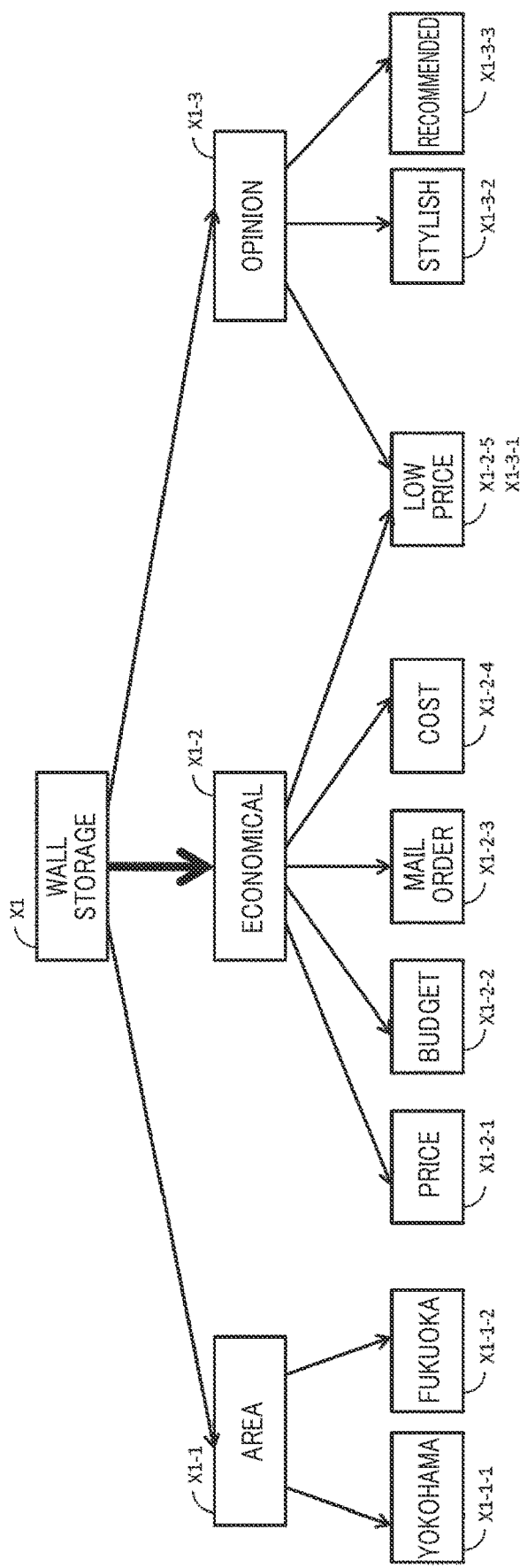

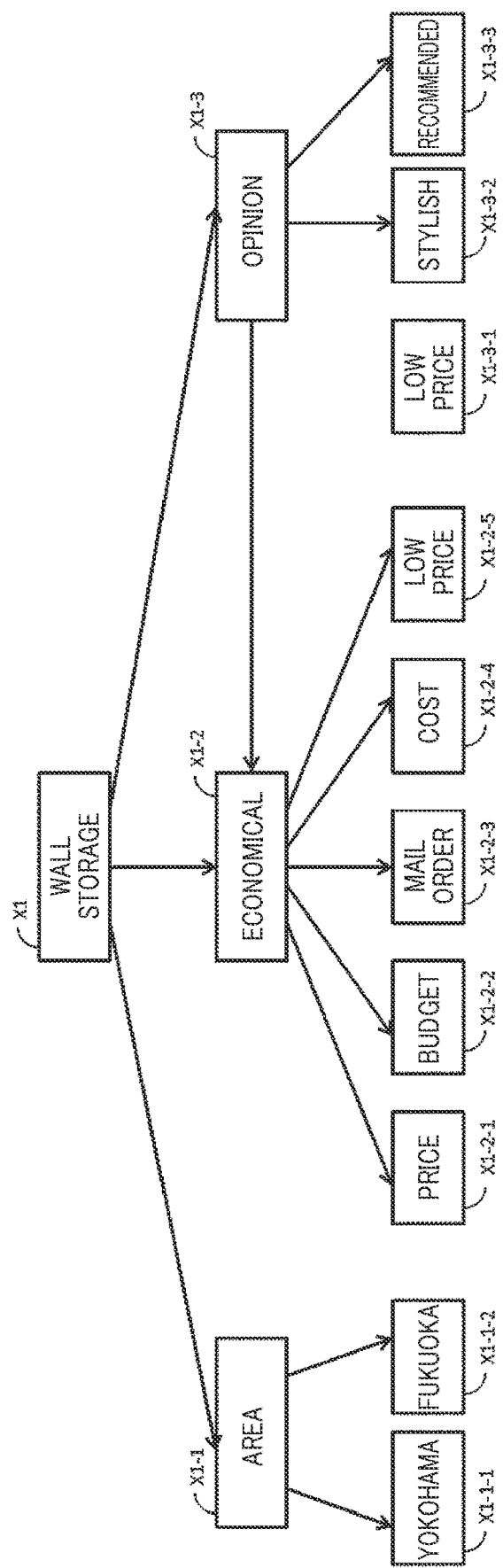

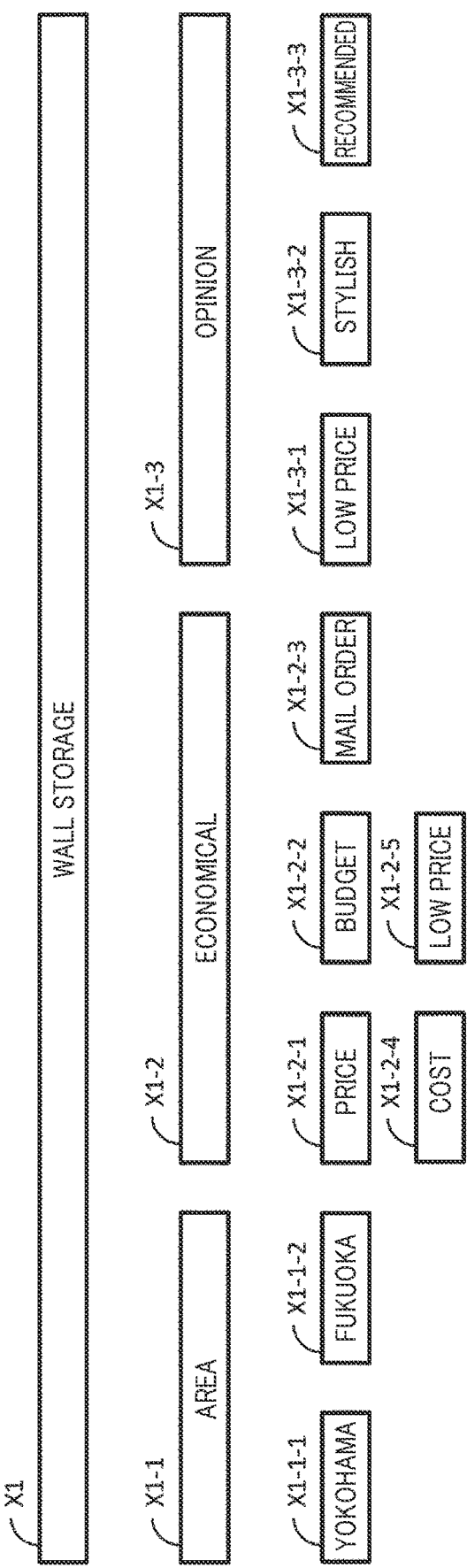

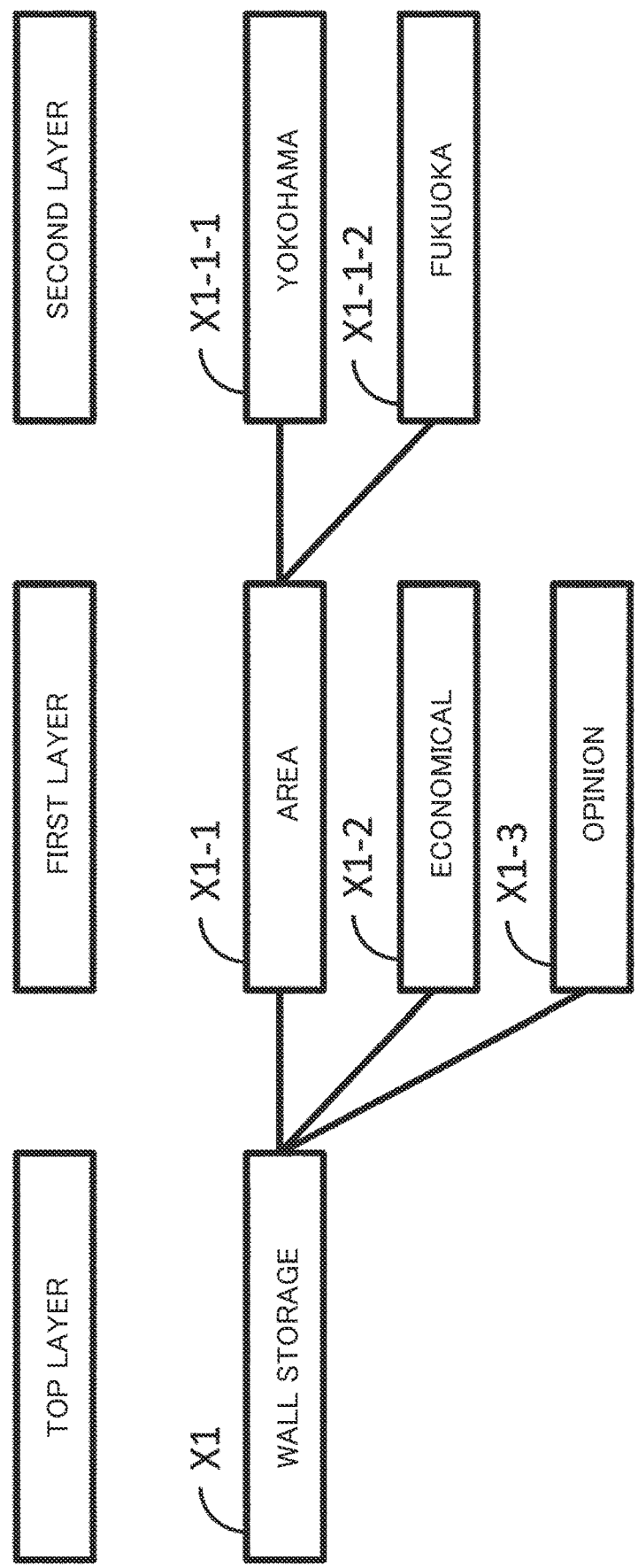

FIG. 28A

| PAGE ID | X1 | X1-1 | X1-2 | X1-3 |
|---|---|---|---|---|
| LAYER | TOP | 1 | 1 | 1 |
| URL | /WALL STORAGE | /WALL STORAGE/AREA | /WALL STORAGE/ECONOMICAL | /WALL STORAGE/OPINION |
| Title | WALL STORAGE | AREA | ECONOMICAL | OPINION |
| Description | AREA, ECONOMICAL, OPINION | YOKOHAMA, FUKUOKA | PRICE, BUDGET, MAIL ORDER, COST, LOW PRICE | LOW PRICE, STYLISH, RECOMMENDED |
| Keywords | WALL STORAGE | AREA | ECONOMICAL | OPINION |
| BREADCRUMBS | TOP>WALL STORAGE | TOP>WALL STORAGE>AREA | TOP>WALL STORAGE>ECONOMICAL | TOP>WALL STORAGE>OPINION |
| h1 | WALL STORAGE | AREA | ECONOMICAL | OPINION |
| h2 | AREA, ECONOMICAL, OPINION | YOKOHAMA, FUKUOKA | PRICE, BUDGET, MAIL ORDER, COST, LOW PRICE | LOW PRICE, STYLISH, RECOMMENDED |

FIG.28B

| PAGE ID | X1 | X1-1 | X1-2 | X1-3 |
|---|---|---|---|---|
| LAYER | TOP | 1 | 1 | 1 |
| URL | /WALL STORAGE | /WALL STORAGE/AREA | /WALL STORAGE/ECONOMICAL | /WALL STORAGE/OPINION |
| Title | WALL STORAGE | AREA | ECONOMICAL | OPINION |
| Description | AREA, ECONOMICAL, OPINION | YOKOHAMA, FUKUOKA, TOKYO | PRICE, BUDGET, COST, LOW PRICE | LOW PRICE, STYLISH, RECOMMENDED |
| Keywords | WALL STORAGE | AREA | ECONOMICAL | OPINION |
| BREADCRUMBS | TOP>WALL STORAGE | TOP>WALL STORAGE>AREA | TOP>WALL STORAGE>ECONOMICAL | TOP>WALL STORAGE>OPINION |
| h1 | WALL STORAGE | AREA | ECONOMICAL | OPINION |
| h2 | AREA, ECONOMICAL, OPINION | YOKOHAMA, FUKUOKA, TOKYO | PRICE, BUDGET, COST, LOW PRICE | LOW PRICE, STYLISH, RECOMMENDED |

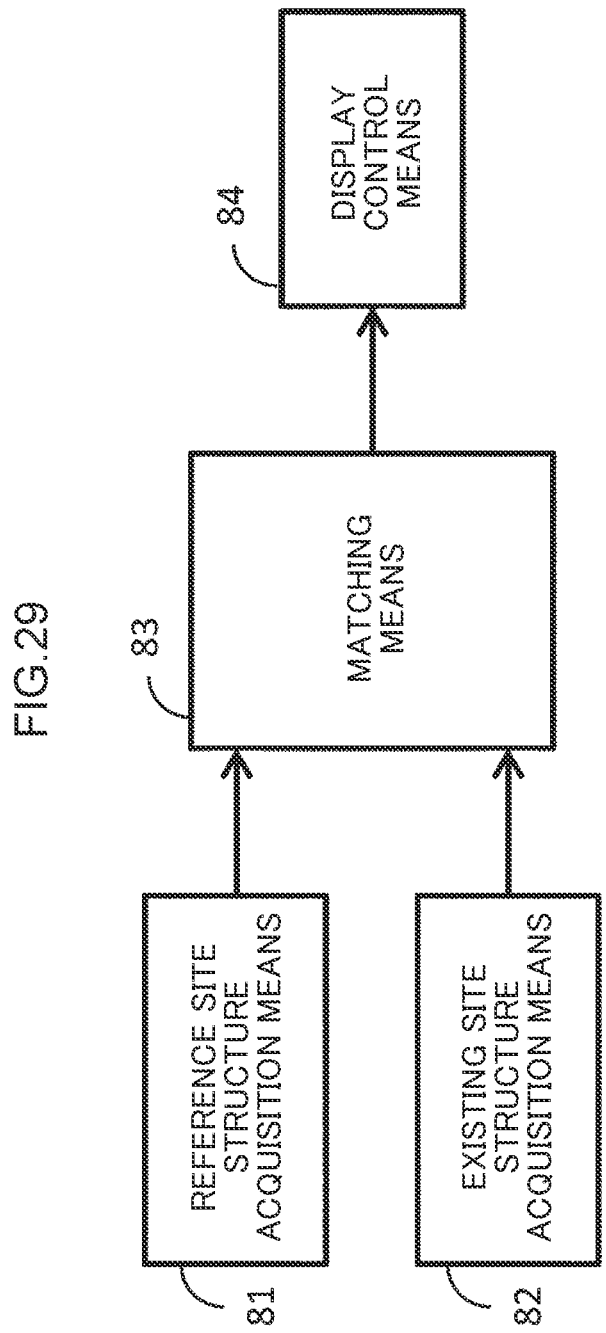

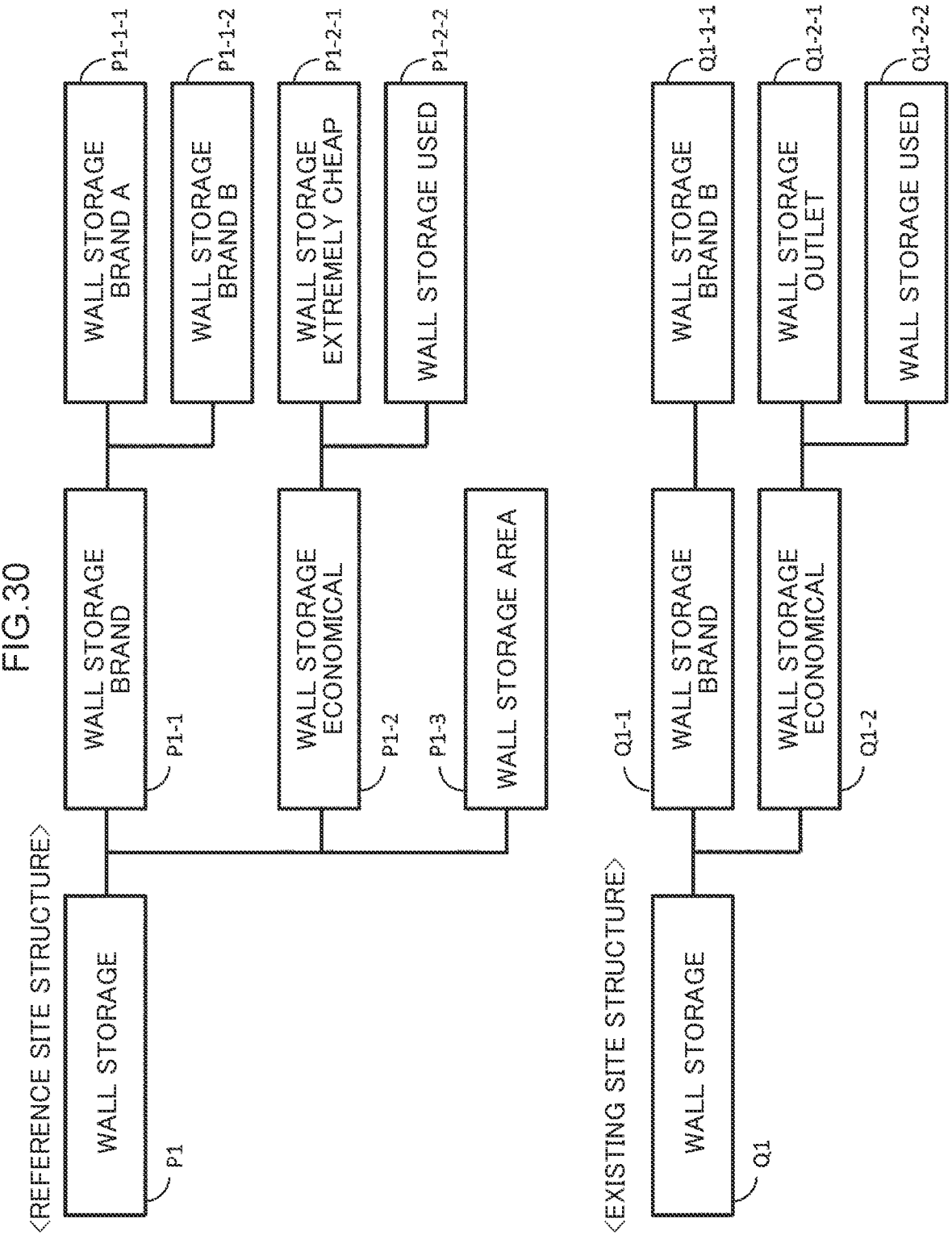

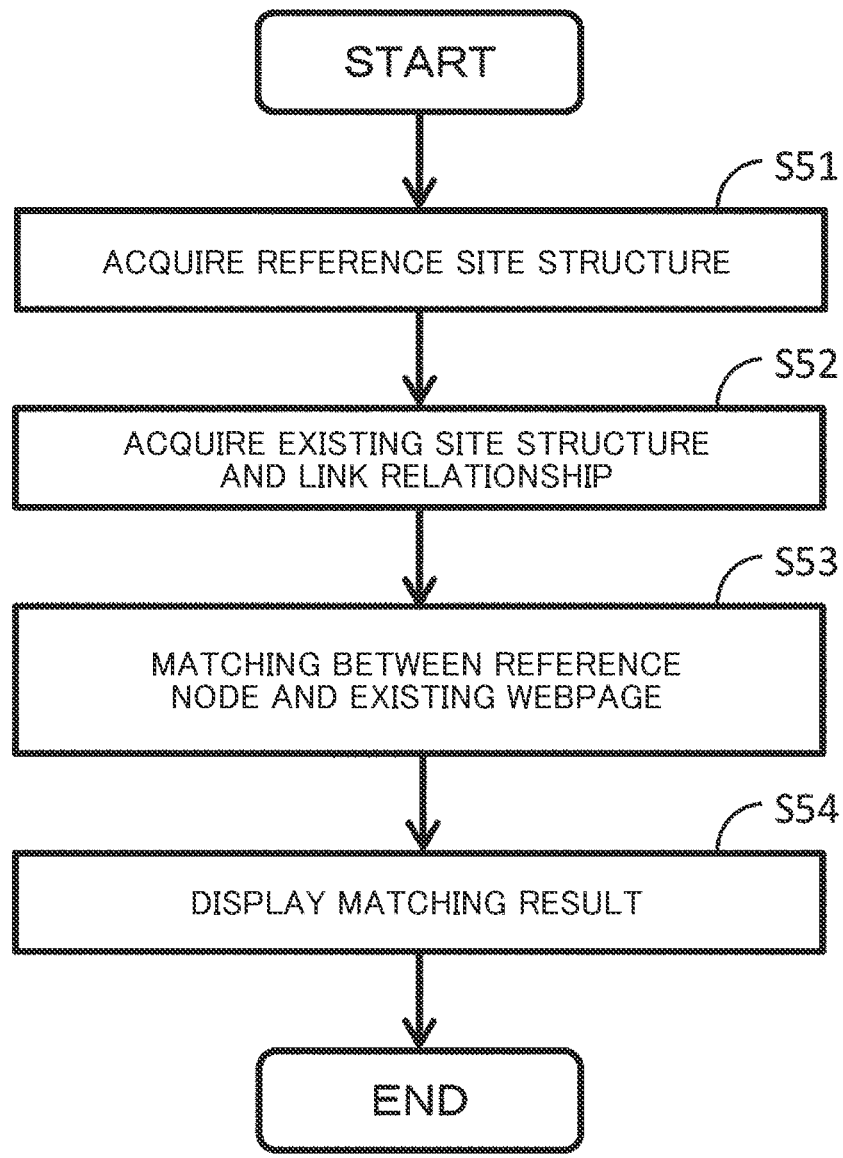

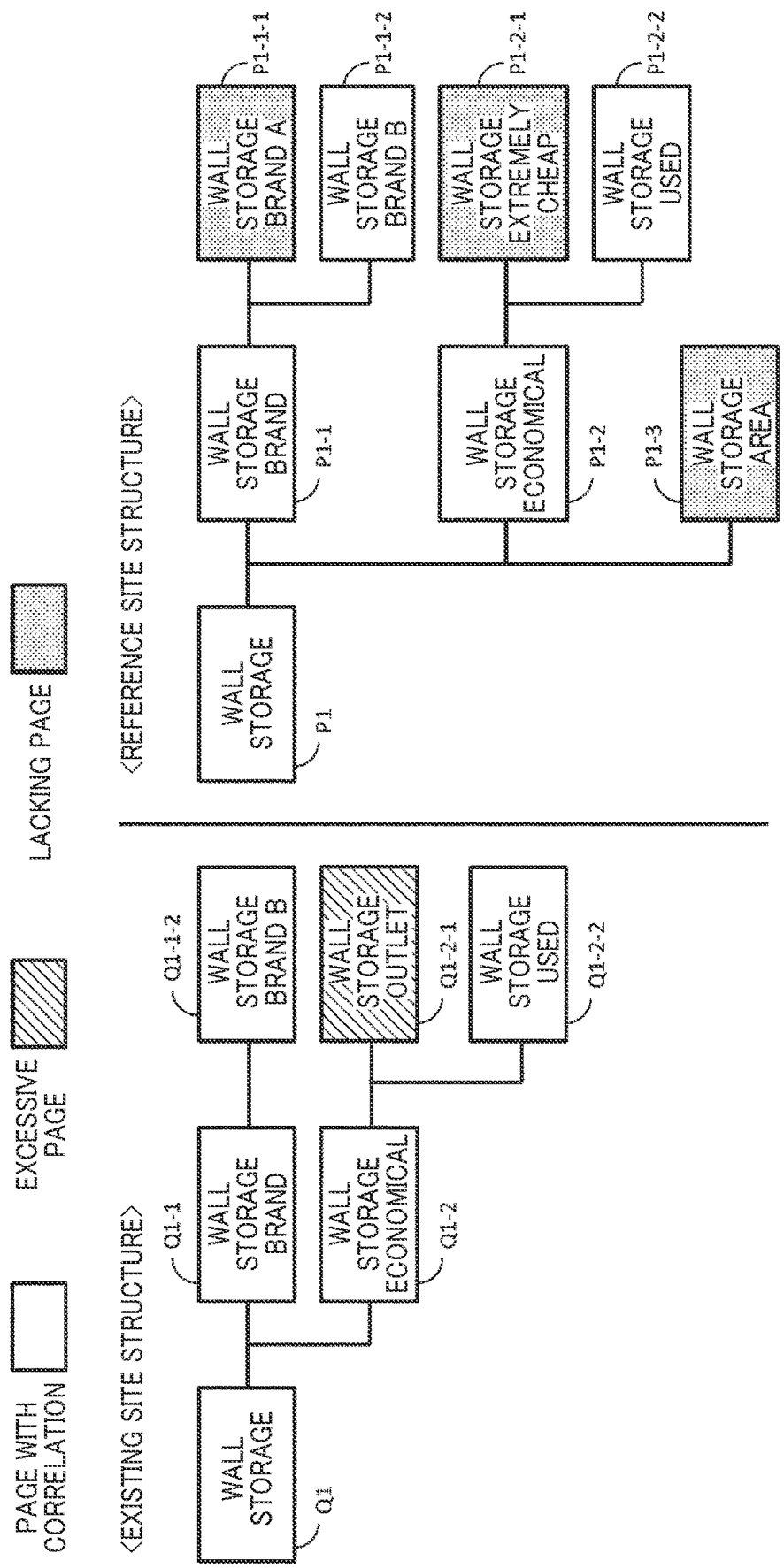

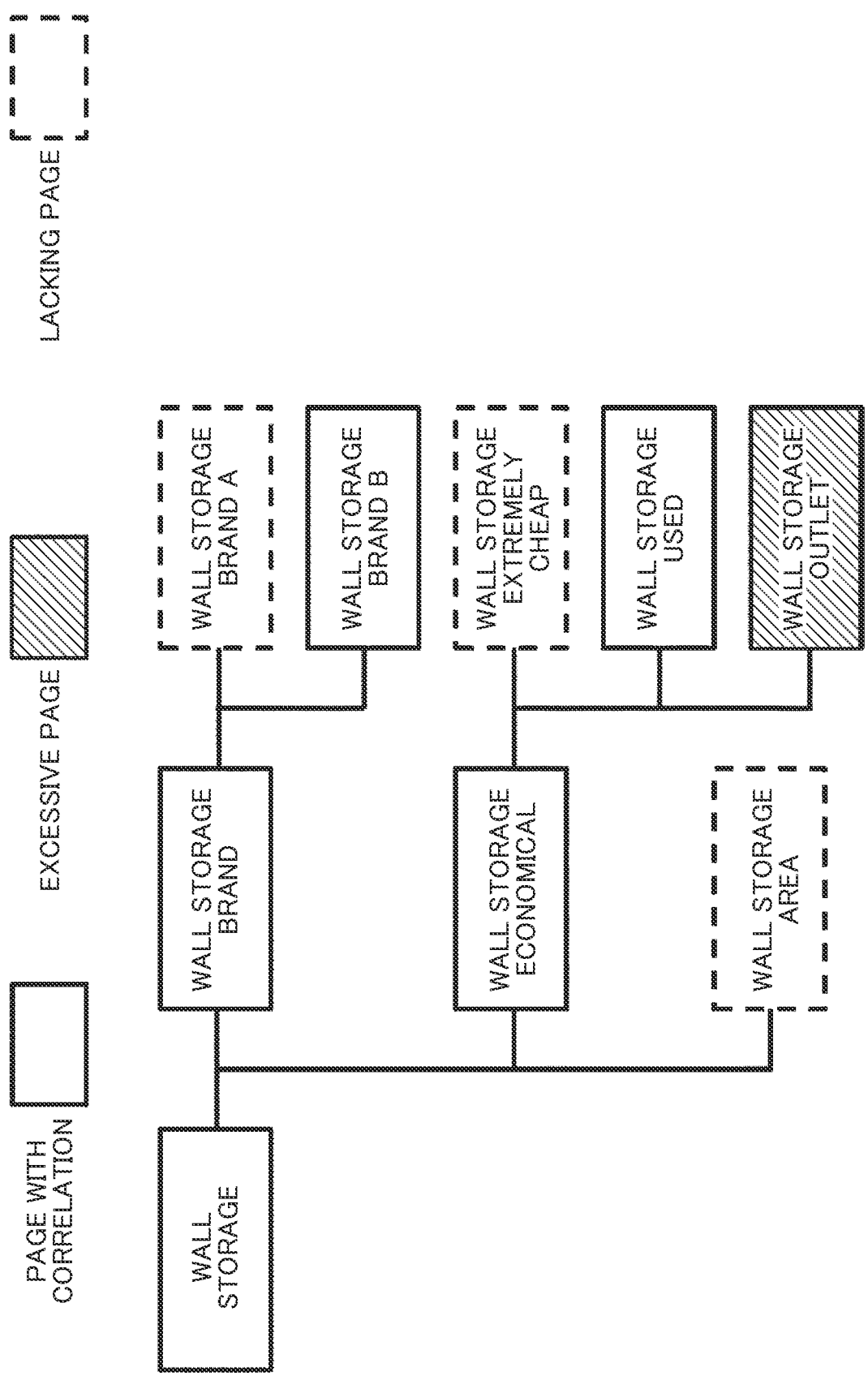

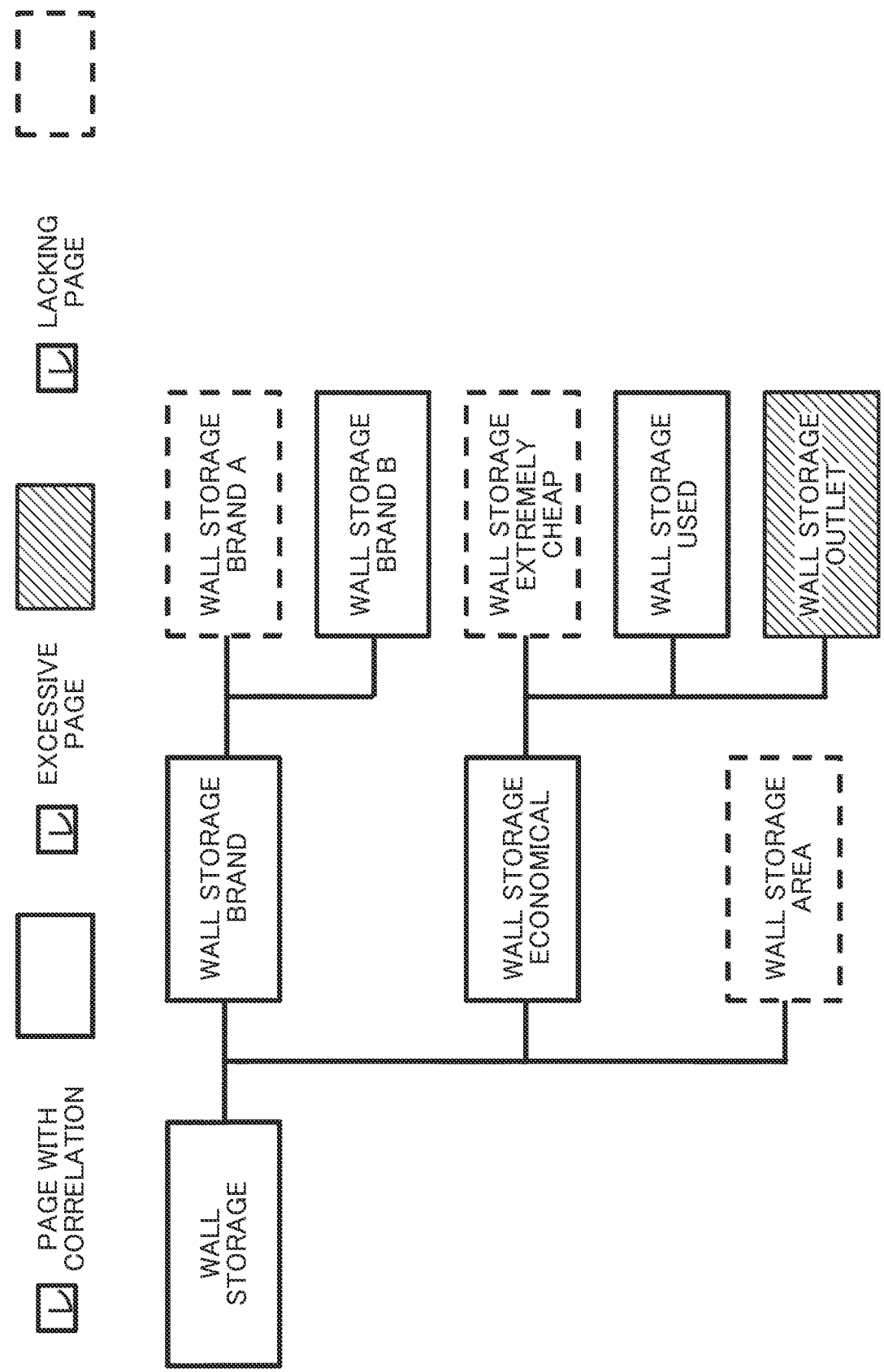

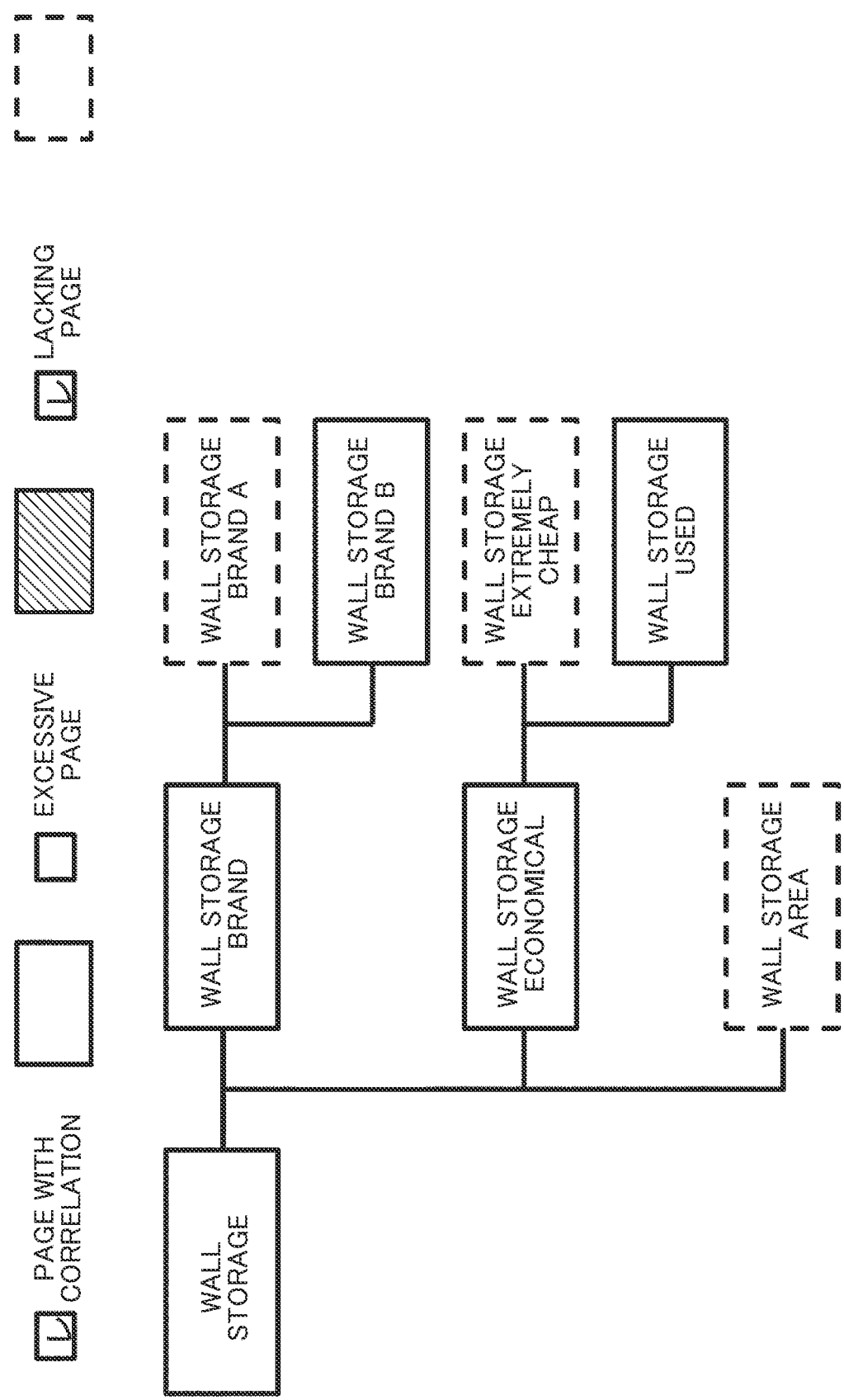

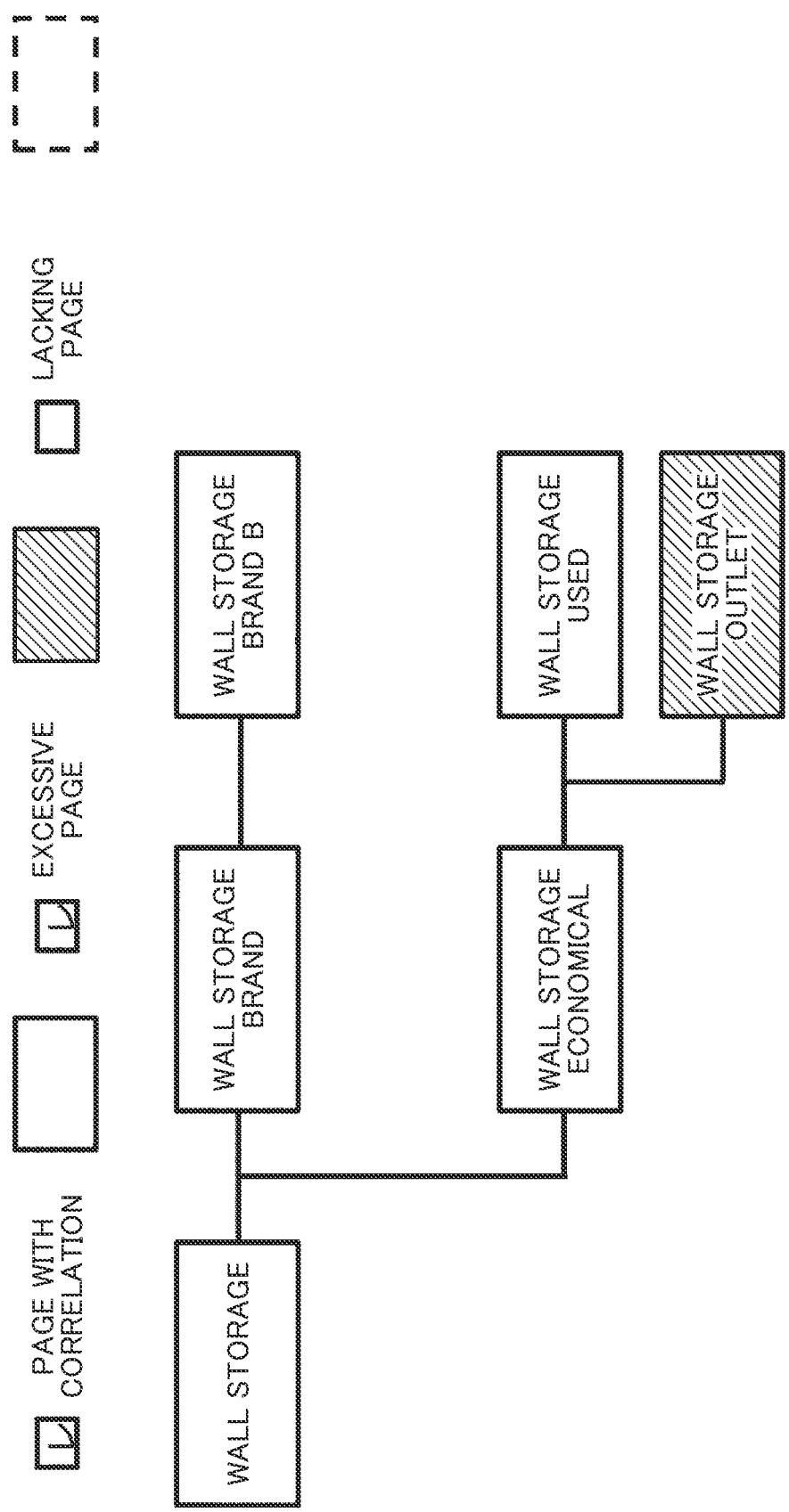

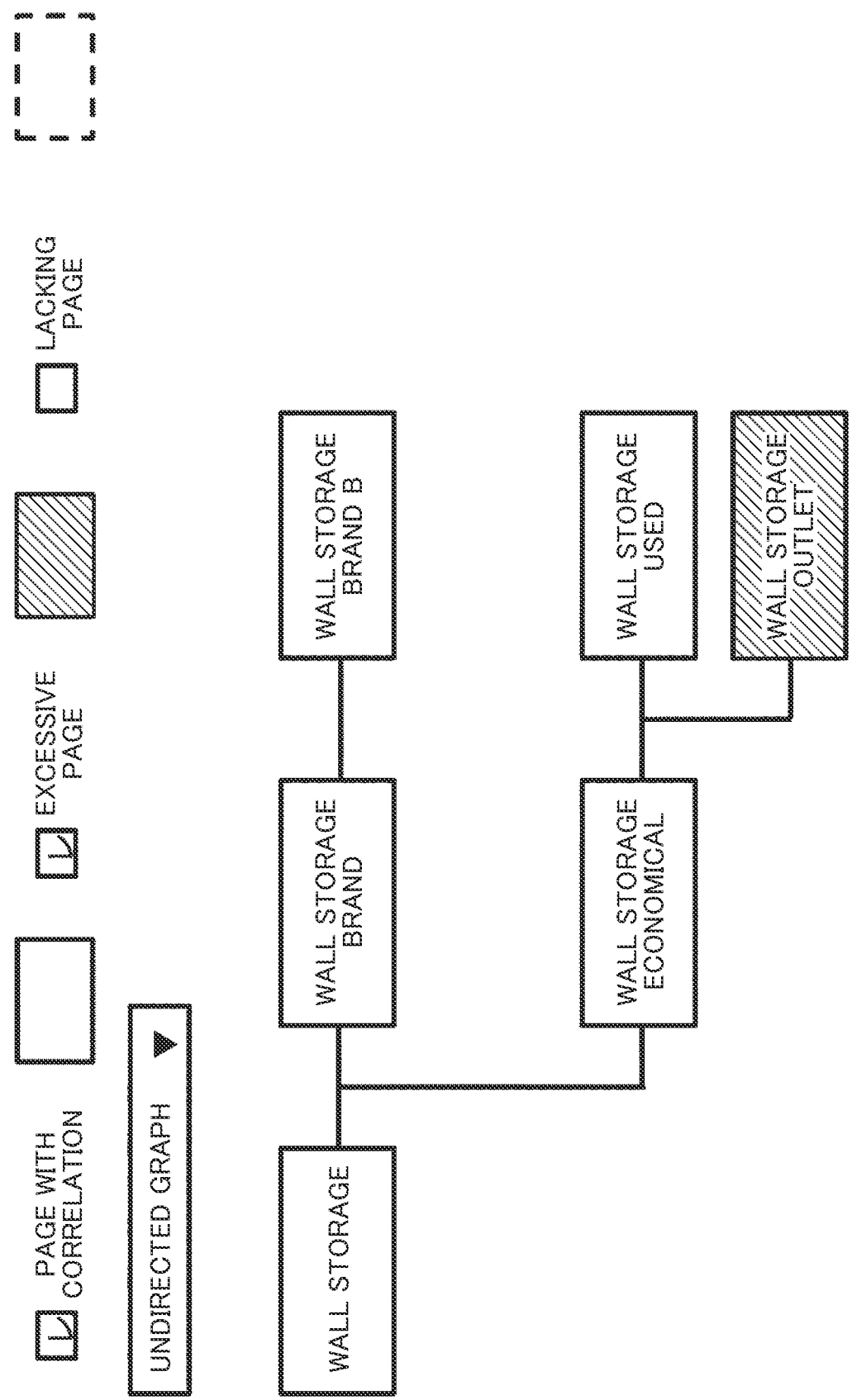

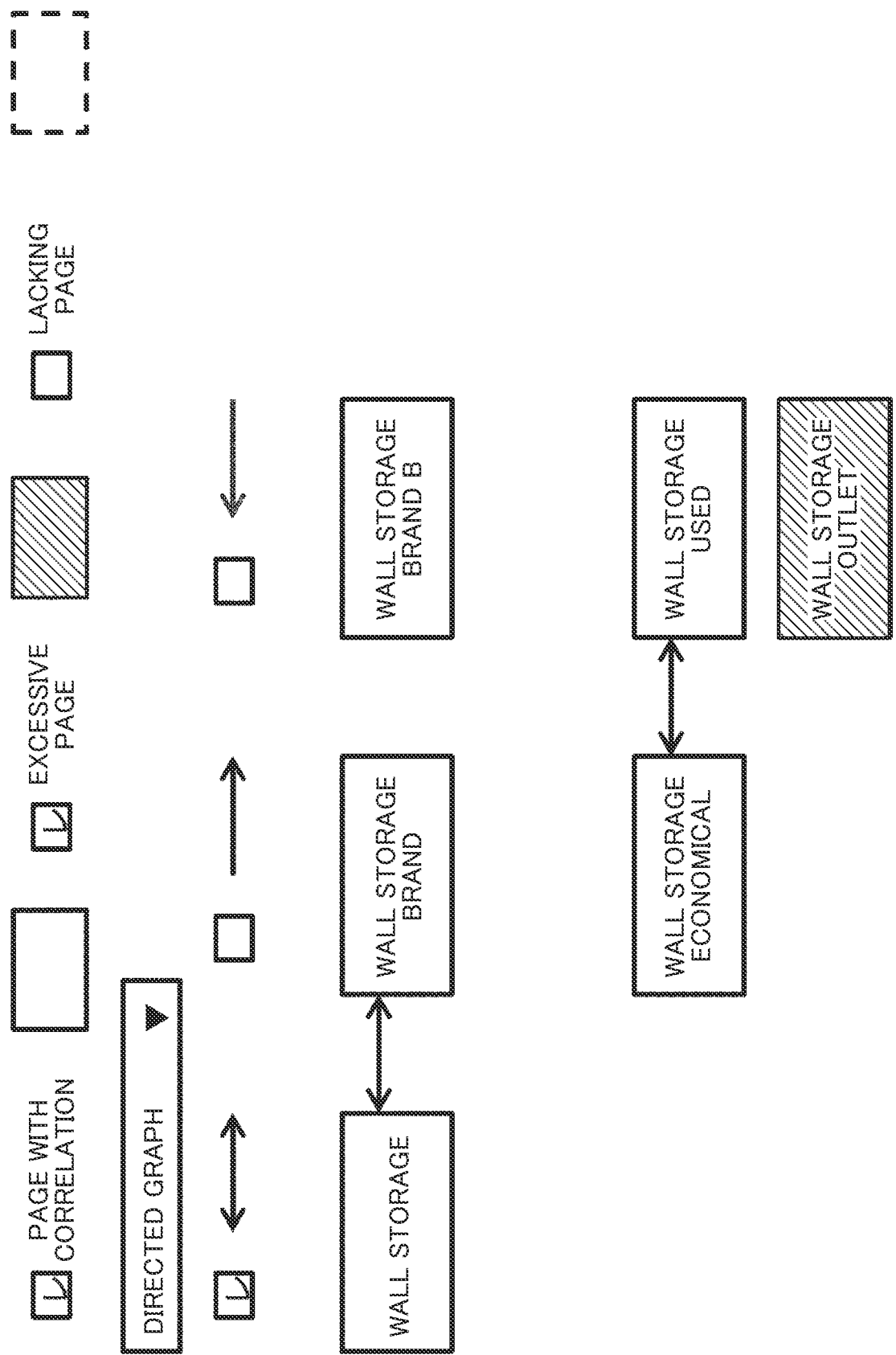

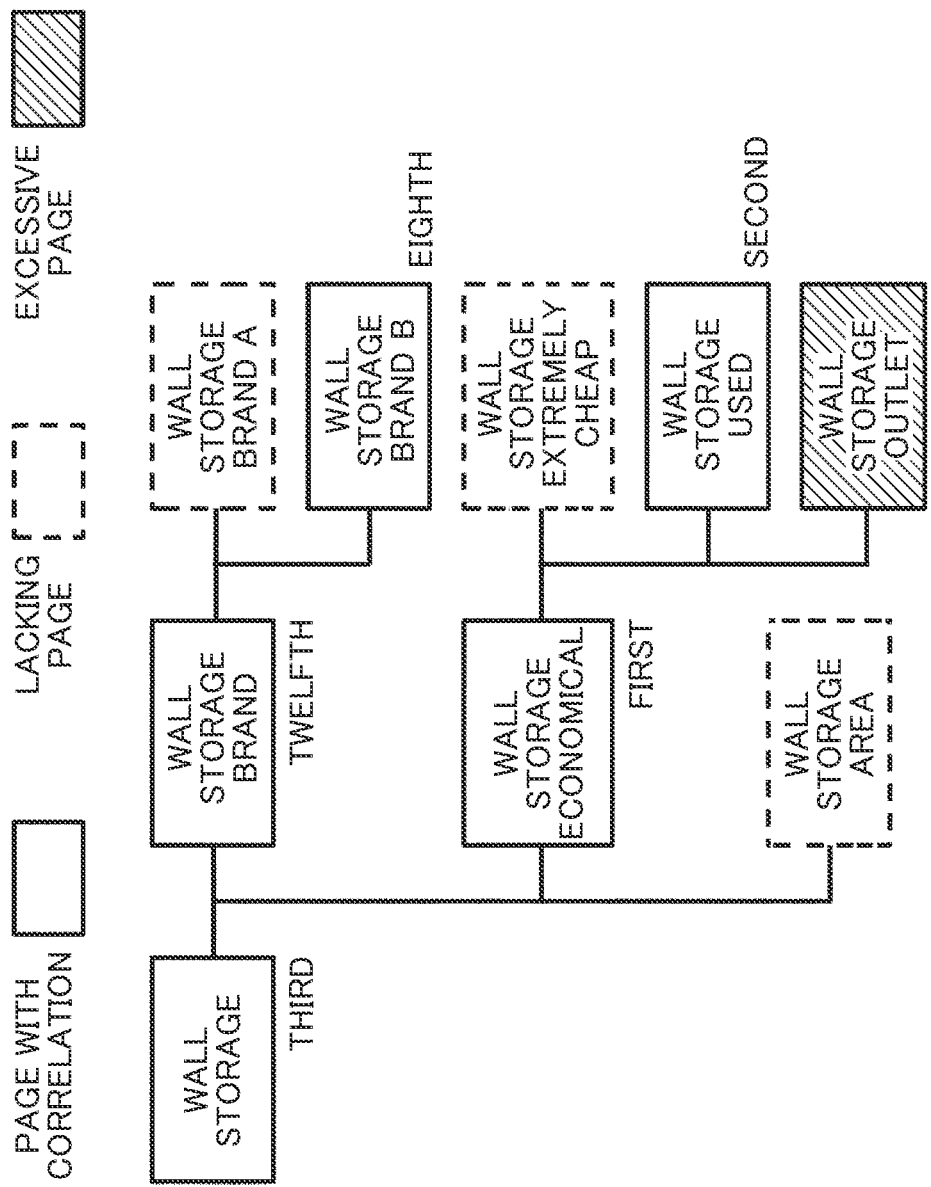

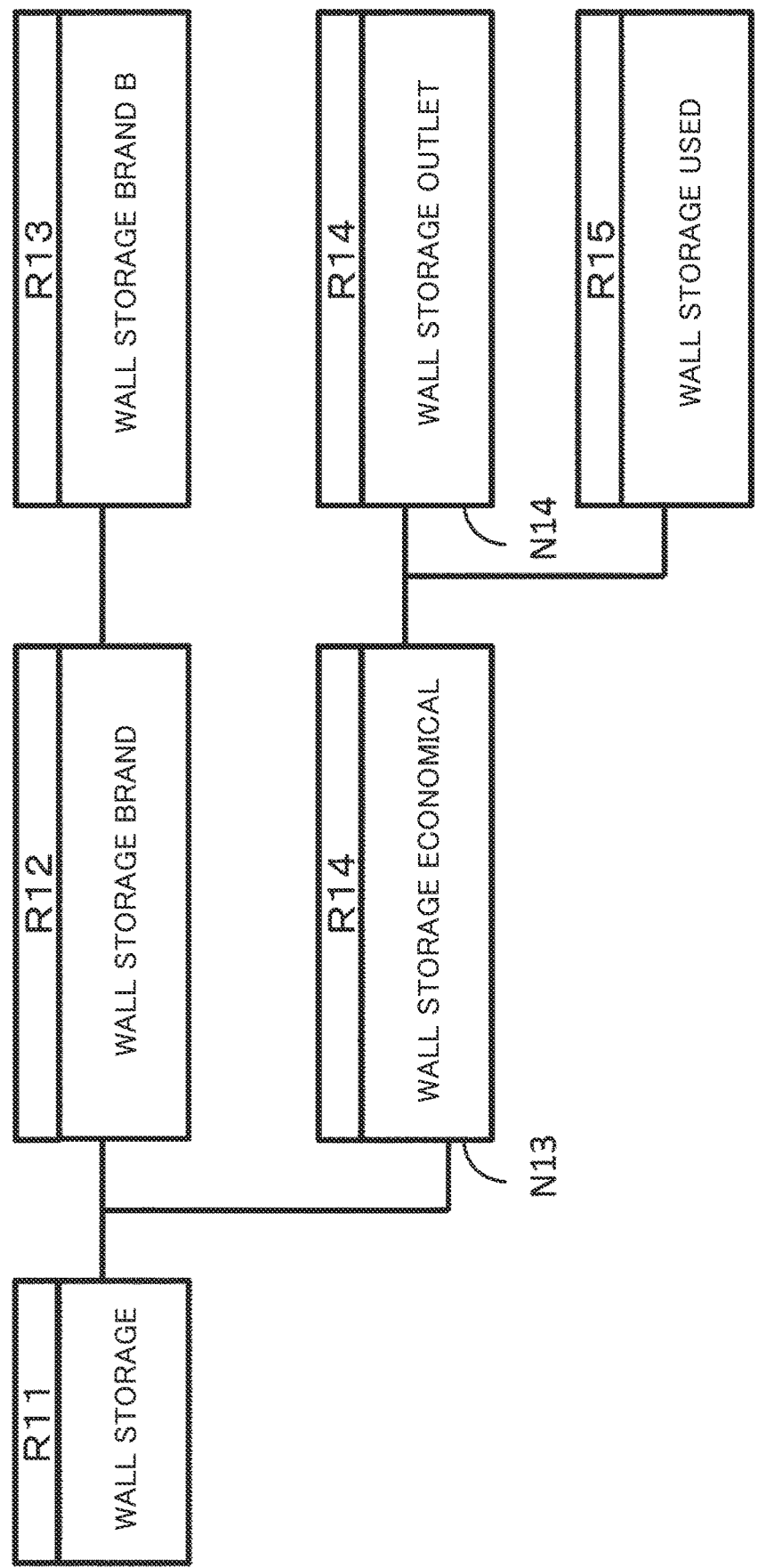

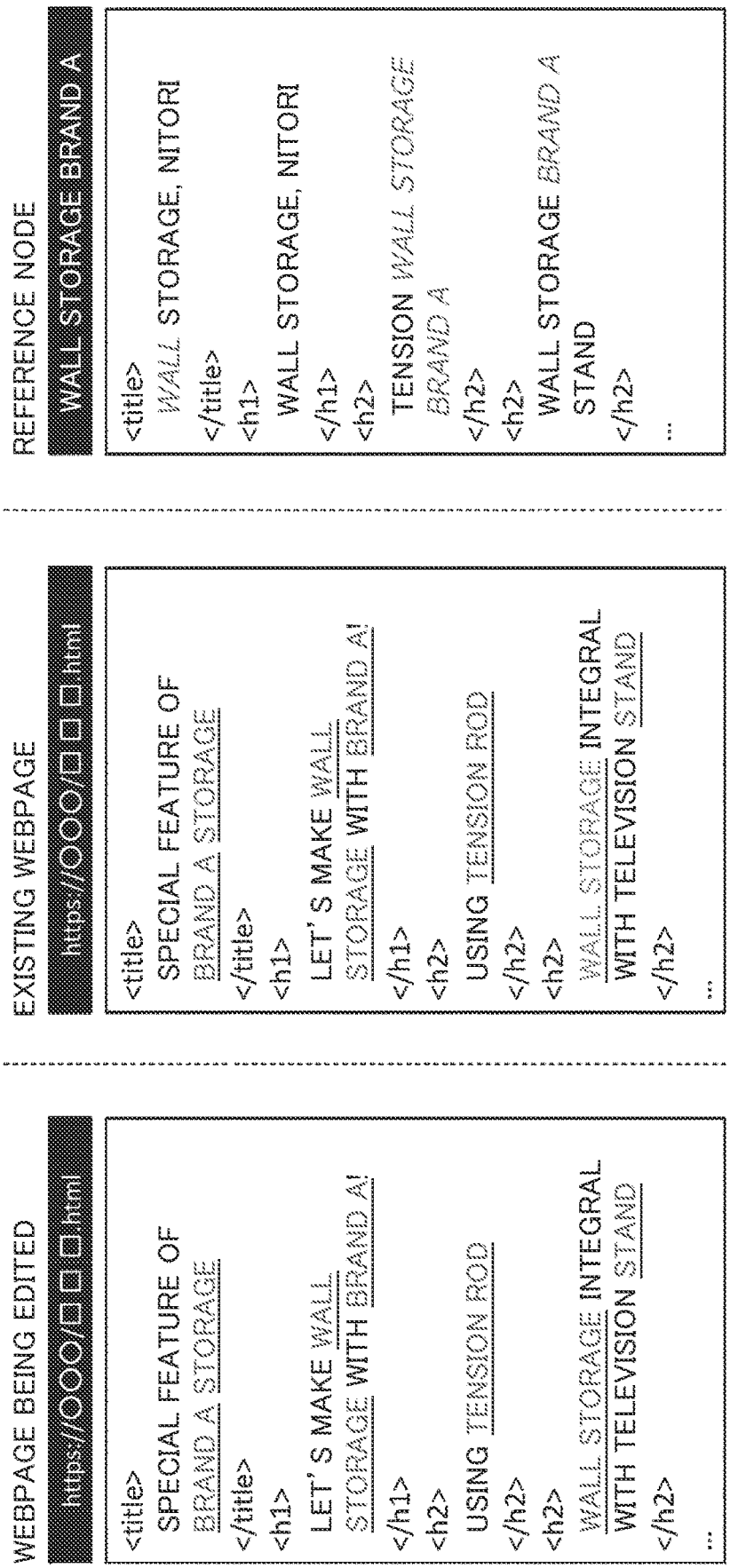

CONTENT ARRANGEMENT PROGRAM, CONTENT ARRANGEMENT DEVICE, AND CONTENT ARRANGEMENT METHOD, WEBSITE CONSTRUCTION SUPPORT PROGRAM, WEBSITE CONSTRUCTION SUPPORT DEVICE, AND WEBSITE CONSTRUCTION SUPPORT METHOD, AND ECONOMIC SCALE OUTPUT PROGRAM, ECONOMIC SCALE OUTPUT DEVICE, AND ECONOMIC SCALE OUTPUT METHOD

TECHNICAL FIELD

The present invention relates to an economic scale output device, an economic scale output program, and an economic scale output method for outputting an economic scale related to a search query.

BACKGROUND ART

A search by a search service such as Google (registered trademark) is widely performed.

SUMMARY OF INVENTION

Technical Problem

An object of the present invention is to provide an economic scale output program, an economic scale output device, and an economic scale output method, a content arrangement program, a content arrangement device, and a content arrangement method, and a website construction support program, a website construction support device, and a website construction support method.

Note that the applicant does not know the invention known in the literature related to the invention of the present application.

Solution to Problem

According to an aspect of the present invention, provided is an economic scale output program that allows a computer to serve as an output means that outputs an economic scale of each of a plurality of search queries, in which the economic scale of each of the search queries is based on the number of searches within a predetermined period of the search query and an advertising fee related to advertisement display on a search result screen for the search query.

Note that the advertising fee may be a fee incurred by advertisement display itself, or may be a fee incurred for each click (cost per click).

The output means may display the search queries on a display in order of the economic scale of the search queries.

It is possible to allow the computer to serve as an information acquisition means that, for each of the search queries, acquires information indicating the number of searches within a predetermined period of the search query and information indicating the advertising fee related to the advertisement display on the search result screen for the search query, and an arithmetic means that calculates the economic scale of each of the search queries on the basis of the information acquired by the information acquisition means.

It is possible to allow the computer to serve as an information acquisition means that acquires the economic scale for each of the search queries.

According to another aspect of the present invention, provided is an economic scale output program that allows a computer to serve as an output means that outputs an economic scale of each of search query groups obtained by grouping a plurality of search queries including a common word, in which the economic scale of each of the search query groups is a sum of economic scales of the search queries included in each search query group, and the economic scale of each of the search queries is based on the number of searches within a predetermined period of the search query and an advertising fee related to advertisement display on a search result screen for the search query.

The output means may display the search query groups on a display in order of the economic scale of the search query group.

It is possible to allow the computer to serve as an information acquisition means that acquires, for each of the search queries, information indicating the number of searches within a predetermined period of the search query, and information indicating the advertising fee related to the advertisement display on the search result screen for the search query, and an arithmetic means that calculates an economic scale of each search query group by calculating the economic scale of each of the search queries and summing economic scales of the search queries included in each search query group on the basis of the information acquired by the information acquisition means.

It is possible to allow the computer to serve as an information acquisition means that acquires the economic scale for each of the search query groups.

The economic scale of each of the search queries may be a product of a numerical value corresponding to the number of searches within a predetermined period of the search query and a numerical value corresponding to the advertising fee related to the advertisement display on the search result screen for the search query.

The economic scale of each of the search queries may be a product of a numerical value corresponding to the number of searches within a predetermined period of the search query, a numerical value corresponding to the advertising fee related to the advertisement display on the search result screen for the search query, and a numerical value corresponding to competitiveness of the search query.

The economic scale of each of the search queries may also be based on at least one of competitiveness of the search query, an estimated click rate in a case where the advertisement is displayed on the search result screen for the search query, a position where the advertisement is displayed on the search result screen for the search query, the number of advertisements displayed on the search result screen for the search query, and model values for a high bid price zone and/or a low bid price zone of the advertising fee related to the advertisement display on the search result screen for the search query.

The advertising fee relates to the advertisement display on the search result screen for the search query in a specific search service, and the number of searches may correspond to the number of searches performed with the search query within a predetermined period in the specific search service.

According to another aspect of the present invention, provided is an economic scale output device provided with an output means that outputs an economic scale of each of a plurality of search queries, in which the economic scale of each of the search queries is based on the number of searches within a predetermined period of the search query, and an advertising fee related to advertisement display on a search result screen for the search query.

According to another aspect of the present invention, provided is an economic scale output device provided with an output means that outputs an economic scale of each of search query groups obtained by grouping a plurality of search queries including a common word, in which the economic scale of each of the search query groups is a sum of economic scales of the search queries included in each search query group, and the economic scale of each of the search queries is based on the number of searches within a predetermined period of the search query and an advertising fee related to advertisement display on a search result screen for the search query.

According to another aspect of the present invention, provided is an economic scale output method provided with an output step of outputting an economic scale of each of a plurality of search queries by an output means, in which the economic scale of each of the search queries is based on the number of searches within a predetermined period of the search query, and an advertising fee related to advertisement display on a search result screen for the search query.

According to another aspect of the present invention, provided is an economic scale output method provided with an output step of outputting an economic scale of each of search query groups obtained by grouping a plurality of search queries including a common word by an output means, in which the economic scale of each of the search query groups is a sum of economic scales of the search queries included in each search query group, and the economic scale of each of the search queries is based on the number of searches within a predetermined period of the search query and an advertising fee related to advertisement display on a search result screen for the search query.

According to another aspect of the present invention, provided is a content arrangement program that allows a computer to serve as an economic scale acquisition means that acquires an economic scale of each content on the basis of each first word individually corresponding to each of a plurality of contents to be arranged on a display screen, and an arrangement information generation means that generates arrangement information indicating arrangement of each content on the display screen according to the economic scale of each content that is acquired.

The economic scale may be based on the search trend of the search query associated with the first word.

The economic scale acquisition means may acquire the economic scale of each content on the basis of the first word and a second word corresponding to the plurality of contents in common.

The economic scale may be based on a search trend of a search query associated with the first word and the second.

The economic scale may be based on at least one of the number of searches within a predetermined period of the search query, a change in the number of searches within a predetermined period of the search query, an advertising fee related to advertisement display on a search result screen for the search query, a change in the advertising fee related to the advertisement display on the search result screen for the search query, competitiveness of the search query, and a change in the competitiveness of the search query.

It is possible to allow the computer to serve as a second word setting means that sets the second word common to the plurality of contents.

The second word setting means may set the second word on the basis of at least one of an inflow route to the display screen and information of a reader of the display screen.

It is possible to allow the computer to serve as a first word setting means that sets the first word for each of the plurality of contents.

The arrangement information generation means may generate the arrangement information by determining the arrangement of each content on the display screen so that the content having a higher economic scale is arranged in a more easily viewable position on the display screen.

The arrangement information generation means may display a preview of the display screen on which each content is arranged in a position according to the arrangement information.

The arrangement information generation means may display a setting screen for setting the first word.

The display screen may be a webpage or a screen generated by a native application.

According to another aspect of the present invention, provided is a content arrangement device provided with an economic scale acquisition means that acquires an economic scale of each content on the basis of each first word individually corresponding to each of a plurality of contents to be arranged on a display screen, and an arrangement information generation means that generates arrangement information indicating arrangement of each content on the display screen according to the economic scale of each content that is acquired.

According to another aspect of the present invention, provided is a content arrangement method provided with acquiring an economic scale of each content on the basis of each first word individually corresponding to each of a plurality of contents to be arranged on a display screen by an economic scale acquisition means, and generating arrangement information indicating arrangement of each content on the display screen according to the economic scale of each content that is acquired by an arrangement information generation means.

According to another aspect of the present invention, provided is a site construction support program that allows a computer to serve as a specification means that specifies a word related to one or more second display screens that should be linked from a first display screen, or a hierarchical relationship of which with the first display screen should be determined on the basis of a plurality of search queries.

The plurality of search queries may include a word related to the first display screen in common.

The specification means may specify the word related to the second display screen on the basis of a word included in each of the plurality of search queries.

The specification means may specify a word included in common in a part of the plurality of search queries as the word related to the second display screen.

The specification means may specify a word related to one or more third display screens that should be linked from the second display screen, or a hierarchical relationship of which with the first display screen should be determined on the basis of the plurality of search queries.

The word related to the third display screen may include the word related to the second display screen and another word.

The plurality of search queries includes a word related to the first display screen in common, and it is possible to allow the computer to serve as a display screen creation means that creates a part of the first display screen and/or a part of the second display screen by using the word related to the first display screen and the word related to the second display screen.

The display screen creation means may create a part of an HTML file that describes the first display screen.

There is a plurality of second display screens, and it is possible to allow the computer to serve as a display control means capable of displaying a screen including a first symbol corresponding to the first display screen, and a plurality of second symbols associated with the first symbol corresponding to each of the plurality of second display screens, the first symbol including the word related to the first display screen, and each of the second symbols including the word related to the corresponding second display screen.

The display control means is able to display a third symbol corresponding to a third display screen that should be linked from a specific second display screen, the third symbol associated with the second symbol corresponding to the specific second display screen, and the third symbol may include a word related to the third display screen.

The plurality of second symbols is able to be selected, and it is possible that the display controller displays the third display screen that should be linked from the second display screen corresponding to the second symbol in a selected state but does not display the third display screen that should be linked from the second display screen corresponding to the second symbol in an unselected state.

On the screen displayed by the display control means, the display control means is able to perform at least one of processing of deleting association between the first symbol and the plurality of second symbols, processing of adding association between symbols that are not associated with each other, processing of adding a symbol corresponding to a new display screen, and processing of deleting a symbol included in the screen according to a user operation, and display a processed screen.

It is possible to serve as a display screen creation means that creates a part of the first display screen and/or a part of the second display screen in consideration of association after the processing by the display control means.

It is possible to allow the computer to serve as a display control means capable of displaying a screen including identification information that specifies the first display screen, and a part of an HTML file that describes the first display screen associated with the identification information, in which a part of the HTML file that describes the first display screen may include the word related to the first display screen and the word related to the second display screen.

On the screen displayed by the display control means, the display control means may edit a part of information of the HTML file according to a user operation, and may serve as a display screen creation means that creates a part of the first display screen and/or a part of the second display screen in consideration of a part of information of the edited HTML file.

The first display screen may be a first screen generated by a first webpage or a native application, and the second display screen may be a second screen generated by a second webpage or a native application.

According to another aspect of the present invention, provided is a site construction support device provided with a specification means that specifies a word related to one or more second display screens that should be linked from a first display screen, or a hierarchical relationship of which with the first display screen should be determined on the basis of a plurality of search queries.

According to another aspect of the present invention, provided is a site construction support method provided with specifying a word related to one or more second display screens that should be linked from a first display screen, or a hierarchical relationship of which with the first display screen should be determined on the basis of a plurality of search queries by a specification means.

According to another aspect of the present invention, provided is a program that allows a computer to serve as a reference site structure acquisition means that acquires a reference site structure indicating a plurality of reference nodes with each of which one or more words are associated, an existing site structure acquisition means that acquires an existing website structure formed of a plurality of existing webpages, a matching means that performs matching between each of the plurality of reference nodes and each of the plurality of existing webpages on the basis of the one or more words, and a display order determination means that determines display order of the existing website or the existing webpages when displaying a search request for a search query on the basis of a matching result.

The display order determination means may make the display order of the existing website or the existing webpages included in the existing website higher as a matching degree between each of the plurality of reference nodes and each of the plurality of existing webpages is higher.

According to another aspect of the present invention, provided is a display order determination device provided with a reference site structure acquisition means that acquires a reference site structure indicating a plurality of reference nodes with each of which one or more words are associated, an existing site structure acquisition means that acquires an existing website structure formed of a plurality of existing webpages, a matching means that performs matching between each of the plurality of reference nodes and each of the plurality of existing webpages on the basis of the one or more words, and a display order determination means that determines display order of the existing website or the existing webpage when displaying a search result for a search query on the basis of a matching result.

According to another aspect of the present invention, provided is a display order determination method provided with acquiring a reference site structure indicating a plurality of reference nodes with each of which one or more words are associated by a reference site structure acquisition means, acquiring an existing website structure formed of a plurality of existing webpages by an existing site structure acquisition means, performing matching between each of the plurality of reference nodes and each of the plurality of existing webpages on the basis of the one or more words by a matching means, and determining display order of the existing website or the existing webpages when displaying a search result for a search query on the basis of a matching result by a display order determination means.

BRIEF DESCRIPTION OF DRAWINGS

FIG. 2 is a view illustrating the number of searches, a cost per click, and competitiveness for each search query disclosed by a search service.

FIG. 3 is a block diagram illustrating a schematic configuration of an economic scale calculation system.

FIG. 4B is a sequence diagram which is a variation of FIG. 4A.

FIG. 5A is a view illustrating an example of a screen of the number of searches, the cost per click, and the competitiveness for each search query displayed.

FIG. 5B is a view illustrating an example of a screen on which the search queries are arranged according to an economic scale.

FIG. 7 is a view illustrating an example of a screen on which search query groups are arranged according to an economic scale.

FIG. 11B is a sequence diagram illustrating another example of the processing operation in the content arrangement system in FIG. 9.

FIG. 18 is a view illustrating an outline of a fourth embodiment.

FIG. 20 is a view illustrating the outline of the fourth embodiment.

FIG. 21 is a block diagram illustrating a schematic configuration of a website construction support device 7 according to the fourth embodiment.

FIG. 23A is a view schematically illustrating a part of the top page W0.

FIG. 23B is a view schematically illustrating the first-layer page W11.

FIG. 25A is a display example of a structure of the website.

FIG. 25B is a display example of the structure of the website.

FIG. 25C is a display example of the structure of the website.

FIG. 25D is a display example of the structure of the website.

FIG. 26 is a view illustrating another display example of the structure of the website.

FIG. 27A is a view illustrating another display example of the structure of the website.

FIG. 28A is a view illustrating another display example of the structure of the website.

FIG. 28B is a view illustrating another display example of the structure of the website.

FIG. 29 is a block diagram illustrating a schematic configuration of a website construction support device according to a sixth embodiment.

FIG. 30 is a view schematically illustrating a reference site structure and an existing site structure.

FIG. 31 is a flowchart illustrating an example of a processing operation of the website construction support device according to the sixth embodiment.

FIG. 35A is a screen example illustrating a matching result displayed on a display by a display control means 84.

FIG. 36 is another screen example illustrating the matching result displayed on the display by the display control means 84.

FIG. 37A is another screen example illustrating the matching result displayed on the display by the display control means 84.

FIG. 37B is another screen example illustrating the matching result displayed on the display by the display control means 84.

FIG. 37C is another screen example illustrating the matching result displayed on the display by the display control means 84.

FIG. 38A is another screen example illustrating the matching result displayed on the display by the display control means 84.

FIG. 38C is another screen example illustrating the matching result displayed on the display by the display control means 84.

FIG. 40 is an example in which accompanying information is added to the screen in FIG. 35.

FIG. 42B is another screen example displayed on the display by the display control means 84.

FIG. 44 is another screen example displayed on the display by the display control means 84.

DESCRIPTION OF EMBODIMENTS

First Embodiment

[Background]

With the advent of a digital society, search engines and search interfaces have become widespread, and a trend of so-called "search marketing" in which servicers such as companies and sole proprietors promote placement of search-linked advertisements, search engine optimization (SEO) countermeasures, webpage creation and the like in order to more efficiently attract searchers has arisen.

Various economic activities in general that occur there are called "search economy" and the like, and now become one of most noticed fields in marketing fields, but the servicer that works on this has various burdensome human works. One example thereof is a work of selecting a search query (hereinafter referred to as a search query selection work).

The search query selection work is a work by the servicer, for example, of selecting the search query for which an advertisement should be placed, selecting the search query for which the SEO countermeasures should be applied for each webpage, selecting the corresponding search query for determining a display position of a menu and a product name in the webpage, and selecting the search query corresponding to names of cities, words, towns, and villages and name of stations as candidates for opening an actual store while focusing on the search query with a larger number of searches by using a so-called search-linked advertisement ordering tool such as the "keyword planner" provided by Google LLC and the "keyword advice tool" provided by Yahoo Japan Corporation.

Figure 1:
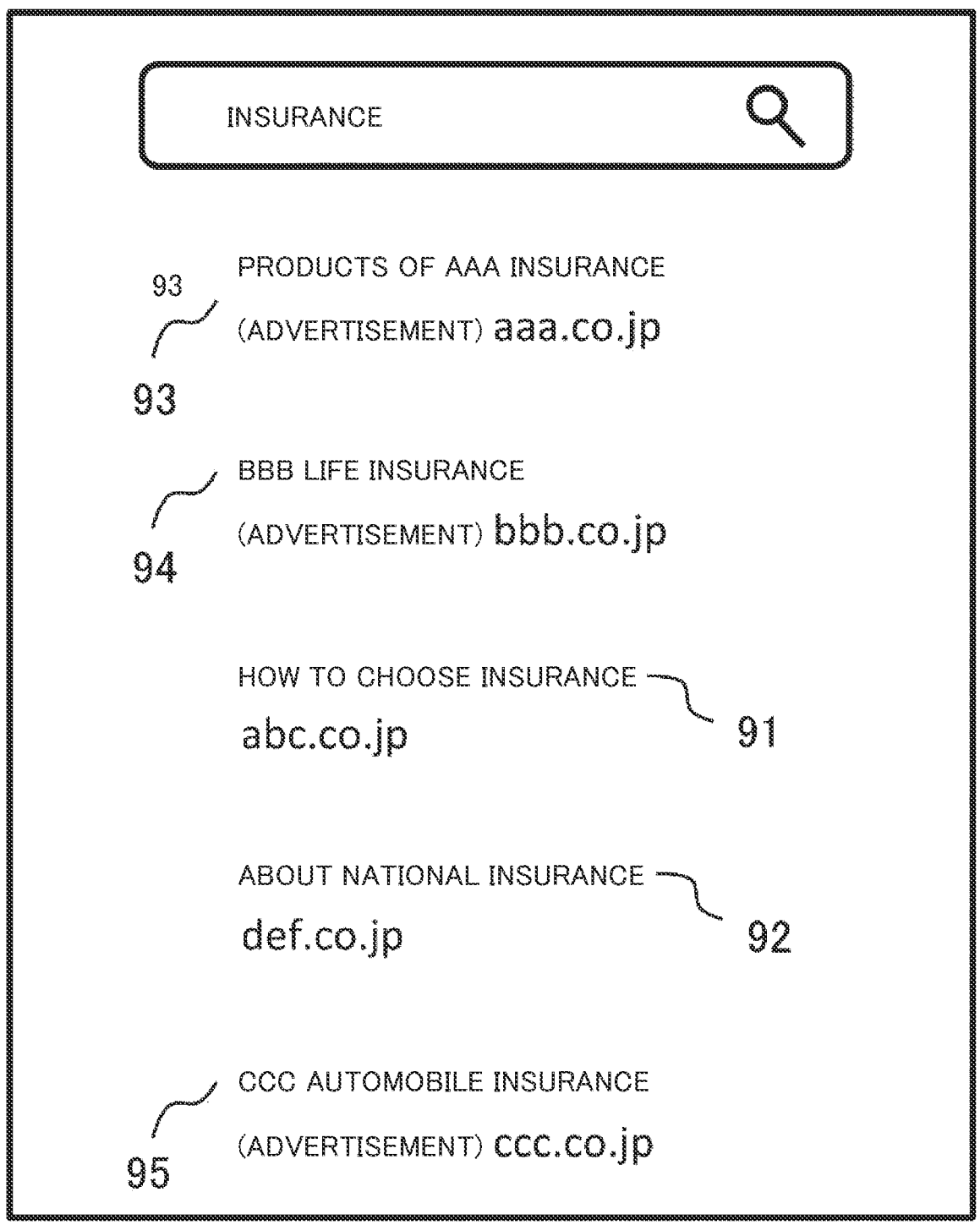
FIG. 1 is a view schematically illustrating a search result screen displayed in a case where a search is performed with a search query "insurance".

An example easy to understand as the search query selection work is the selection of the search query for which the advertisement should be placed. For example, if the search is performed with a specific search query using a search service such as Google (registered trademark), an advertisement might be displayed along with a search result screen. For example, FIG. 1 schematically illustrates a search result screen displayed in a case where the search is performed with the search query "insurance". As illustrated in the drawing, in addition to URLs of search results such as "how to choose insurance" (reference sign 91) and "about National Insurance" (reference sign 92), advertisements such as "products of AAA Insurance" (reference sign 93), "BBB Life Insurance" (reference sign 94), and "CCC Automobile Insurance" (reference sign 95) might be displayed in upper and lower part of the search result screen. A URL is also associated with the advertisement, and when the URL is clicked, a more detailed webpage related to the advertisement is displayed.

A person who wants to display such advertisement (hereinafter, simply referred to as "advertiser") purchases an advertisement frame associated with the search query in order to display the advertisement on the search result screen. A work of selecting the search query for which the advertisement frame is to be purchased is the above-described search query selection work.

[Problem]

A problem of a first embodiment is to provide an economic scale output device, an economic scale output program, and an economic scale output method to support the selection of the search query. Since the inventors of the present application have conceived of a fact that the search being performed (search trend) is reflected in search needs, the economic scale output device and the like utilizing the search trend is mainly described.

Outline of First Embodiment

When selecting the search query, a person in charge of search query selection (hereinafter referred to as a selector) might select a more promising search query with reference to indicators such as the number of searches (sometimes also referred to as a "search volume"), a cost per click, and competitiveness for each search query displayed on the search-linked advertisement ordering tool.

However, it is difficult to quickly select the promising search query using these indicators alone. For example, the search might be the search that causes almost no purchasing behavior such as a "weather" search query though the number of searches is large. The search might be the search with a small number of searches and a low cost per click though this is highly competitive. The search might be the search with a small number of searches though the cost per click is high.

Therefore, any single conventional indicator such as the number of searches, the cost per click, and the competitiveness is not sufficient as a material of the search query selection. Therefore, in order to solve such problem, a new method for displaying a scale of a search economy for each search query is required in place of a method for individually displaying each of the conventional indicators. That is, the inventors have conceived of a need of a novel device capable of calculating and displaying an indicator of a new concept of "economic scale" that includes the conventional indicators (in other words, difficulty in determining magnitude of the economic scale from a commercial point of view only by taking the number of searches into consideration).

With such device, the search query with which the conventional indicators are higher in general has a larger value of the "economic scale", and this may be displayed in a higher rank. That is, the selector may concentrate, without individually paying attention to magnitude of each of the conventional indicators, on the search query or a search query group (to be described later) having a larger "economic scale", which is an inclusive concept of them, and may perform the search query selection work more intuitively and rationally.

Hereinafter, the first embodiment is specifically described with reference to the drawings, taking the search query selection in listing advertisement as an example. First, an outline of this embodiment is described.

As described above, in a case where the advertiser wishes to display the advertisement on the search result screen as illustrated in FIG. 1, the advertiser purchases the advertisement frame associated with the search query. That is, when proceeding with the search query selection work, the advertiser (servicer) often tries to visually find the search query considered to match advertiser's business purposes and products from an enormous number of search queries with which the searches might be performed in Japan and overseas, and utilizes the search-linked advertisement ordering tool released by major search engine companies in order to acquire reference information for that purpose.

Via such search-linked advertisement ordering tool, the number of searches, the cost per click, and the competitiveness for each search query are disclosed to the advertiser as illustrated in FIG. 2. Note that, the number of searches corresponds to the number of times the search is performed with the search query within a predetermined period. The cost per click corresponds to a fee that should be paid to the search service each time the displayed advertisement is clicked, and in a case where the advertisement is of a bid system, the cost per click for popular search query tends to be high. The competitiveness is the number of advertisers who intend to display the advertisement for the search query.

The advertiser determines the search query on the search result screen for which the advertisement is to be displayed (determines the advertisement frame to be purchased) with reference to the number of searches, the cost per click, and the competitiveness. However, just looking at each of the number of searches, the cost per click, and the competitiveness, the advertiser cannot know exactly the search query on the search result screen for which the advertisement is displayed with economical efficiency.

For example, at first glance, the search query with a large number of searches is expected to have a large number of potential demanders, so that it seems better to display the advertisement for such search query. However, actually, there are a significantly large number of people who search with the search query "weather forecast", for example, but such people are not highly motivated to buy something. Therefore, it is not economically effective to display the advertisement for the search query "weather forecast". In this manner, it is difficult to determine the search query for which the advertisement is displayed with economical efficiency on the basis of only the number of searches.

The search query with a high cost per click is expected to be a potential customer for which many advertisers intend to display the advertisement regardless of a high advertising fee, so that it seems better to display the advertisement for such search query. However, even if the cost per click is high, if a field thereof is niche and the number of searches is too small, a frequency of display of the advertisement is low, and as a result, the number of times the advertisement is clicked is reduced. Therefore, it is difficult to determine the search query for which the advertisement is displayed with economical efficiency on the basis of only the cost per click.

Moreover, a highly competitive search query is expected to be more attractive potential customer as more competitors compete fiercely, so that it seems better to display the advertisement for such search query. However, even if this is highly competitive, this might be the search query with an extremely small number of searches and an extremely low cost per click, and it is difficult to determine the search query for which the advertisement is displayed with economical efficiency on the basis of only the competitiveness.

In this manner, it is difficult to determine the search query on the search result screen for which the advertisement is displayed with economical efficiency with the conventional display device that allows viewing of each of the indicators such as the number of searches, the cost per click, and the competitiveness disclosed by the search-linked advertisement ordering tool (keyword advice tool). Due to these problems, it has not been possible to intuitively grasp or specify an appropriate search query only by displaying these indicators.

In contrast, the inventors of the present application conceived of the fact that, if a value obtained by multiplying the number of searches by the cost per click is defined as the "economic scale", the larger the economic scale of the search query, the larger the amount of moving money, so that it is economically effective to display the advertisement for such search query.

Moreover, they conceived of the fact that it is also economically effective to express the competitiveness numerically (the higher the competitiveness, the larger the number), and to make a value obtained by multiplying the number of searches, the cost per click, and the competitiveness the "economic scale". The reason why the economic scale in consideration of the competitiveness is effective is that, the larger the number of competing advertisers who participate in bidding, the more companies might consider the search query as a commercially attractive search query with high possibility, and with such search query, the cost per click tends to further increase or to decrease with difficulty over time.

Therefore, in this embodiment, the "economic scale" based on the number of searches and the cost per click (and further, the competitiveness as necessary) is calculated, and the search queries are displayed in order of the economic scale. Hereinafter, this is described in detail.

FIG. 3 is a block diagram illustrating a schematic configuration of an economic scale calculation system. The economic scale calculation system is provided with a search server 1 that provides the search service and an advertiser terminal 2 (economic scale output device) used by the advertiser, and they are connected to each other via a network.

The search server 1 includes a search means 11, a search number count means 12, an advertisement control means 13, and a charge means 14. A part or all of these means may be implemented by a processor of the search server 1 executing a predetermined program. The search server 1 may be distributed to a plurality of devices, and for example, the search means 11 and the advertisement control means 13 may be different devices.

The search means 11 performs a search in response to a search request from a user. Specifically, the search means 11 receives a search query from the user and returns a search result screen displaying search results corresponding to the search query to the user. The search query may be formed of one word or two or more words.

The search number count means 12 counts the number of searches performed within a predetermined period for each of the search queries. Then, the search number count means 12 notifies the advertisement control means 13 of a count result as the number of searches. The count result is stored in a storage device not illustrated as needed.

The advertisement control means 13 controls advertisement display on the search result screen. Specifically, the advertisement control means 13 transmits information on the number of searches, the cost per click, and the competitiveness to the advertiser terminal 2. The advertisement control means 13 receives in advance information indicating which advertisement is to be displayed for which search query from the advertiser terminal 2, and stores the same in a storage device not illustrated. Then, in a case where the search for the received search query is performed by the search means 11, the advertisement is displayed on the search result screen.

The charge means 14 charges the advertiser an amount corresponding to the cost per click each time the advertisement included in the search result screen is clicked.

The advertiser terminal 2 may be any computer such as a personal computer, a smartphone, a tablet, a smart glass, and a display device such as a VR screen. The advertiser terminal 2 includes an input interface 21 such as a mouse/keyboard and a touch pad, an output interface 22 such as a display and a speaker, and a controller 23.

The controller 23 includes an information acquisition means 231, an arithmetic means 232, an output means 233, and an advertisement setting means 234. A part or all of these means may be implemented by a processor of the advertiser terminal 2 executing a predetermined program.

The information acquisition means 231 acquires the information on the number of searches, the cost per click, and the competitiveness from the search server 1. The arithmetic means 232 calculates the economic scale on the basis of the acquired information. The output means 233 outputs the information on the number of searches, the cost per click, and the competitiveness for each search query, and the economic scale from the output interface 22. The advertisement setting means 234 performs setting as to which advertisement is to be displayed for which search query according to an operation of the advertiser, and transmits this setting to the advertisement control means 13 of the search server 1.

Figure 4A:
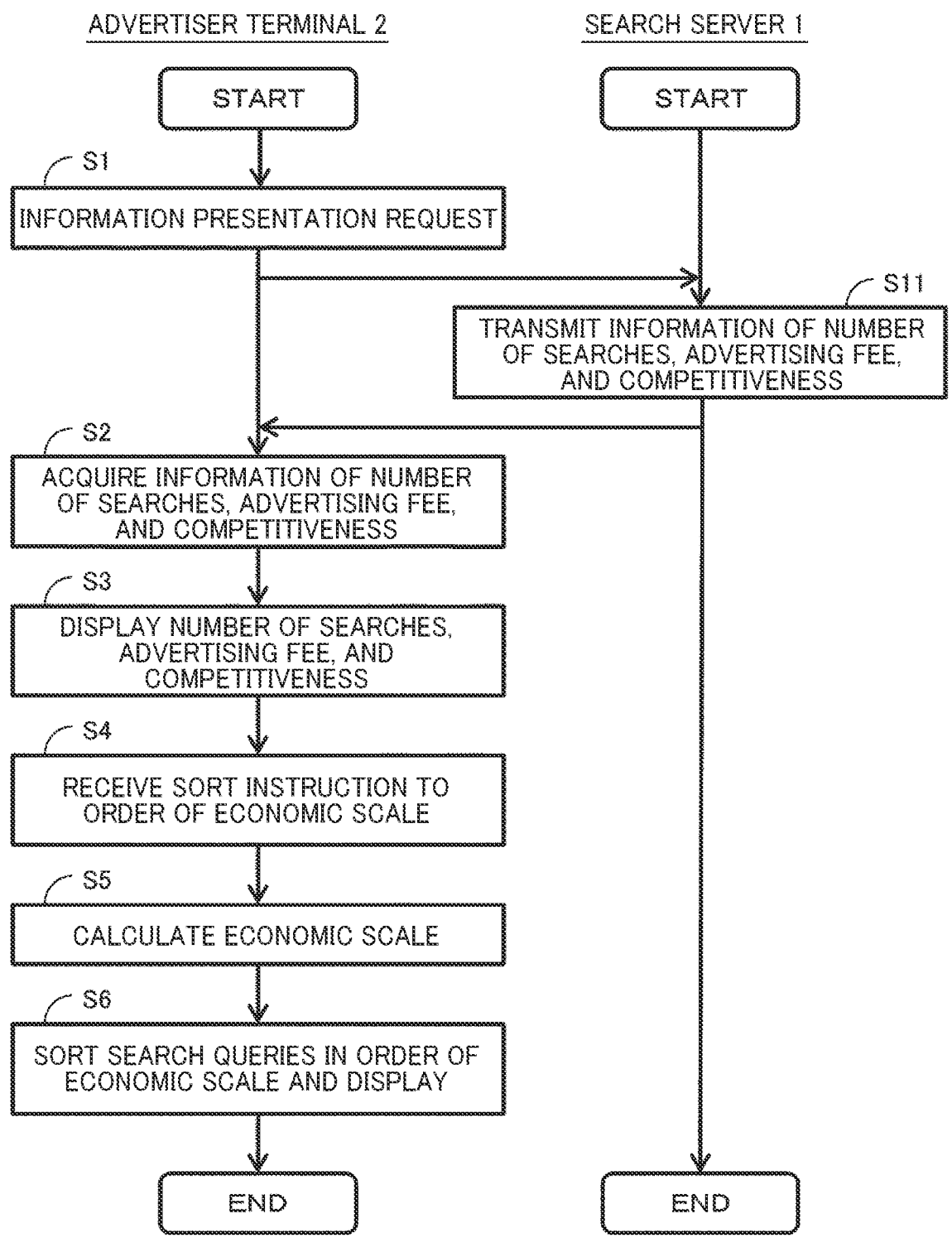
FIG. 4A is a sequence diagram illustrating an example of a processing operation of the economic scale calculation system according to a first embodiment.

FIG. 4A is a sequence diagram illustrating an example of a processing operation of the economic scale calculation system according to the first embodiment. The drawing illustrates a flow until the advertiser determines the search query for which the advertisement is to be displayed.

Detail of First Embodiment

First, the advertiser performs a predetermined operation on the input interface 21 of the advertiser terminal 2 in order to display the information on the number of searches, the cost per click, and the competitiveness on the display. In response to this predetermined operation, the information acquisition means 231 requests the search server 1 to present such information (step S1). In response to this request, the advertisement control means 13 of the search server 1 transmits the information on the number of searches, the cost per click, and the competitiveness to the advertiser terminal 2 (step S11). In a case where the advertisement is of a bid system, the cost per click may vary, and a low bid price zone and a high bid price zone may be defined.

Then, the information acquisition means 231 of the advertiser terminal 2 acquires the information on the number of searches, the cost per click, and the competitiveness (step S2). Subsequently, the output means 233 displays the number of searches, the cost per click, and the competitiveness for each search query (step S3).

FIG. 5A is a view illustrating an example of a screen of the number of searches, the cost per click, and the competitiveness for each search query displayed. Herein, order of the search queries may be any order; for example, this may be descending order of the number of searches, descending order of the cost per click, or alphabetical order or order according to Japanese syllabary of the search queries.

Subsequently, the advertiser terminal 2 receives an instruction from the user to sort the search queries in order of economic scale (step S4 in FIG. 4A). As a specific example, the screen in FIG. 5A includes a sort button 81, and when this button 81 is selected via the input interface 21, a sort instruction is received.

Then, the arithmetic means 232 calculates the economic scale on the basis of the number of searches, the cost per click, and the competitiveness. Specifically, the arithmetic means 232 calculates the economic scale by multiplying the number of searches, the cost per click, and the competitiveness (step S5). In a case where the cost per click includes the low bid price zone and the high bid price zone, either of them may be adopted, or an average value and the like may be adopted. In a case where the competitiveness is not expressed numerically, a numerical value corresponding to the competitiveness that increases as the competitiveness increases may be used. Subsequently, the output means 233 displays the search queries on the display in the order of the economic scale calculated by the arithmetic means 232 (step S6).

FIG. 5B is a view illustrating an example of a screen on which the search queries are arranged according to the economic scale. As illustrated in the drawing, the search queries are arranged in descending order of the economic scale. As necessary, economic scale ranking, the number of searches, the cost per click, and the competitiveness of each search query may be listed together.

Note that, it is only required that the economic scale of each search query be output, and a procedure thereof is not limited to that illustrated in FIG. 4A. For example, as illustrated in FIG. 4B, a part of the processing may be performed by the search server 1 in place of the advertiser terminal 2. That is, when the advertiser terminal 2 receives the instruction from the user to sort the search queries in order of the economic scale (step S4), the information acquisition means 231 requests the search server 1 to calculate the economic scale (step S4'). In response to this request, the advertisement control means 13 of the search server 1 calculates the economic scale and transmits the same to the advertiser terminal 2 (step S5'). Then, the information acquisition means 231 acquires the calculated economic scale (step S5"), and the output means 233 displays the search queries on the display in the order of the economic scale acquired by the information acquisition means 231 (step S6). As another method, the search server 1 may transmit data for displaying the screen on which the search queries are arranged in the order of the economic scale, and the output means 233 may display the same.

In this manner, in the first embodiment, the economic scale of the search query is aggregated, calculated, and outputted. Specifically, the search queries are displayed in the order of the economic scale. Therefore, the advertiser may easily determine which search query is economically effective for displaying the advertisement, and rationality and convenience of conventional complicated search marketing work and search word selection work are drastically improved. In addition, the advertiser may determine in a short time which search query is economically effective for displaying the advertisement, so that a display time of the screen as illustrated in FIG. 5B may be shortened and power consumption of the display may be reduced.

Moreover, according to the first embodiment, a large number of search queries may be presented to the advertiser in descending order of the expected economic scale. Therefore, this is also useful for the search service because a bidding behavior of more advertisers is promoted, leading to an increase in bid amount and an increase in the number of advertisers.

Second Embodiment

A second embodiment is a variation of the first embodiment. The first embodiment described above outputs the economic scale for each search query. In contrast, the second embodiment described next outputs an economic scale for each search query group, and displays the search query groups in order of the economic scale.

Herein, the search query group is a group of a plurality of search queries including a common word. For example, search queries 1 to 7 as illustrated in FIG. 5A are considered.

Search Query 1: Automobile
Search Query 2: Automobile Insurance
Search Query 3: Automobile Fuel economy
Search Query 4: Automobile Driving school
Search Query 5: Bicycle
Search Query 6: Bicycle Cycling course
Search Query 7: Bicycle Parts In this case, since the search queries 1 to 4 include a common word "automobile", one search query group "automobile" is formed of the search queries 1 to 4. Similarly, since the search queries 4 to 7 include a common word "bicycle", one search query group "bicycle" is formed of the search queries 4 to 7.

Hereinafter, a difference from the first embodiment is mainly described.

Figure 6:
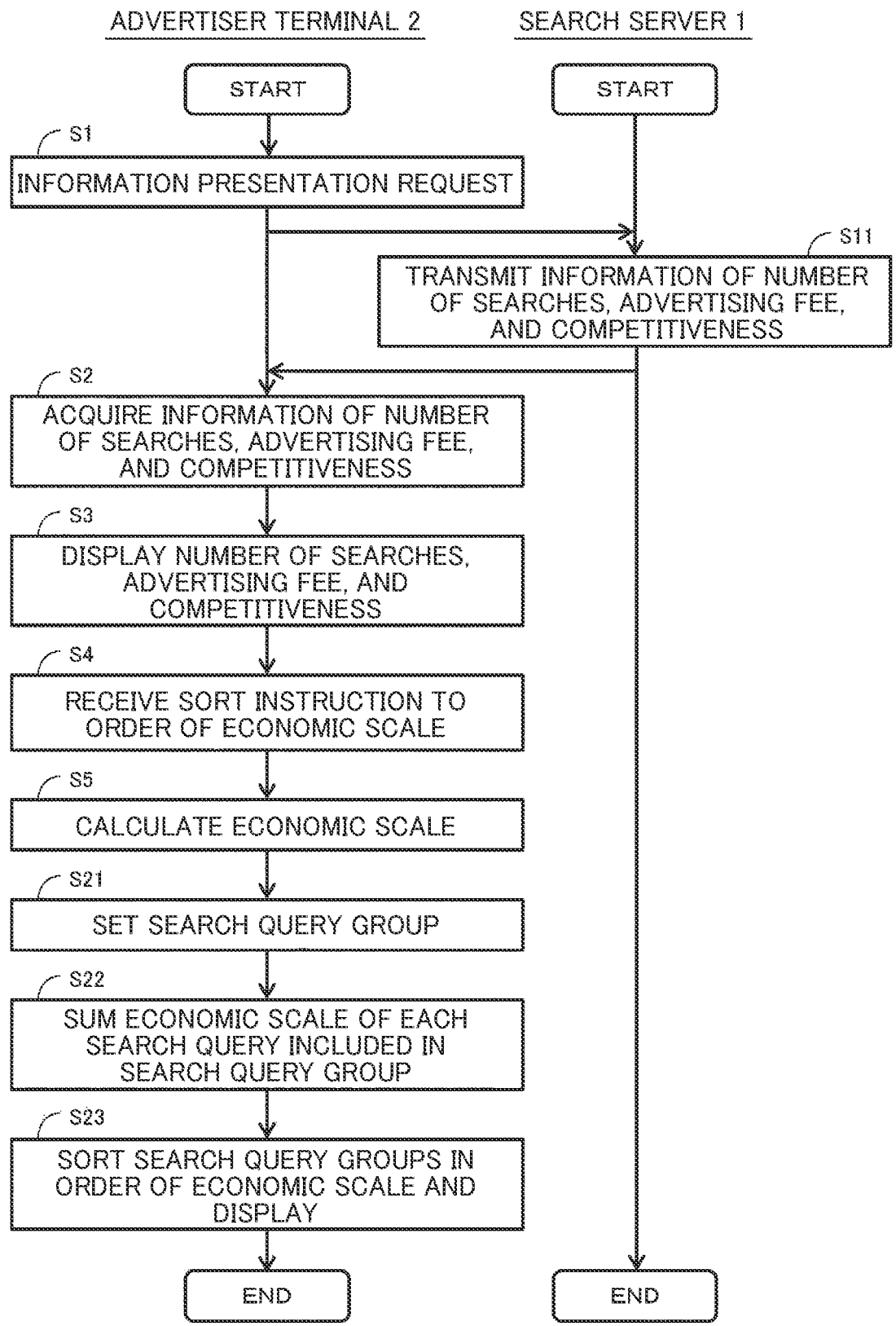
FIG. 6 is a sequence diagram illustrating an example of a processing operation of an economic scale calculation system according to a second embodiment.

FIG. 6 is a sequence diagram illustrating an example of a processing operation of an economic scale calculation system according to the second embodiment. Since steps S1 to S5 and S11 are common to those in FIG. 4A, the description thereof is omitted. After an arithmetic means 232 calculates the economic scale of each search query (step S5), the arithmetic means 232 sets the search query group (step S21). The search query group may be set by the arithmetic means 232 each time, or an already set search query group may be acquired.

Then, the arithmetic means 232 calculates the economic scale of the search query group by summing the economic scales of the respective search queries included in each search query group (step S22). Subsequently, the output means 233 displays the search query groups on the display in the order of the economic scale calculated by the arithmetic means 232 (step S23).

FIG. 7 is a view illustrating an example of a screen on which the search query groups are arranged according to the economic scale. As illustrated in the drawing, the search query groups are arranged in descending order of the economic scale (not in conventional SEO order (order displayed in search results)). The number of search queries included in the search query group and the total number of searches of the respective search queries included in the search query group may be listed together as needed. Note that, in this example, in order to simplify the description, the number of searches included in the search query group "automobile" is four (the above-described search queries 1 to 4), and the number of searches included in the search query group "bicycle" is three (the above-described search queries 5 to 7), but actually, one search query group might include tens to tens of thousands or more search queries.

Note that, it is only required that the economic scale of each search query group be output, and a procedure thereof is not limited to that illustrated in FIG. 6. For example, a part of the processing may be performed by the search server 1 in place of the advertiser terminal 2, the economic scale of each search query may be performed by the search server 1 as in FIG. 4B, the search server 1 may set the search query group, and the search server 1 may sum the economic scales of the respective search queries included in each search query group. As another method, the search server 1 may transmit data for displaying the screen on which the search query groups are arranged in the order of the economic scale, and the output means 233 may display the same.

In this manner, in the second embodiment, the economic scale of the search query group is outputted. Specifically, the search query groups are displayed in the order of the economic scale. Therefore, the economic scale of each industry may be easily grasped, and this becomes an indicator as to which industry is economically effective for placing the advertisement.

Note that, the output means 233 may switch between the display of the search queries in the order according to the economic scale (first embodiment) and the display of the search query groups in the order according to the economic scale (second embodiment) to display.

In the first and second embodiments described above, the economic scale is calculated on the basis of the number of searches, the cost per click, and the competitiveness. In contrast, the economic scale may be calculated in consideration of other factors. Hereinafter, some specific examples are described.

The economic scale of the search query may be obtained in consideration of a click rate supposed in a case where the advertisement is displayed on a search result screen for the search query. Specifically, a product of the number of searches, the cost per click, the competitiveness, and the click rate may be made the economic scale. The click rate may be a constant value independent from the search query, a value supposed for each search query, and a value supposed for each industry (for each search query group).

On the search result screen, there are various cases such as a case where the advertisement is displayed in an upper part and a case where the advertisement is displayed in a lower part. The click rate also depends on a display position. Therefore, the click rate may be a value according to the display position. In other words, the search query may take the position in which the advertisement is displayed on the search result screen into consideration.

Moreover, it is considered that the more the advertisements are displayed, the higher the click rate will be. Therefore, the click rate may be a value according to the number of displays. In other words, the search query may take the number of displayed advertisements on the search result screen into consideration.

The cost per click is not constant and might vary. In a case where the cost per click when actually clicked is not of normal distribution, it is better to assume a distribution model of a low bid price zone and a high bid price zone. Then, the economic scale may be defined in consideration of the low bid price zone and the high bid price zone.

Note that, in the above-described embodiment, the economic scale may at least take the number of searches and an advertising fee such as the cost per click into consideration, and may omit the consideration of the competitiveness. The number of searches may be the number of searches within a predetermined period or the accumulated number of searches. The advertising fee may be that related to the advertisement display on the search result screen, and may be a fee incurred for displaying the advertisement in addition to the cost per click incurred for each click.

If the advertisement is to be displayed on the search result screen provided by a specific search service (search server 1), the number of searches is desirably the number of searches in the specific search service; however, this may also be the number of searches in other search services.

Note that, the search query selection in listing advertisement is mainly described in the above-described embodiment, an application of the economic scale covers a wide range: a web businesses such as SEO countermeasures and webpage creation, and a real business such as selection of candidates for opening a store, selection of a product of which productivity and sales should be strengthened and a specification thereof, and there is no limitation as long as this is a range in which strategic suggestions may be acquired by knowing the economic scale of each word.

Next, third and fourth embodiments are described.

In order to improve convenience for website visitors, it is important what type of webpage group is used to form the website. Specifically, the webpages that include contents required by a searcher or have them as a subject are created without omission, and in each of these webpages, the contents are appropriately arranged in order of the number of searches and expected economic efficiency. Moreover, for the visitor who wants the details or related information of each of the contents, it is desirable that another webpage containing the details or related information (hereinafter, a related webpage) be created and a hyperlink targeted to each related webpage be set up in each content so that this may be easily started. For these related webpages, it is desirable to set up a hyperlink targeted to an original webpage so that it is possible to easily return to the original webpage that was browsed before the startup. A large number of complicated works as described above may be easily completed in a small-scale website with a few pages; however, in medium-scale and large-scale websites with hundreds, several thousands, and tens of thousands of webpages that have become mainstream these days, the number of webpages and an amount of contents to be considered are too large, so that the works are completed with difficulty. Specifically, this causes large inconvenience to the visitors because the webpages that should exist in the website lack, the contents that should exist in each created webpage lack, order of respective created contents is not the order based on actual demand trend and stream estimated from the number of searches and the magnitude of the economic scale, and the hyperlink to the related webpage that should be set in each content lacks.

Therefore, in the following, by utilizing the search trend, the webpage that should be included, the content that should be included in each webpage, and the related webpage as the target of the hyperlink that should be included in each content are determined, and the work thereof are supported.

Third Embodiment

In a third embodiment, arrangement of contents included in a webpage is automatically determined by utilizing a search trend.

In order to improve convenience for a reader of the webpage, it is important where on the webpage to arrange each content included in the webpage. Specifically, it is desirable to arrange a more important content economical efficiency of which is expected more in a more easily viewable position. Moreover, a degree of importance of each content in each webpage often changes over time. In such a situation, it is extremely difficult for a website creator to subjectively and accurately determine the arrangement of each content in each webpage, or to manually rearrange the content.

Therefore, in the third embodiment, a plurality of contents included in the webpage is automatically arranged as follows.

Outline of Third Embodiment

Figure 8:
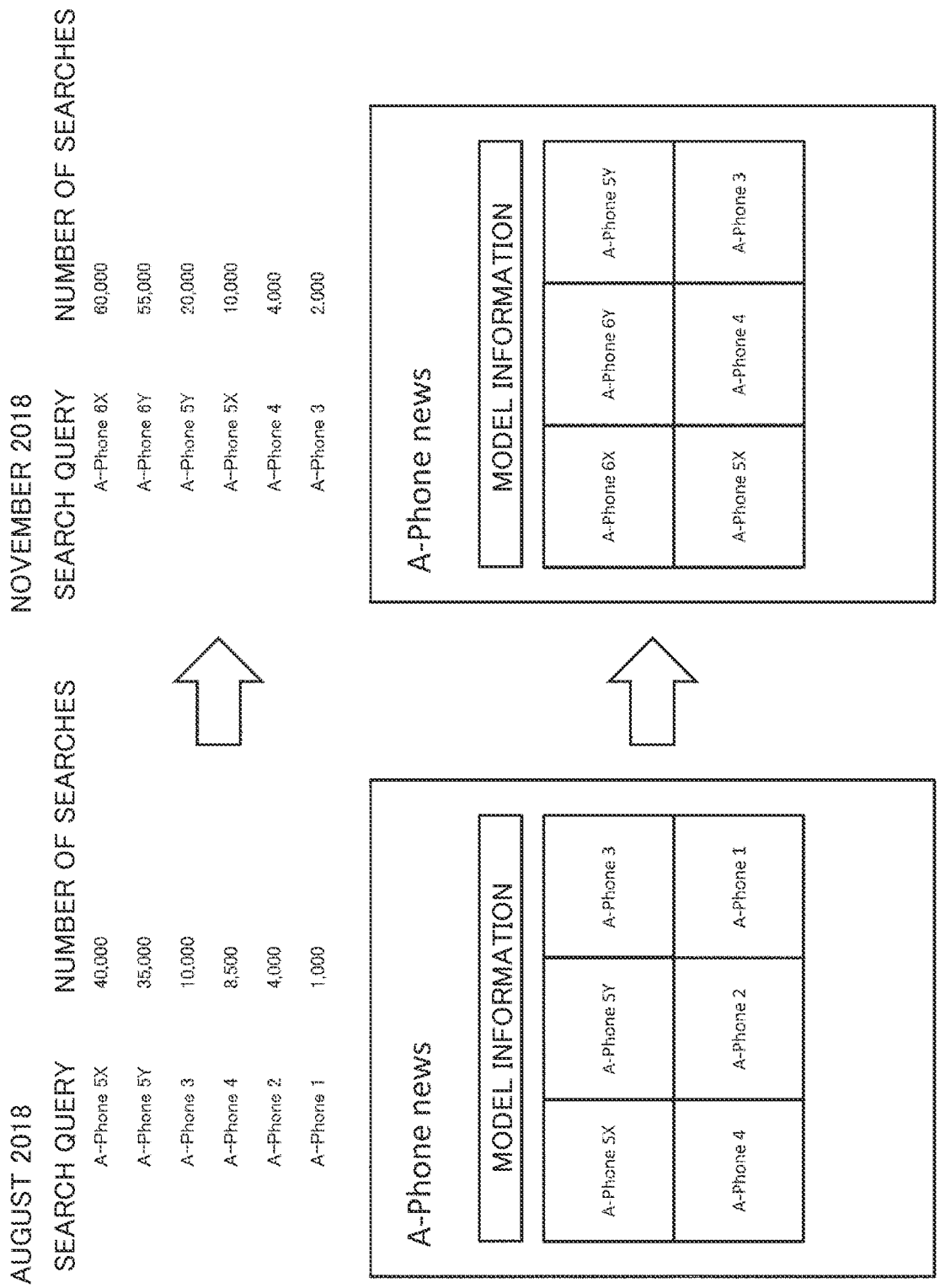
FIG. 8 is a view illustrating an outline of a third embodiment.

FIG. 8 is a view illustrating an outline of the third embodiment. In the drawing, a webpage that introduces smartphones under a brand name of "A-Phone" is illustrated. A model name of each smartphone is in a format of "A-Phone XXX", and alphanumeric characters are set in "XXX" according to selling time and model specifications. Then, in the webpage in FIG. 8, information of respective models is arranged in the webpage as contents.

The numbers of searches for search queries related to "A-Phone" in August 2018 are schematically illustrated in an upper left part of FIG. 8. The numbers of searches are in descending order of "A-Phone 5X", "A-Phone 5Y", "A-Phone 3", "A-Phone 4", "A-Phone 2", and "A-Phone 1".

In this case, in this embodiment, as illustrated in a lower left part of FIG. 8, model information of "A-Phone 5X" with the largest number of searches is arranged in the top left part of the webpage. Since "A-Phone 5X" is considered to be an important content with a large number of searches, this is arranged in the top left part, the most easily viewable position. Hereinafter, each model information is arranged from left to right and from top to bottom in the order of the number of searches. Then, "A-Phone 1" with the smallest number of searches is arranged in a bottom right part.

In contrast, the numbers of searches for the search queries related to "A-Phone" in November 2018 are schematically illustrated in an upper right part of FIG. 8. An example in which sales of "A-Phone 6X" and "A-Phone 6Y" is announced in October 2018, and the numbers of searches thereof rapidly increase is illustrated.

In this case, in this embodiment, as illustrated in a lower right part of FIG. 8, model information of "A-Phone 6X" with the largest number of searches is arranged in the top left part of the webpage. Hereinafter, each model information is arranged from left to right and from top to bottom in the order of the number of searches.

As is understood by comparing the lower left webpage and the lower right webpage in FIG. 8, an arrangement position of the information of each model is changed according to the number of searches. In this manner, in this embodiment, each content is automatically arranged according to the search trend such as the number of searches or the economic scale. Hereinafter, this is more specifically described.

[Configuration of Content Arrangement System]

Figure 9:
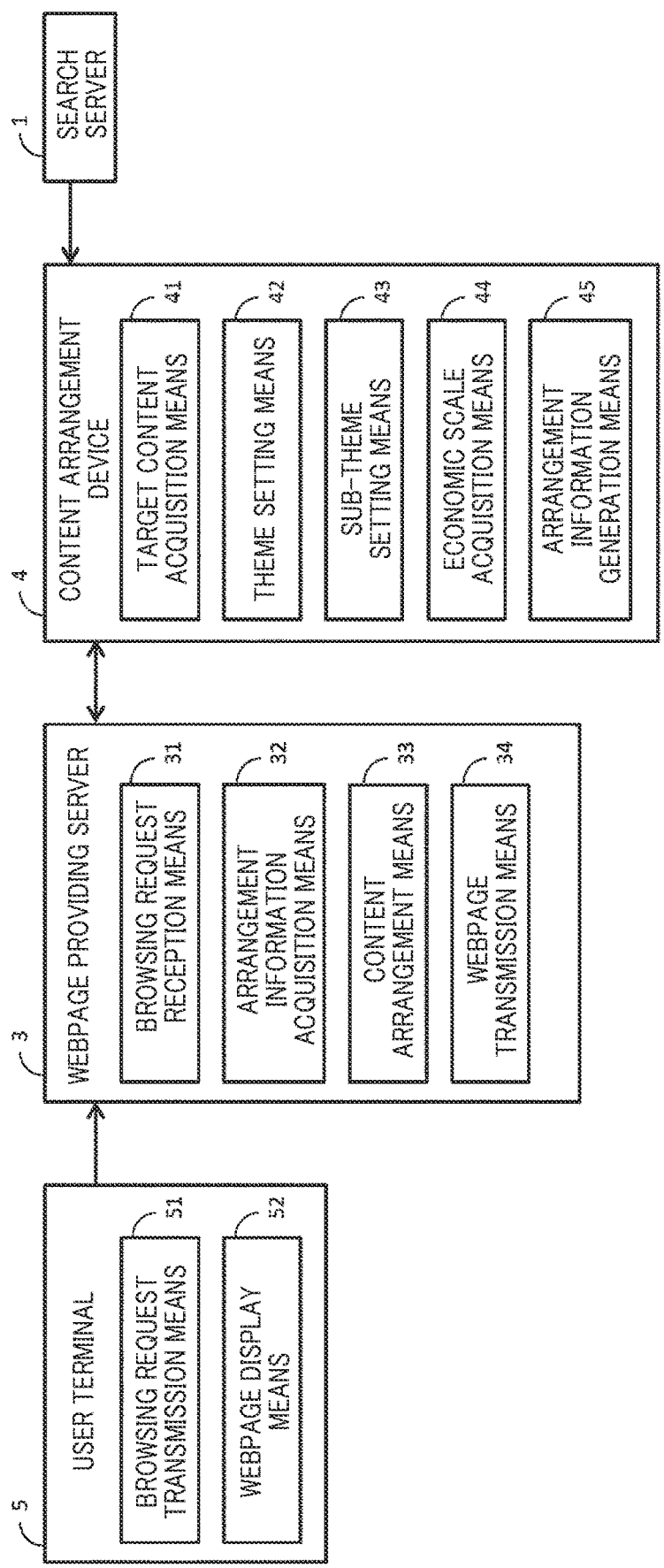
FIG. 9 is a block diagram illustrating a schematic configuration of a content arrangement system according to the third embodiment.

FIG. 9 is a block diagram illustrating a schematic configuration of a content arrangement system according to the third embodiment. The content arrangement system includes a webpage providing server 3 and a content arrangement device 44. Note that, a user terminal 5 that accesses the webpage providing server 3 includes, for example, a browsing request transmission means 51 and a webpage display means 52 formed of a web browser.

The webpage providing server 3 provides a webpage including a plurality of contents in response to a request from the browsing request transmission means 51 of the user terminal 5, and includes a browsing request reception means 31, an arrangement information acquisition means 32, a content arrangement means 33, and a webpage transmission means 34. A part or all of these means may be implemented by a processor of the webpage providing server 3 executing a predetermined program. The webpage providing server 3 may also be distributed to a plurality of devices.

The browsing request reception means 31 receives a browsing request for a webpage (hereinafter, also referred to as a "target webpage") from the user terminal 5 via the network. The arrangement information acquisition means 32 acquires arrangement information indicating the arrangement of each content (item) included in the target webpage from the content arrangement device 4. The content arrangement means 33 arranges each content in the target webpage on the basis of the arrangement information. The webpage transmission means 34 transmits information for browsing the target webpage in which each content is arranged in an appropriate position to the user terminal 5. As a result, the webpage is displayed by the webpage display means 52 of the user terminal 5.

The content arrangement device 4 is configured to determine the arrangement of each content that should be included in the target webpage and generate the arrangement information, and includes a target content acquisition means 41, a theme setting means 42, a sub-theme setting means 43, an economic scale acquisition means 44, and an arrangement information generation means 45. A part or all of these means may be implemented by a processor of the content arrangement device 4 executing a predetermined program. The content arrangement device 4 may also be distributed to a plurality of devices.

The target content acquisition means 41 acquires a plurality of contents (hereinafter, also referred to as "target contents") to be arranged in the target webpage. The theme setting means 42 sets a theme as a criterion for arranging the target contents in the target webpage. The sub-theme setting means 43 sets a sub-theme used for determining the arrangement position individually for each target content. The economic scale acquisition means 44 acquires the economic scale of each target content from, for example, a search server on the basis of the sub-theme set for each target content. The arrangement information generation means 45 determines the arrangement of each target content in the target webpage according to the economic scale of each target content, and generates the arrangement information.

[Detail of Content Arrangement Device 4]

Hereinafter, each means in the content arrangement device 4 is described in detail.

[Target Content Acquisition Means 41]

The target content acquisition means 41 acquires a plurality of target contents to be arranged in the target webpage. Each target content is, for example, the model information and the like such as "A-Phone 5X" and "A-Phone 5Y" in FIG. 8. The target content acquisition means 41 may be provided with the target content from, for example, the webpage providing server 3, or may acquire an appropriate target content from the search server. Note that, all the contents that may be represented by html tags (for example, character string, link, image, moving image, table, combination thereof, and any other contents that may be represented by div tags) may be the targets of arrangement.

[Theme Setting Means 42]

Next, the theme setting means 42 is described. The theme setting means 42 sets the theme as the criterion for arranging the target contents in the webpage. The theme is, for example, "A-Phone" illustrated in FIG. 8, which is common to all the target contents. Since the theme is the criterion for arranging the target contents, even when the target contents are common, the arrangement of the target contents might change when the theme changes. Note that, in a case where the criterion is not required, it is possible not to set the theme.

There are various possible theme setting targets.

For example, the theme setting means 42 may set the theme for a single webpage or a plurality of webpages having a common domain.

The theme setting means 42 may also set the theme for an inflow route to the target webpage (for example, from which search word the target webpage is accessed, from which link it flows in the target webpage). This makes it possible to determine the arrangement position that matches search needs better. As an example, it is conceivable to change the theme between a case where an inflow to a certain webpage is from a search word "indirect lighting" and a case where an inflow and access in large quantity is from a search word "lighting".

Alternatively, the theme setting means 42 may set the theme for information of a reader of the target webpage (for example, attributes such as a buying history, a purchase history, age and sex of the reader). As a result, the arrangement position suitable for the reader may be determined. As an example, in a webpage that introduces fashion, in a case where the reader is a man, the theme may be "men's fashion", and in a case where the reader is a woman, the theme may be "ladies' fashion". The theme setting means 42 may also set the theme for a combination of the inflow route and the reader information.

There are various possible theme setting methods.

For example, the theme setting means 42 may set the theme on the basis of manual setting by an operator of the content arrangement device 4. As an example, a word (core word) commonly included in a plurality of search queries may be made the theme. For example, in a case where the search queries are "job change"
"job change site"
"pharmacist job change", and
"job change agent",
the core word is "job change". The core word is not limited to one word, and may be a plurality of words.

The theme setting means 42 may receive necessary information from the webpage providing server 3 or the search server 1 and set the theme semi-automatically or automatically. Specific examples are described below.

The theme setting means 42 may set one or two or more themes in advance in a label, and set the theme semi-automatically by assigning the label to the target webpage. This is efficient in a case of setting the common theme for a plurality of webpages.

The theme setting means 42 may automatically set the theme on the basis of meta information of the target webpage. For example, the theme setting means 42 may make the theme having "keywords" in a meta tag in head tags as a core word group in the target webpage described in HTML language, or estimate the theme by performing natural language processing on "description". For this estimation, for example, deep learning may be used, or a word weight by TF-IDF and the like may be calculated and an important word may be made the theme.

The theme setting means 42 may automatically set the theme on the basis of the target webpage. For example, the theme setting means 42 may estimate the theme by performing natural language processing on a text document in the target webpage described in HTML language. For this estimation, for example, deep learning may be used, or a word weight by TF-IDF and the like may be calculated and an important word may be made the theme.

The theme setting means 42 may automatically set the theme using search information, and may make, for example, the search query with which the target webpage (or a domain of the webpage) is in the highest rank in the search results the theme. In this case, it is possible to determine the theme to be set by using the economic scale of the search query group including the core word as a weight.

The theme setting means 42 may automatically set the theme on the basis of the inflow route to the target webpage. For example, the theme setting means 42 may make the search query with the largest number of inflows to the target webpage the theme, or may set the theme from the contents of a link source with a large number of inflows to the target webpage.

[Sub-Theme Setting Means 43]

The sub-theme setting means 43 sets a sub-theme used for determining the arrangement position individually for each target content. The sub-theme is, for example, "5X", "5Y", "3" and the like illustrated in FIG. 8. The sub-theme may also be said to be a label assigned to the target content for automatically arranging each target content on the basis of the theme. The sub-theme includes one or more words, and each target content is associated with a specific search query by the sub-theme. For example, the sub-theme "5X" associates the model information (content) of "A-Phone 5X" with the search query "A-Phone 5X". The arrangement position of each target content is determined on the basis of the search query associated with each target content.

There are various possible sub-theme setting targets. For example, a global navigation item, a side menu item, a related article, an article list, and an in-site search result in the webpage may be made the sub-theme setting targets.

There are various possible sub-theme setting methods.

The sub-theme setting means 43 may set the sub-theme on the basis of manual setting by the operator of the content arrangement device 4.

For example, in a case where the theme is set, the sub-theme setting means 43 may make a word obtained by removing the theme from the search query group including the theme (for example, in a case where the theme is "A-Phone" as illustrated in FIG. 8, "5X", "5Y", and "3" other than this) the sub-theme. In other words, the word that becomes the search query when being combined with the theme may be used as the sub-theme. In a case where the theme is the core word, the sub-theme may be said to be obtained by removing the core word from the search query.

In a case where the theme is not set, the sub-theme setting means 43 may make an entire search query (for example, "A-Phone 5X", "A-Phone 5Y", "A-Phone 3" and the like illustrated in FIG. 8) the sub-theme.

As a setting method, the sub-theme may be set for the target content on the CMS, or may be set as an attribute of the html tag. As is the case with the theme, the sub-theme setting means 43 may set the sub-theme semi-automatically using the label.

The sub-theme setting means 43 may estimate the theme by performing natural language processing on attribute information and the text document of the html tag corresponding to the target content (for example, A tag in a case where the target content includes a link). Moreover, in a case where the target content includes the link, the sub-theme setting means 43 may set the sub-theme by processing the meta information of the link destination in a manner similar to that of the theme. Moreover, similarly to the theme setting means 42, the sub-theme setting means 43 may automatically set the sub-theme on the basis of the search information of the link destination and the inflow route of the link destination.

[Economic Scale Acquisition Means 44]

The economic scale acquisition means 44 acquires the economic scale of each target content from, for example, the search server 1 on the basis of the sub-theme set for each target content. As a specific example, first, the economic scale acquisition means 44 acquires the search query associated with each target content by the sub-theme. Thereafter, the economic scale acquisition means 44 acquires the economic scale according to the search trend of the search query. The associated search query is, for example, the sub-theme itself. The associated search query may be the tag itself set in advance in the content or that based on the tag. Alternatively, what is associated is not limited to the word set in advance such as the sub-theme and the tag, and may be one automatically assigned to the content. As a specific example, the associated search query may be, in a case where the content is a photograph, the search query based on a word (term, word, or phrase) assigned after analyzing the photograph by AI.

Note that, in a case where the theme is set, the economic scale acquisition means 44 may acquire the economic scale of each target content on the basis of the theme and the sub-theme. The associated search query in this case is, for example, the search query including the theme and the sub-theme.

The economic scale may be the economic scale described in the first and second embodiments. That is, the economic scale may be based on at least one of the number of times it is searched with the search query within a predetermined period in the search server, a change thereof, the advertising fee related to the advertisement display on the search result screen for the search query provided by the search server, a change thereof, the competitiveness of the search query in the search server, and a change thereof.

The economic scale acquisition means 44 may acquire the information on the number of searches, the advertising fee, and the competitiveness from the search server 1 and calculate the economic scale from the same. Alternatively, the economic scale acquisition means 44 may acquire the economic scale calculated by another device such as the search server. In addition, the method described in the first and second embodiments may be applied to acquire the economic scale.

Moreover, the economic scale may take a degree of relevance of the sub-theme in the search result of the search query corresponding to the theme and a change thereof into consideration.

The search trend such as the number of searches, the advertising fee, and the competitiveness, or the economic scale based on the search trend are significantly related to each target content, and may be said to indicate importance of each target content associated by the sub-theme. By utilizing this, in this embodiment, each target content may be arranged in an appropriate position in the target webpage.

In addition to/in place of the search trend, the economic scale may depend on at least one of the number of clicks, a conversion rate, the number of conversions, and sales scale in the webpage.

[Arrangement Information Generation Means 45]

The arrangement information generation means 45 determines the arrangement of each target content in the target webpage according to the economic scale of each target content, and generates the arrangement information. As an example, the arrangement information generation means 45 determines priority of each target content in descending order of the economic scale, and generates arrangement information indicating the priority of each target content. The arrangement information may be the economic scale of each target content itself. Alternatively, the arrangement information generation means 45 may determine the arrangement position of each target content in the target webpage (where to arrange the same in the webpage) in the descending order of the economic scale, and generate the arrangement information indicating the arrangement position of each target content.

On the basis of such arrangement information, the content arrangement means 33 of the webpage providing server 3 arranges each target content in the target webpage.

For example, the content arrangement means 33 arranges the target content having higher priority or larger economic scale in a more easily viewable position in the target webpage. Note that, in many linguistic areas, it may be said that an upper part in the webpage is a more easily viewable position, and if the vertical position is the same, a left side is a more easily viewable position (so-called Z-type or F-type). In contrast, in Arabic-speaking countries, if the vertical position is the same in the webpage, a right side might be a more easily viewable position. Therefore, it is preferable to set in advance or manually set the position in which the target content is arranged according to the priority.

In a case where the arrangement information indicates the arrangement position, the content arrangement means 33 arranges each target content in the arrangement position indicated by the arrangement information in the target webpage.

As described above, the target webpage in which each target content is appropriately arranged is displayed on the user terminal 5. Note that, the content may be anything as long as this is to be arranged in the webpage, and may be a still image such as a photograph, a moving image, a table of contents or a menu, a list, or a term listed in a sentence.

[Implementation Example and Operation Sequence of Content Arrangement System]

There are various possible specific implementation examples of the content arrangement system.

For example, the arrangement information generating means 45 may update the arrangement information at any timing. For example, the arrangement information generation means 45 may update each time there is a browsing request of the target webpage from the user terminal 5, update in response to a manual request from the operator of the webpage providing server 3 or the content arrangement device 4, or update with a specific event occurrence as a trigger.

The arrangement information generated by the arrangement information generation means 45 may be stored in the content arrangement device 4, in the webpage providing server 3, or in the user terminal 5 (for example, a web browser cache).

Moreover, at least a part of each means in the content arrangement device 4 may be provided in the webpage providing server 3 or may be provided in the user terminal 5. Similarly, at least a part of each means in the webpage providing server 3 may be provided in the content arrangement device 4, or may be provided in the user terminal 5.

Some implementation examples of the content arrangement system taking into consideration the above are described.

Figure 10:
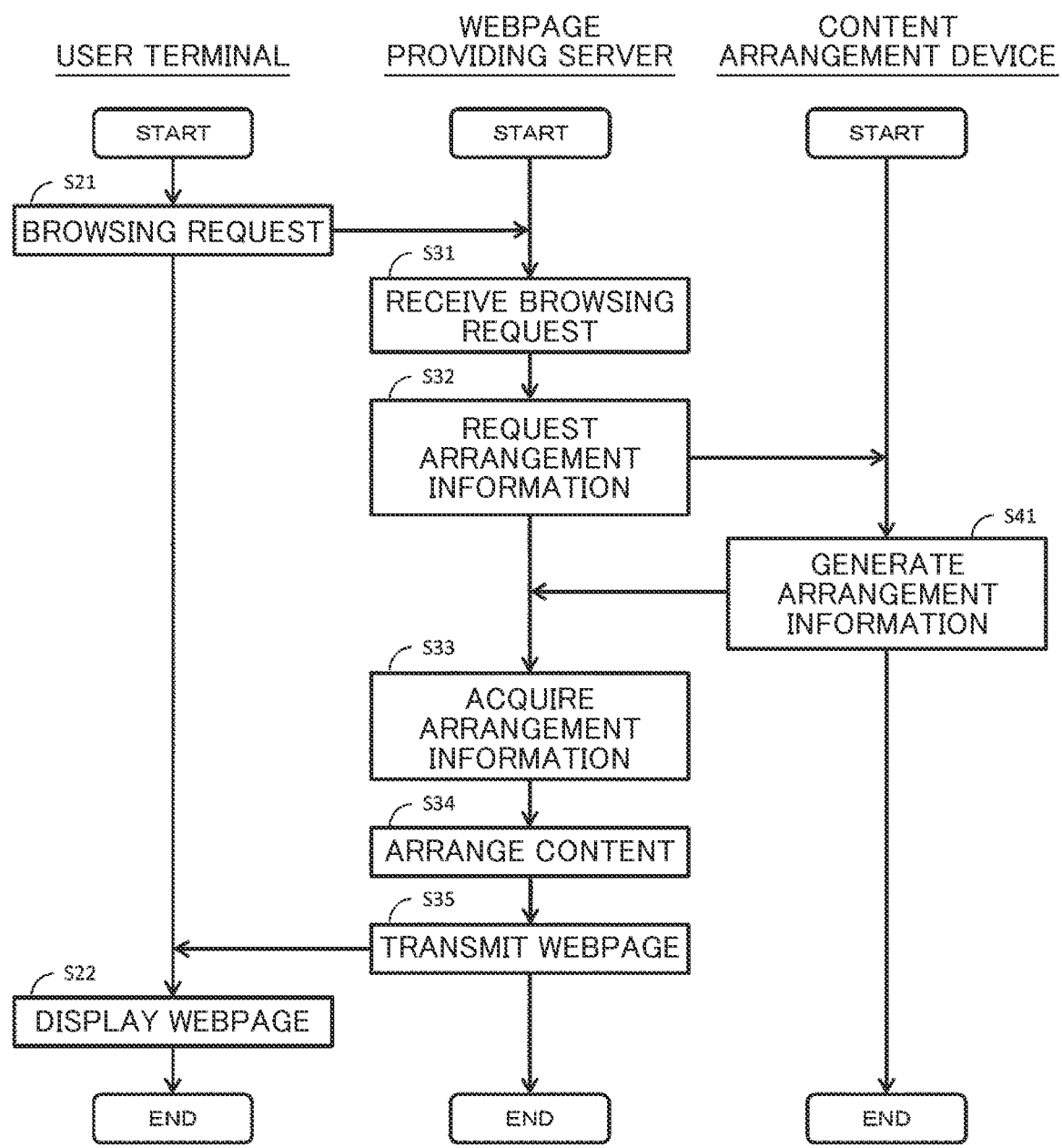
FIG. 10 is a sequence diagram illustrating an example of a processing operation in the content arrangement system in FIG. 9.

FIG. 10 is a sequence diagram illustrating an example of a processing operation in the content arrangement system in FIG. 9. The drawing is an example in which the arrangement information is updated each time there is the browsing request of the target webpage from the user terminal 5.

The browsing request reception means 31 of the webpage providing server 3 receives the browsing request (step S21) of the target webpage transmitted from the browsing request transmission means 51 of the user terminal 5 (step S31). In response to this, the arrangement information acquisition means 32 requests the arrangement position information from the content arrangement device 4 (step S32).

In response to this request, each means of the content arrangement device 4 operates, the arrangement information generation means 45 generates the arrangement information, and transmits the same to the webpage providing server 3 (step S41).

As a result, the arrangement information acquisition means 32 of the webpage providing server 3 acquires the arrangement information from the content arrangement device 4 (step S33). Then, the content arrangement means 33 arranges the target content in the target webpage on the basis of the arrangement information (step S34). Next, data for displaying the target webpage in which the target content is arranged is transmitted to the user terminal 5 by the webpage transmission means 34 (step S35). As a result, the webpage display means 52 of the user terminal 5 displays the target webpage in which the target content is arranged according to the arrangement information (step S22).

According to this aspect, if the theme and the sub-theme are set, the arrangement of the target content might change each time the user terminal 5 displays the target webpage.

Figure 11A:
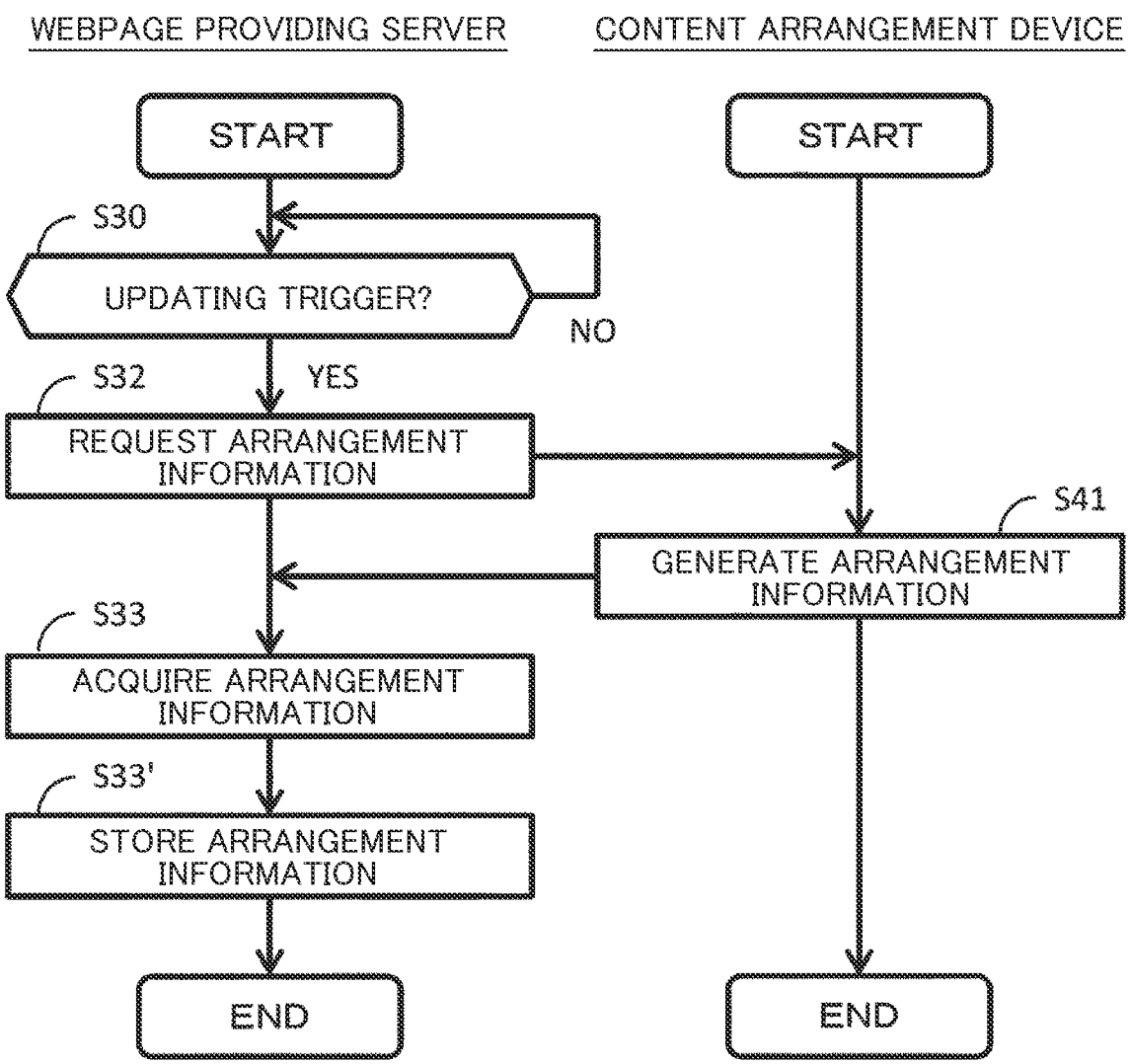
FIG. 11A is a sequence diagram illustrating another example of the processing operation in the content arrangement system in FIG. 9.

FIGS. 11A and 11B are sequence diagrams illustrating another example of the processing operation in the content arrangement system in FIG. 9. The drawing illustrates an example in which the arrangement information is updated according to an updating trigger issued to the webpage providing server 3 at a predetermined timing. Note that, in FIG. 11A and FIG. 11B, the same step name is given to the same processing as that in FIG. 10.

FIG. 11A illustrates update processing of distribution information. First, the arrangement information acquisition means 32 of the webpage providing server 3 determines whether there is the updating trigger indicating an update timing of the distribution information (step S30).

The updating trigger may be periodically issued by the arrangement information acquisition means 32. In this case, the distribution information is updated periodically.

The updating trigger may be issued in response to a manual request from the operator of the webpage providing server 3 at any timing. In this case, the distribution information is updated at any timing set by the operator of the webpage providing server 3.

Moreover, the updating trigger may be issued in response to detection of an event by an event detector not illustrated. In this case, the distribution information is updated each time the event is detected. The event is, for example, a large change in the number of searches or the economic scale that might be acquired from the search server 1. Since it is highly possible that the search needs change at the time of a large change in the number of searches and economic scale, it is possible to update the distribution information at an optimal timing while suppressing a processing load in the webpage providing server 3 and the content distribution device 4 by updating the distribution information at such timing. As another example of the event, this may be the timing when the webpage in which the content is arranged is changed, and this timing may be grasped by the webpage providing server 3 itself.

In a case where there is the updating trigger (YES at step S30), the arrangement information acquisition means 32 requests the arrangement position information from the content arrangement device 4 (step S32). In response to this request, each means of the content arrangement device 4 operates, the arrangement information generation means 45 generates the arrangement information, and transmits the same to the webpage providing server 3 (step S41). As a result, the arrangement information acquisition means 32 of the webpage providing server 3 acquires the arrangement information from the content arrangement device 4 (step S33). Then, the arrangement information acquisition means 32 stores the arrangement information in a memory in the webpage providing server 3 (or accessible by the webpage providing server 3) (step S33').

FIG. 11B illustrates the arrangement of the target content and the webpage display processing. The browsing request reception means 31 of the webpage providing server 3 receives the browsing request (step S21) of the target webpage transmitted from the browsing request transmission means 51 of the user terminal 5 (step S31). In response to this, the arrangement information acquisition means 32 reads and acquires the arrangement position information stored in the memory (step S33"). Then, the content arrangement means 33 arranges the target content in the target webpage on the basis of the arrangement information (step S34). Next, data for displaying the target webpage in which the target content is arranged is transmitted to the user terminal 5 by the webpage transmission means 34 (step S35). As a result, the webpage display means 52 of the user terminal 5 displays the target webpage in which the target content is arranged according to the arrangement information (step S22).

Figure 12:
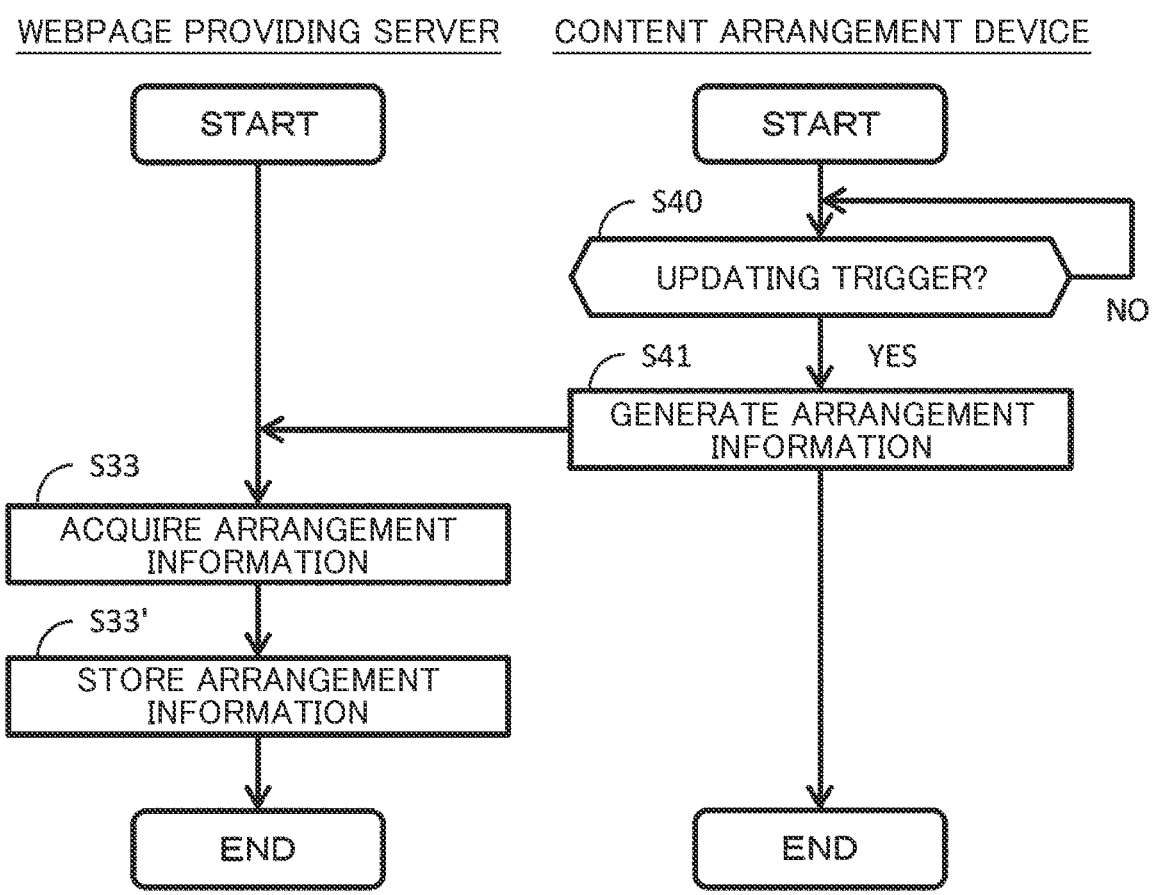
FIG. 12 is a sequence diagram illustrating another example of the processing operation in the content arrangement system in FIG. 9.

FIG. 12 is a sequence diagram illustrating another example of the processing operation in the content arrangement system in FIG. 9. The drawing illustrates an example in which the arrangement information is updated according to the updating trigger issued to the content arrangement device 4 at a predetermined timing. Note that, in FIG. 12, the same step name is given to the same processing as that in FIGS. 10 and 11A.

FIG. 12 illustrates update processing of distribution information. First, the arrangement information generation means 45 of the content arrangement device 4 determines whether there is the updating trigger indicating the update timing of the distribution information (step S40).

The updating trigger may be periodically issued by the arrangement information generation means 45. In this case, the distribution information is updated periodically.

The updating trigger may also be issued in response to a manual request from the operator of the content arrangement device 4 at any timing. In this case, the distribution information is updated at any timing set by the operator of the content distribution device 4.

Moreover, the updating trigger may be issued in response to detection of an event by an event detector not illustrated. In this case, the distribution information is updated each time the event is detected.

In a case where there is the updating trigger (YES at step S40), each means of the content arrangement device 4 operates, the arrangement information generation means 45 generates the arrangement information, and transmits the same to the webpage providing server 3 (step S41). As a result, the arrangement information acquisition means 32 of the webpage providing server 3 acquires the arrangement information from the content arrangement device 4 (step S33). Then, the arrangement information acquisition means 32 stores the arrangement information in a memory in the webpage providing server 3 (or accessible by the webpage providing server 3) (step S33').

Note that, since the arrangement of the target content and the webpage display processing are similar to those in FIG. 11B, the description thereof is omitted.

Figure 13:
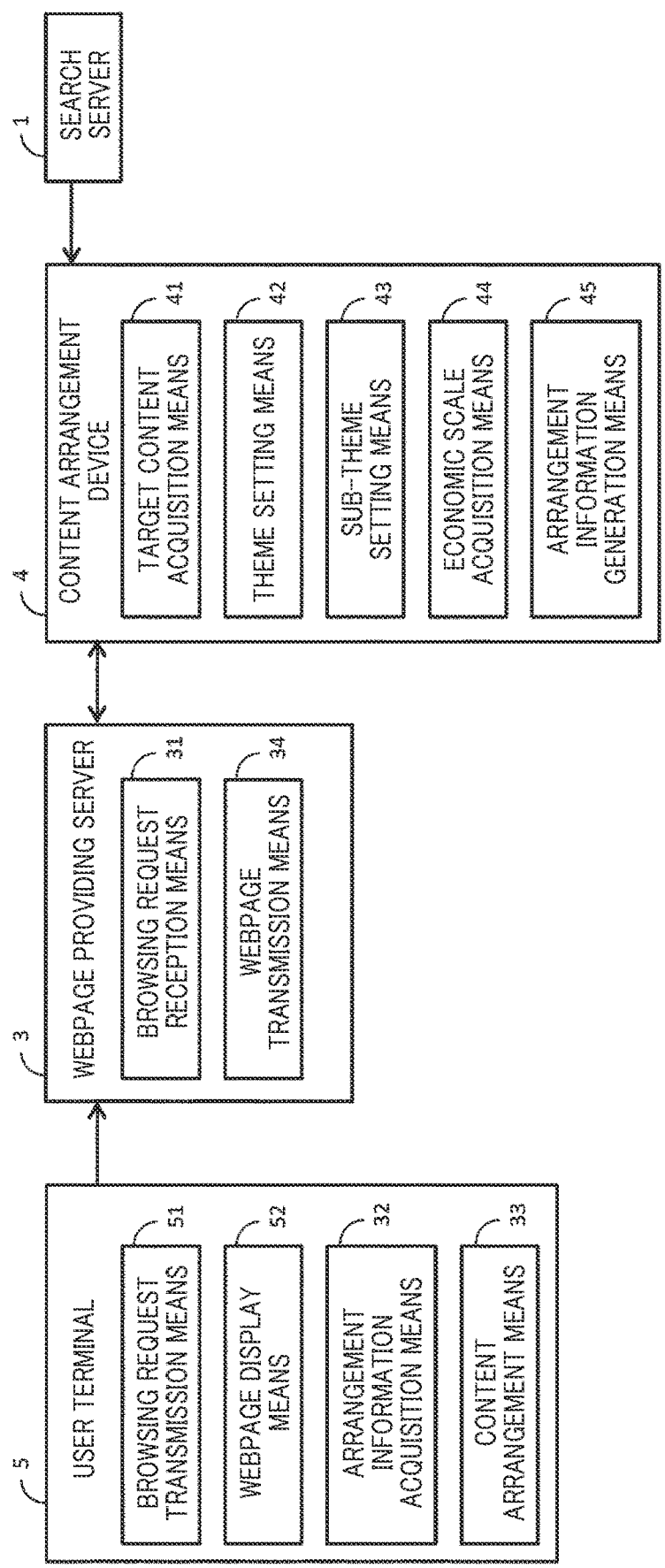
FIG. 13 is a block diagram illustrating a schematic configuration of a content arrangement system that is a variation of FIG. 9.

FIG. 13 is a block diagram illustrating a schematic configuration of a content arrangement system that is a variation of FIG. 9. The same functional block as that in FIG. 9 is assigned with the same reference numeral, and basically performs the similar operation. As a difference from FIG. 9, the user terminal 5 in FIG. 13 is provided with the arrangement information acquisition means 32 and the content arrangement means 33. This is an example in which the arrangement information acquired by the arrangement information acquisition means 32 is stored in the user terminal 5, and the content arrangement means 33 of the user terminal 5 arranges the target content in the target webpage. The arrangement information acquisition means 32 and the content arrangement means 33 may be functions of the web browser.

Figure 14:
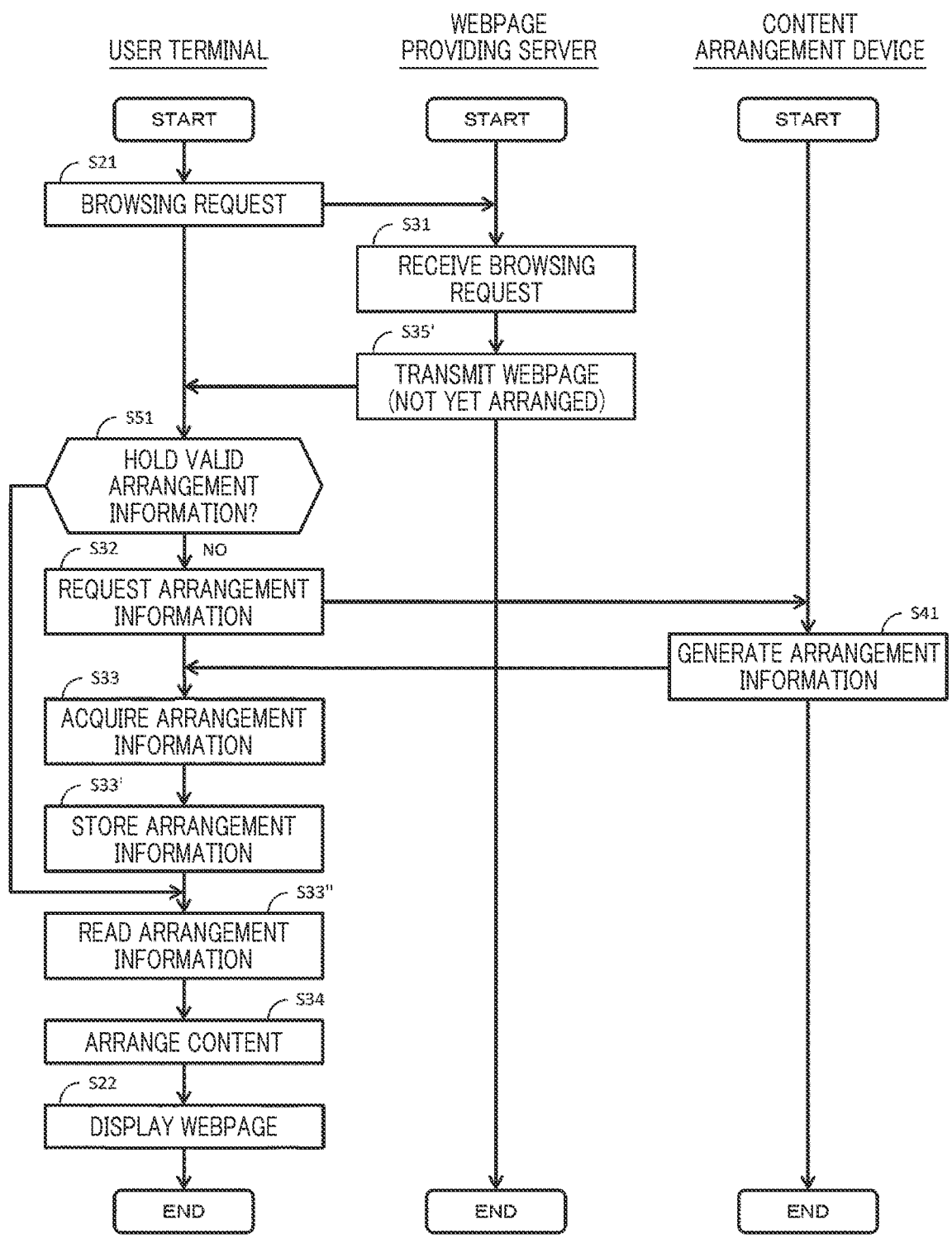
FIG. 14 is a sequence diagram illustrating an example of a processing operation in the content arrangement system in FIG. 13.

FIG. 14 is a sequence diagram illustrating an example of a processing operation in the content arrangement system in FIG. 13.

The browsing request reception means 31 of the webpage providing server 3 receives the browsing request (step S21) of the target webpage transmitted from the browsing request transmission means 51 of the user terminal 5 (step S31). In response to this, data for displaying the target webpage is transmitted to the user terminal 5 by the webpage transmission means 34 (step S35'). However, in this data, it is possible that the target content is not arranged in the target webpage.

Next, the arrangement information acquisition means 32 of the user terminal 5 determines whether this holds valid arrangement information (step S51). In a case where no valid arrangement information is held (NO at step S51), the arrangement information acquisition means 32 requests the arrangement position information from the content arrangement device 4 (step S32). Note that, a case where no valid arrangement information is held is, for example, a case where the arrangement information is not received in the first place, or a case where the arrangement information a predetermined expiration date of which has passed is held. In response to the request at step S32, each means of the content arrangement device 4 operates, the arrangement information generation means 45 generates the arrangement information, and transmits the same to the user terminal 5 (step S41).

As a result, the arrangement information acquisition means 32 of the user terminal 5 acquires the arrangement information from the content arrangement device 4 (step S33). Then, the arrangement information acquisition means 32 stores the arrangement information in the memory in the user terminal 5 (step S33').

Then, the arrangement information acquisition means 32 reads and acquires the arrangement position information stored in the memory (step S33"). Then, the content arrangement means 33 arranges the target content in the target webpage on the basis of the arrangement information (step S34). As a result, the webpage display means 52 of the user terminal 5 displays the target webpage in which the target content is arranged according to the arrangement information (step S22).

Figure 15:
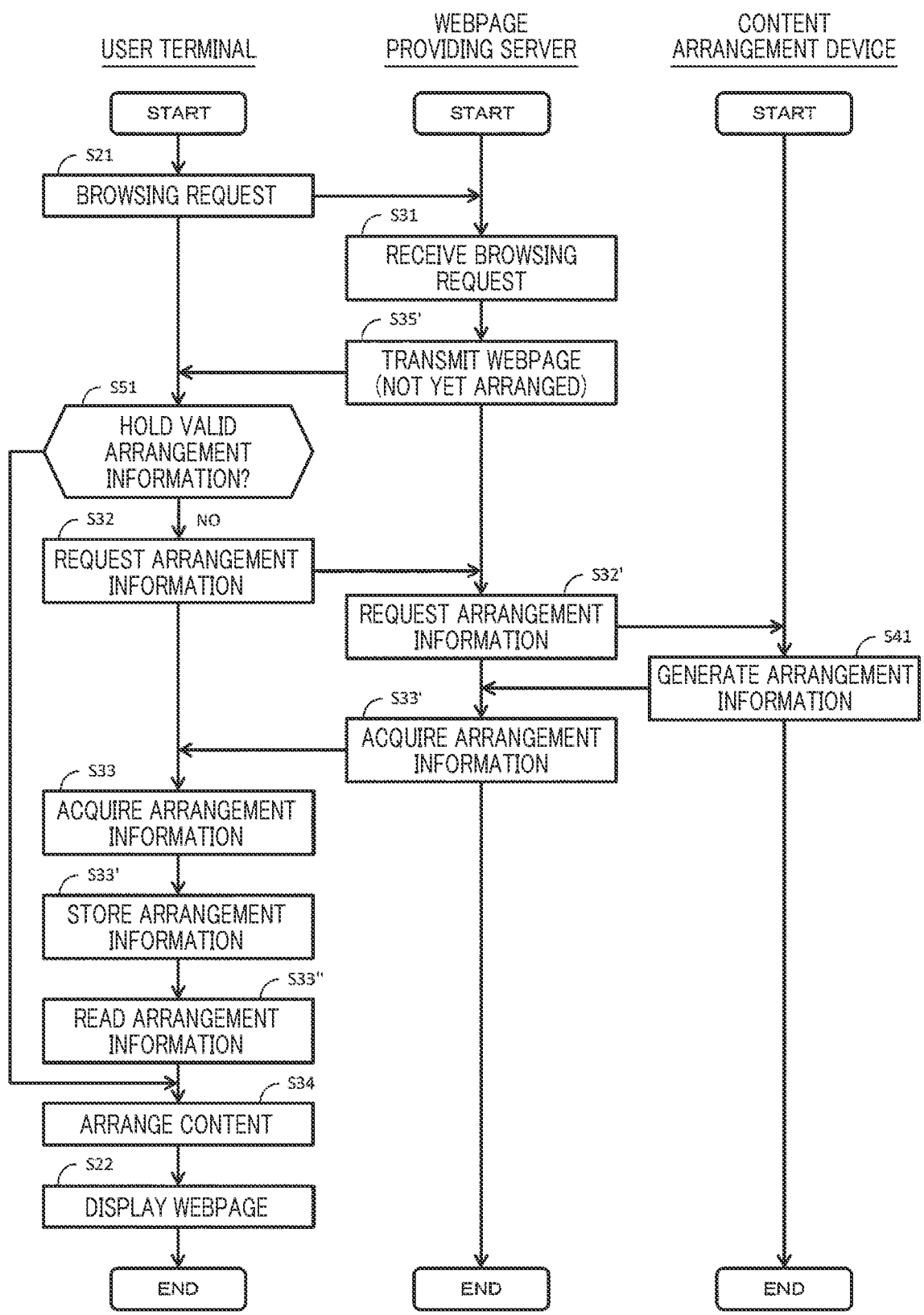
FIG. 15 is a sequence diagram illustrating another example of the processing operation in the content arrangement system in FIG. 13.

FIG. 15 is a sequence diagram illustrating another example of the processing operation in the content arrangement system in FIG. 13. In FIG. 14, the user terminal 5 directly requests the arrangement information from the content arrangement device 4. In contrast, FIG. 15 is different in that the user terminal 5 requests the arrangement information from the content arrangement device via the webpage providing server 3. Other points are the same as those in FIG. 14, so that the detailed description is omitted.

[Interface for Operator of Content Arrangement Device 4]

Figure 16:
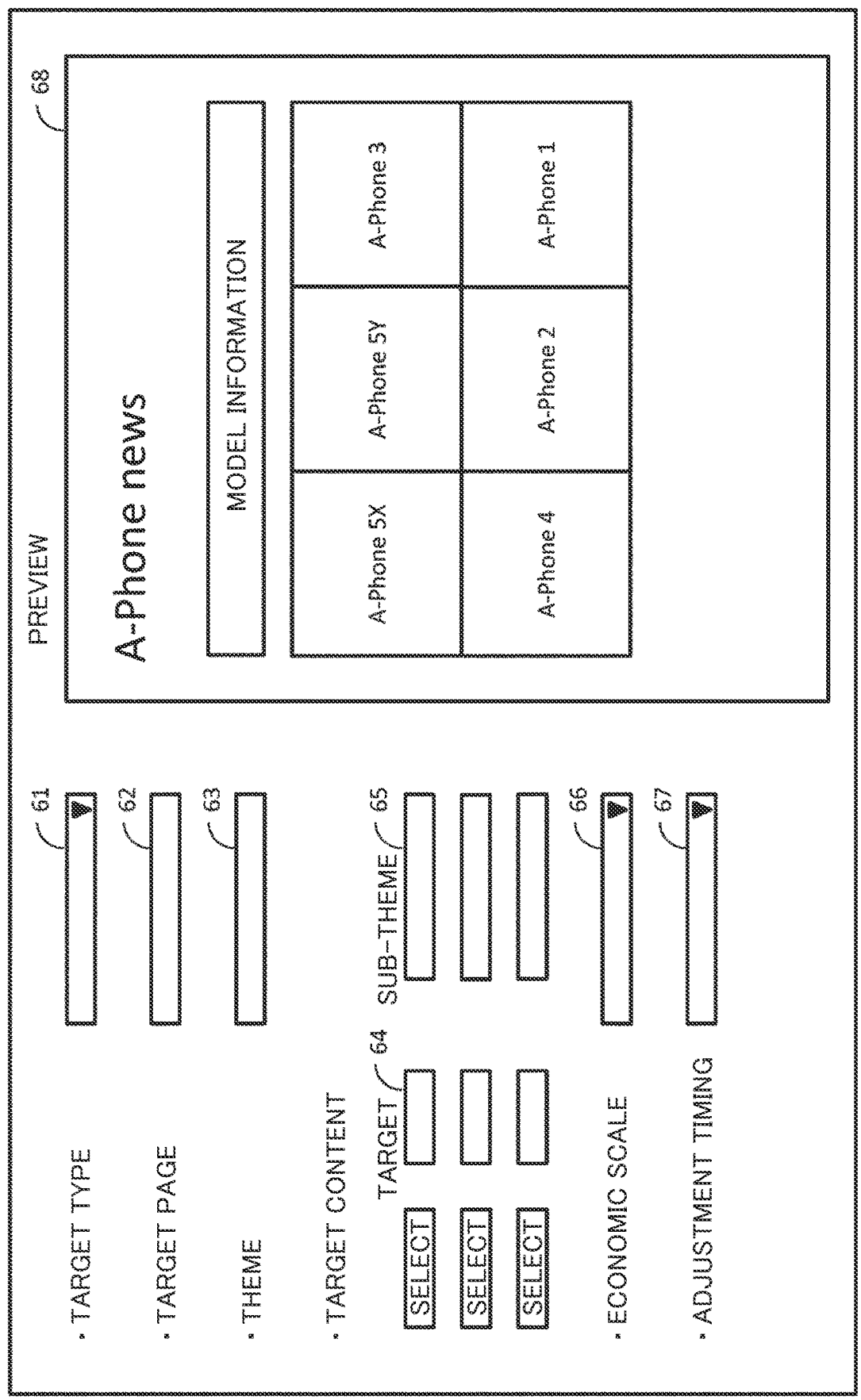
FIG. 16 is a schematic diagram illustrating an example of an interface screen for an operator of a content arrangement device 4.

FIG. 16 is a schematic diagram illustrating an example of an interface screen for the operator of the content arrangement device 4. This interface screen is displayed by, for example, the arrangement information generation means 45. As illustrated in the drawing, a target type setting field 61, a target page setting field 62, a theme setting field 63, a target content setting field 64, a sub-theme setting field 65, an economic scale setting field 66, an adjustment timing setting field 67 and the like are provided. A preview screen 68 is provided on the interface screen. Note that, the screen in FIG. 16 is merely an example, and some fields may be omitted or other fields may be included.

The target type setting field 61 is a field for setting a target for which the theme is to be set, and the operator selects one of options determined in advance such as the webpage, domain, inflow route, and reader information, for example.

The target page setting field 62 is a field for setting a URL indicating the webpage in a case where the webpage is selected as the target, and the operator inputs the URL.

The theme setting field 63 is a field for setting the theme, and the operator inputs the theme such as "A-Phone", for example. The inputted information is set as the theme by the theme setting means 42.

The target content setting field 64 is a field for designating the target content for which the arrangement is set. The content is individual information such as "A-Phone 5X" or a link, for example. As an example, one target content may be set by pressing a "select" button.

The sub-theme setting field 65 is provided corresponding to the target content, and is a field for setting the sub-theme for the corresponding content. A plurality of sub-themes may be set for one content. The inputted information is set as the theme by the sub-theme setting means 43.

The economic scale setting field 66 is for setting the economic scale that serves as a criterion for determining the arrangement of the target content; for example, the operator selects one of the options determined in advance such as the number of searches, a combination of the number of searches and the advertising fee, a combination of the number of searches, the advertising fee, and the competitiveness. On the basis of the economic scale herein set, the arrangement information generation means 45 determines the arrangement of the target content.

The adjustment timing setting field 67 is a field for setting the timing at which the arrangement adjustment of the target content is performed (that is, the timing at which the arrangement information is updated), and the operator selects one of the options determined in advance, such as, for example, each time the browsing request of the webpage is issued (FIG. 10), in response to the instruction from the operator of the webpage providing server 3 (FIG. 11A), in response to the instruction from the operator of the content arrangement device 4 (FIG. 12A) and the like.

On the preview screen 68, the webpage to be displayed in a case where each means in the content arrangement device 4 operates according to the setting in the above-described fields and the arrangement information is generated.

By displaying such interface screen, the operation of the operator of the content arrangement device 4 and various settings are simplified.

As described above, in the third embodiment, the arrangement of the content in the webpage may be automatically made to meet the search needs by utilizing the search trend. Therefore, it is possible to constantly optimize the convenience and satisfaction of the reader at a low cost. Although it is practically difficult to manually process the search trend related to a large number of search queries, according to the third embodiment, it is possible to automatically consider to reflect the search trend.

Fourth Embodiment

A fourth embodiment described next supports construction of a website by utilizing a search trend. In the fourth embodiment, a part of webpages and contents may be automatically created.

Outline of Fourth Embodiment

Figure 17:
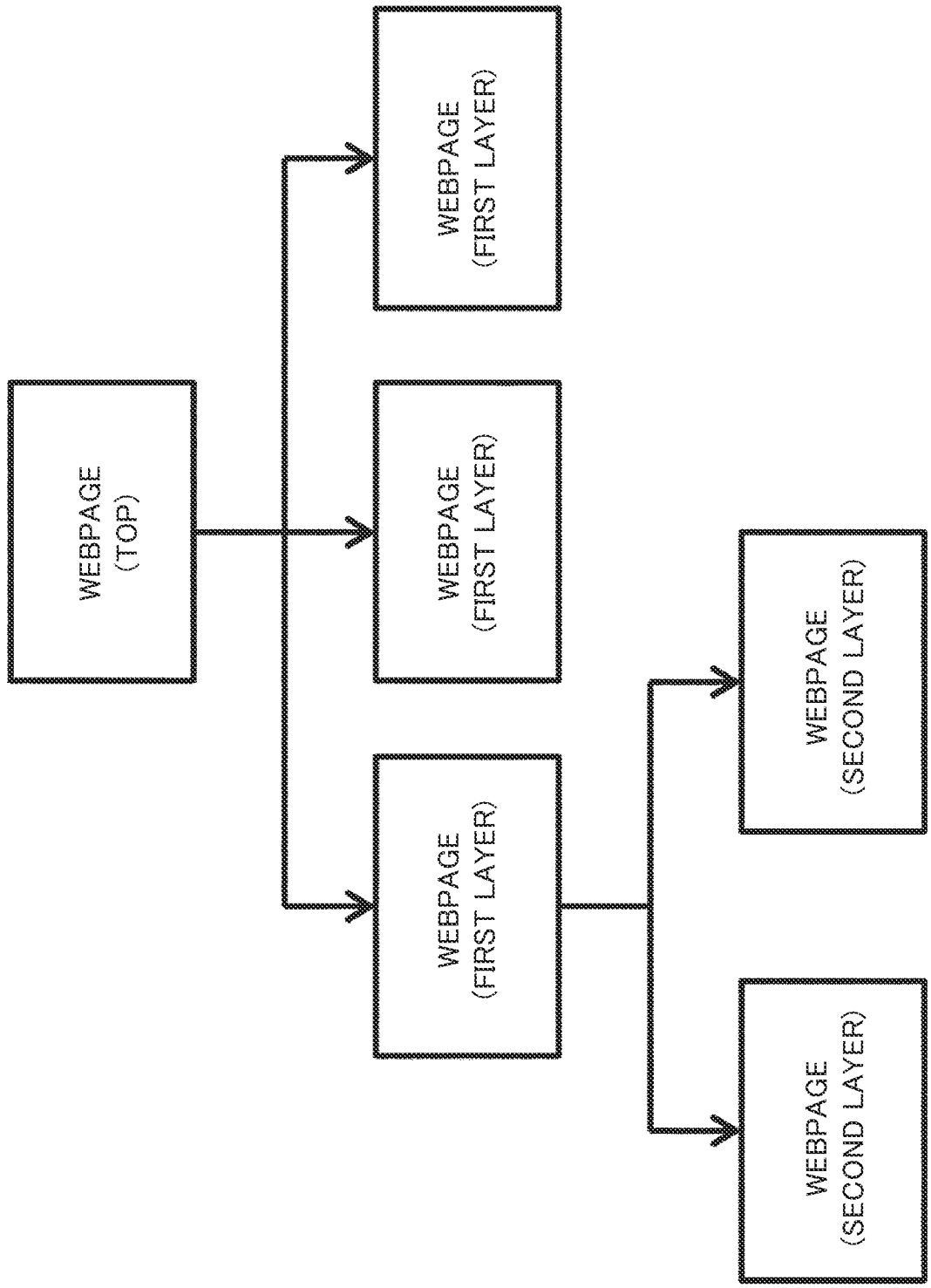
FIG. 17 is a view schematically illustrating a configuration of a website.

FIG. 17 is a view schematically illustrating a configuration of a website. The website also includes a webpage located at a highest layer (hereinafter also referred to as a "top page"). The website also includes one or more webpages (hereinafter, also referred to as "first-layer pages") directly linked from the top page and located in a first layer. Moreover, the website includes one or more webpages (hereinafter, also referred to as "second-layer pages") directly linked from a specific first-layer page and located in a second layer.

Hereinafter, similarly, there may be webpages of a third or subsequent layers.

Herein, it is considered that many visitors utilize a search engine to flow into the website, so that the search trend reflects search needs by the visitors. Therefore, by analyzing the search trend, it is possible to grasp a type of the webpage that is required to meet the search needs. Therefore, in this embodiment, it is automatically proposed what type of webpage should be prepared and how to set up a link on the basis of the search trend.

Note that, for convenience, it is hereinafter described to construct the website on the basis of the "top page" located at the highest layer of the website, but it is not always necessary to be based on the highest layer of the website, and it is also possible to construct the website of a lower layer on the basis of any webpage at any layer in the website (considering the same as the "top page").

Figure 19:
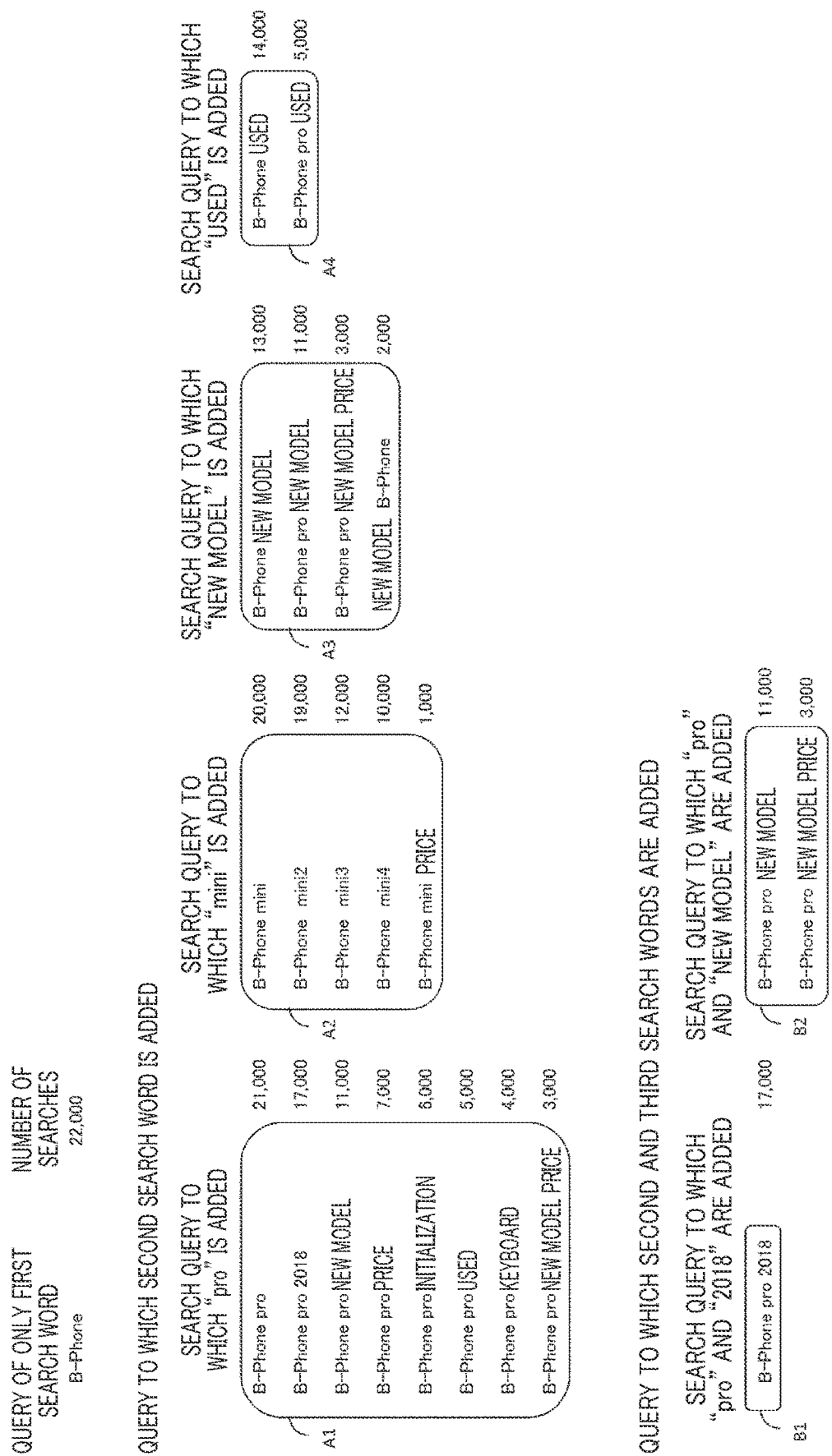
FIG. 19 is a view illustrating the outline of the fourth embodiment.

FIGS. 18 to 20 are views for illustrating an outline of the fourth embodiment. In this example, it is assumed that a website related smartphones under a brand name of "B-Phone" is constructed.

FIG. 18 illustrates the number of searches for each search query including "B-Phone" (that is, a search query with "B-Phone" as a core word) within a predetermined period. Note that, this "B-Phone" corresponds to the "theme" in the third embodiment.

In a middle stage of FIG. 19, representative ones of the search queries including one or more search words in addition to "B-Phone" out of the search queries illustrated in FIG. 18 are illustrated. Specifically, there are a set of search queries A1 to which "pro" is added (as a second search word, the same applies hereinafter), a set of search queries A2 to which "mini" is added, a set of search queries A3 to which "new model" is added, and a set of search queries A4 to which "used" is added. Note that, this "pro" and the like corresponds to the "sub-theme" in the third embodiment.

In a lower stage of FIG. 19, representative ones of the search queries including two or more search words in addition to "B-Phone" out of the search queries illustrated in FIG. 18 are illustrated. Specifically, there are a set of search queries B1 to which "pro" and "new model" are added (as second and third search words, the same applies hereinafter), and a set of search queries B2 to which "pro" and "2018" are added.

FIG. 20 schematically illustrates a website proposed from the search trend in FIGS. 18 and 19. A top page W0 indicates that this website relates to "B-Phone".

In the drawing, as first-layer pages, a webpage W11 related to "B-Phone pro" (corresponding to the set A1 in FIG. 19), a webpage W12 related to "B-Phone mini" (corresponding to the set A2 in FIG. 19), a webpage W13 related to "B-Phone new model" (corresponding to the set A3 in FIG. 19), and a webpage W14 related to "B-Phone used" (corresponding to the set A4 in FIG. 19) are proposed. That is, this means that the webpages related to "B-Phone pro", "B-Phone mini", "B-Phone new model", and "B-Phone used" should be prepared as the webpages W11 to W14 that should be directly linked from the top page W0.

Such proposal is based on the fact that there are a considerable number of search queries to which "pro", "mini", "new model", or "used" is added as the second search word. It may be said that "pro", "mini", "new model", and "used" may be the words corresponding to the first-layer pages W11 to W14, respectively. It is possible to automatically create a part of the first-layer pages by setting the corresponding word (second search word) in a predetermined item of an HTML file that describes each of the first-layer pages.

In the drawing, a webpage W21 related to "B-Phone pro 2018" is proposed as the second-layer page that should be directly linked to the webpage W11 related to "B-Phone pro" that is the first-layer page. That is, this means that the webpage related to "B-Phone pro 2018" should be prepared as the webpage that should be directly linked from the first-layer page W11.

A webpage W22 related to "B-Phone pro new model" is proposed as the second-layer page that should be directly linked to the webpage W11 related to "B-Phone pro" and the webpage W13 related to "B-Phone new model" that are the first-layer pages. That is, this means that the webpage related to "B-Phone pro new model" should be prepared as the webpage that should be directly linked from the first-layer pages W11 and W13.

These proposals are based on the fact that there are a considerable number of search queries to which "pro" and "2018" or "new model" are added as the second and third search words. A pair of "pro" and "2018" may be the words corresponding to the webpage W21. A pair of "pro" and "new model" may be the words corresponding to the webpage W22. It is possible to automatically create a part of the second-layer pages by setting the corresponding words (pair of second and third search words) in a predetermined item of an HTML file that describes each of the second-layer pages.

By creating the website on the basis of the above-described proposal and setting up the link, it is possible to support creation of the website having a structure that meets the search needs.

Hereinafter, this is more specifically described.

[Configuration of Website Construction Support Device 7]

FIG. 21 is a block diagram illustrating a schematic configuration of a website construction support device 7 according to the fourth embodiment. The website construction support device 7 is provided with a word specification means 71 and a webpage creation means 72. A part or all of these means may be implemented by a processor of the website construction support device 7 executing a predetermined program.

The word specification means 71 specifies a word related (corresponding) to one or more webpages that should be linked from a certain webpage (or a hierarchical relationship thereof should be defined) on the basis of a plurality of search queries acquired from a search server 1. The webpage creation means 72 creates a part of the top page and/or the first-layer (or lower-layer) pages by using the word specified by the word specification means 71. Then, the webpage creation means 72 outputs the created webpage as a file group such as HTML or PHP that describes the same. The outputted file may be used as a framework of actual website construction.

[Word Specification Means 71]

The word specification means 71 is described in detail. The word specification means 71 specifies a word corresponding to each webpage on the basis of a plurality of search queries.

[Specification of Top Word]

First, the word specification means 71 specifies a word corresponding to the top page (for example, "B-Phone" in FIGS. 18 to 20, hereinafter also referred to as a "top word") on the basis of the search query. For example, the word specification means 71 acquires a plurality of search queries within a predetermined period from the search server 1 and specifies one word in consideration of a search scale. The top word may also be considered as a market for a search group centered on a certain core word (in the example in FIG. 18, the market centered on the core word "B-Phone").

As an example of specifying the top word, in a case of creating a new webpage, an operator of the website construction support device 7 may manually specify as the top word the word (core word) that is often included in a plurality of search queries in common.

As another example of the top word specification, in a case of renewing an existing webpage, the word specification means 71 may automatically specify as the top word a word with high customer attracting efficiency in the existing webpage. The word with high customer attracting efficiency might be specified on the basis of the number of inflows using the word as the search query and the economic scale.

As still another example, the word specification means 71 may automatically specify as the top word the core word having a large search group market. As a more specific example, there is the market having "B-Phone" as the core word and the market having "smartphone" as the core word, and in a case where the latter has higher customer attracting efficiency, "smartphone" is made the top word.

The top word may also be specified by the word specification means 71 automatically presenting some top word candidates, and the operator of the website construction support device 7 manually selecting the candidate. The top word candidates may be, for example, a plurality of words with higher customer attracting efficiency in the existing webpage.

When the "top word" is specified, the word specification means 71 outputs (for example, displays) the "top word" to the operator of the website construction support device 7. By this, the operator may know that it is preferable to construct the website with the specified "top word" as the theme. The operator may also know that it is preferable that the top page of the website is related to the "top word".

The "top word" may be said to be the word related (corresponding) to the top page.

Next, the word specification means 71 forms a set of search queries including the "top word" (for example, the search query group illustrated in FIG. 18).

[Specification of First-Layer Word]

The word specification means 71 specifies the word corresponding to the first-layer page (for example, each of "pro", "mini", "new model", and "used" illustrated in the middle stage of FIG. 19; hereinafter also referred to as a "first-layer word") on the basis of the formed set of search queries. For example, the word specification means 71 makes one word other than the "top word", the word included in many sets of search queries in common the "first-layer word". There may be two or more "first-layer words". Note that, the word specification means 71 may specify a predetermined number of "first-layer words" in consideration of the economic scale so that the number of "first-layer words" does not become too large. The first-layer word may also be specified by a method similar to that of the top word.

When the "first-layer word" is specified, the word specification means 71 outputs (for example, displays) the "first-layer word" to the operator of the website construction support device 7. As a result, the operator may understand that the operator should create a website related to each of the specified "first-layer words" as the first-layer page, and set up a link from the top page (or make the same lower layer of the top page). It may be said that one "first-layer word" corresponds to one first-layer page.

In the example in FIGS. 19 and 20, it is understood that the webpage W11 related to "B-Phone pro", the webpage W12 related to "B-Phone mini", the webpage W13 related to "B-Phone new model", and the webpage W14 related to "B-Phone used" should be created as the first-layer pages.

[Specification of Second-Layer Word]

The word specification means 71 specifies the word corresponding to the second-layer page (hereinafter also referred to as "second-layer word") on the basis of the formed set of search queries as necessary. For example, the word specification means 71 specifies another word included in many sets of search queries including any specified "first-layer word" in common, the word other than the "top word". Then, a pair of this any "first-layer word" and specified "another word" is made a "second-layer word". Note that, "another word" may be the "first-layer word".

For example, in FIG. 19, a pair of "pro" being the "first-layer word" and "2018" being "another word" is the "second-layer word". A pair of "pro" being one "first-layer word" and "new model" being another "first-layer word" is the "second-layer word". In a case of defining the "second-layer word" in this manner, the "second-layer word" includes at least one "first-layer word".

There may be two or more "second-layer words". Note that, the word specification means 71 may specify a predetermined number of "second-layer words" in consideration of the economic scale so that the number of "second-layer words" does not become too large.

When the "second-layer word" is specified, the word specification means 71 outputs (for example, displays) the "second-layer word" to the operator of the website construction support device 7. By this, the operator may understand that the website related to the specified "second-layer word" should be created as a second-layer page. It is understood that the first-layer page corresponding to the "first-layer word" included in the "second-layer word" should be linked to the second-layer page (or this should be made a lower layer of the second-layer page). It may also be said that one "second-layer word" corresponds to one second-layer page.

In the example in FIGS. 19 and 20, it may be understood that the webpage 21 related to "B-Phone pro 2018" should be created as the second-layer page. Since the included "first-layer word" is "pro", it may be understood that the webpage 21 should be linked from the webpage W11 related to "B-Phone pro".

It may be understood that the webpage 22 related to "B-Phone pro new model" should be created as the second-layer page. Since the included "first-layer words" are "pro" and "new model", it may be understood that the webpage W22 should be linked to both the webpage W11 related to "B-Phone pro" and the webpage W13 related to "B-Phone new model".

In this manner, the second-layer page may be linked from two or more first-layer pages. In this case, the second-layer page related to "B-Phone pro new model" linked from the first-layer page W11 related to "B-Phone pro" may be the same as or different from the second-layer page related to "B-Phone pro new model" linked from the first-layer page W13 related to "B-phone new model"; the creator of the website may appropriately determine this.

Hereinafter, the word specification means 71 may specify the words of the required number of layers in the similar manner. Note that, in the description above, the words commonly included in the search queries are made the top word, the first-layer word, and the second-layer word, but the top word and the like may be specified by another method. For example, it is possible to specify the word that meets the search needs by performing natural language processing, or manually set the same.

Figure 22A:
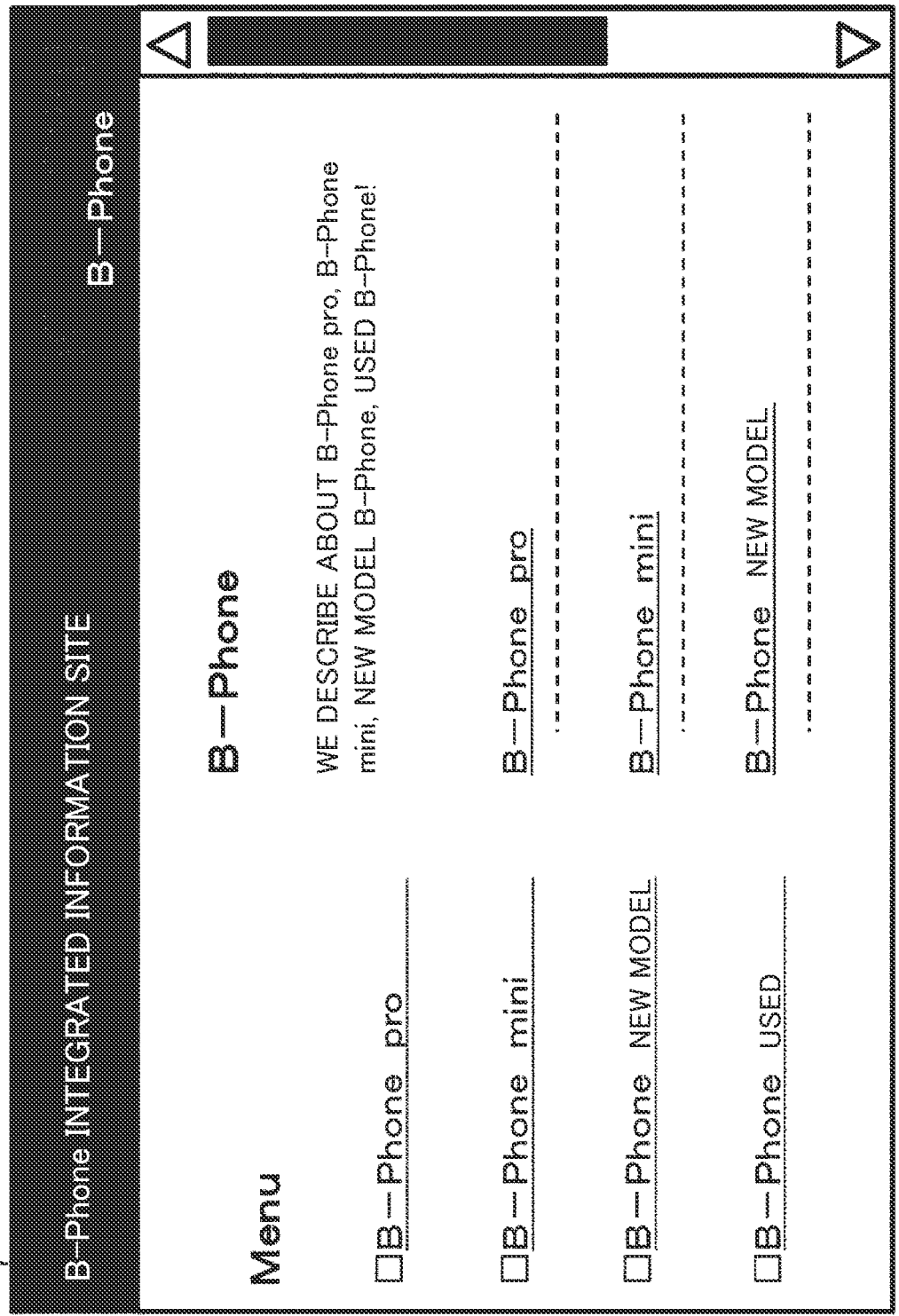
FIG. 22A is a view schematically illustrating an example of a top page W0 in a case where a website is constructed.
Figure 22B:
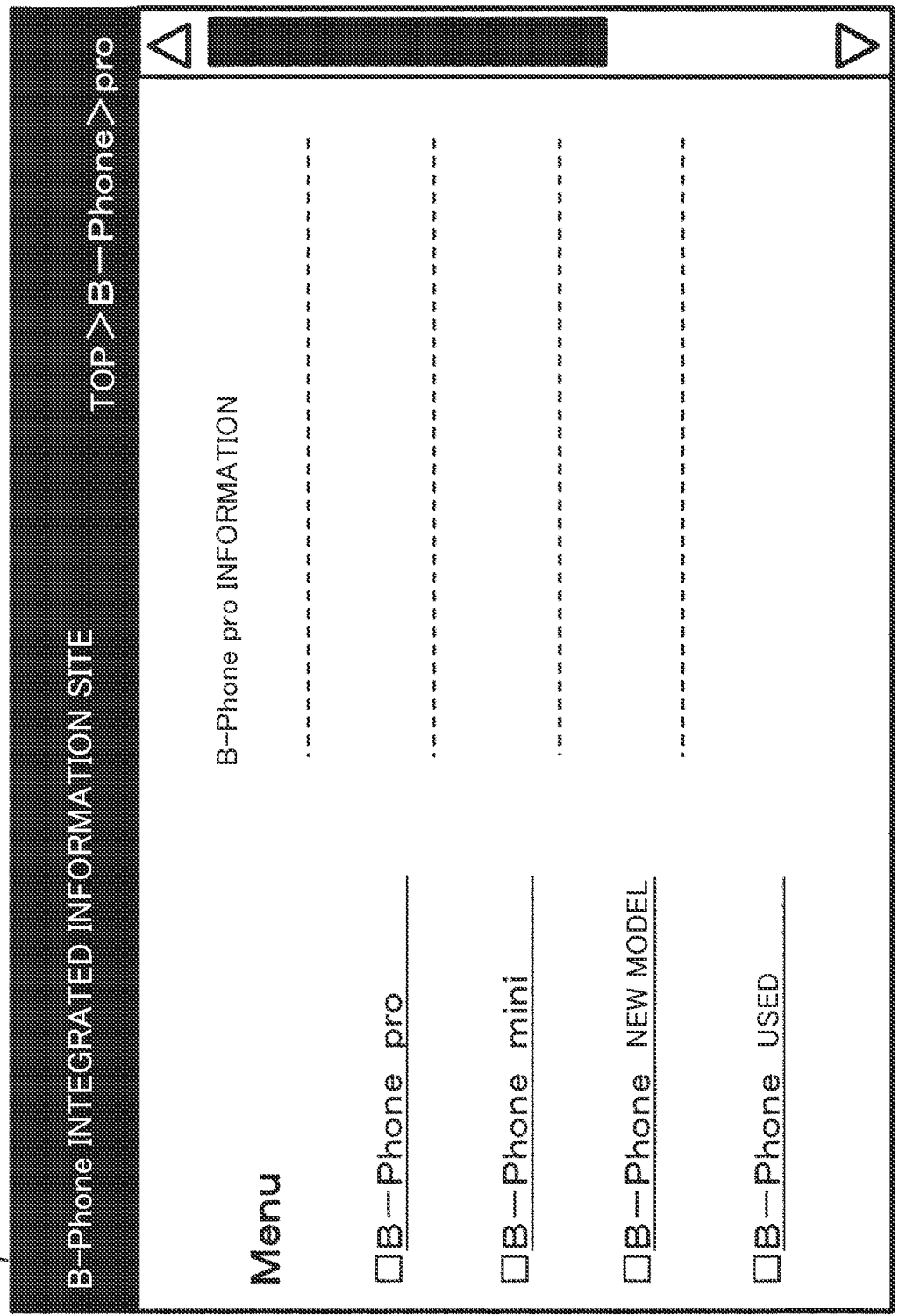
FIG. 22B is a view schematically illustrating an example of a first-layer page W11 in a case where the website is constructed.

FIG. 22A and FIG. 22B are views schematically illustrating an example of the top page W0 and the first-layer page W11 in a case where the website is constructed according to the above-described proposal. As illustrated in FIG. 22A, the top page W0 includes the links to the first-layer pages related to "B-Phone pro", "B-Phone mini", "B-Phone new model", and "B-Phone used". Note that, the link to the first-layer page related to "B-Phone used" does not appear in FIG. 22A, but this appears when the top page W1 is scrolled downward. An arrangement position of the link is preferably determined on the basis of the economic scale, for example, as described in the third embodiment.

When the link to "B-Phone pro" is selected in FIG. 22A, the first-layer page W11 illustrated in FIG. 22B is displayed.

[Webpage Creation Means 72]

A webpage creation means 72 is described in detail. FIGS. 23A and 23B are views schematically illustrating a part of the top page W0 and a part of the first-layer page W11 illustrated in FIG. 20 described above, respectively. Hereinafter, it is described with reference to FIGS. 20, 23A, and 23B.

[Automatic Generation of URL]

The webpage creation means 72 may automatically generate a URL that is a part of the webpage on the basis of the word corresponding to each webpage (and the word corresponding to a higher-layer page as necessary). Hereinafter, it is assumed that a root path of the website is "https://AAA.com".

For example, it is assumed that, in a case where the webpage for which the URL is to be created is the top page W0, the webpage creation means 72 combines the root path and the "top word" by "/ (slash)". In the example in FIG. 20, since the "top word" is "B-Phone", a specific URL is as follows (FIG. 23A).

https://AAA.com/B-Phone

It is assumed that, in a case where the webpage for which the URL is to be created is the first-layer page, the webpage creation means 72 combines the root path, the "top word", and the "first-layer word" corresponding to the target webpage by "/ (slash)". In the example in FIG. 20, in a case where the target webpage is the first-layer page W11 related to "B-Phone pro", a specific URL is as follows (FIG. 23B).

https://AAA.com/B-Phone/pro

Alternatively, the URL may be a combination of the root path, the "top word", and a combination of the "top word" and the "first-layer word" corresponding to the target webpage by "/ (slash)". Specifically, this is as follows.

https://AAA.com/B-Phone/B-Phone/pro

Note that, it is desirable to perform URL encoding as necessary and replace special characters (spaces, Japanese and the like) that cannot be used in the URL.

It is assumed that, in a case where the webpage for which the URL is to be created is the second-layer page, the webpage creation means 72 combines the root path, the "top word", the "first-layer word" corresponding to the first-layer page being a link source of the target page, and the "second-layer word" corresponding to the target webpage by "/ (slash)". In the example in FIG. 20, in a case where the target webpage is the second-layer page W21 related to "B-Phone pro 2018", a specific URL is as follows.

https://AAA.com/B-Phone/pro/2018

In the example in FIG. 20, in a case where the target webpage is the second-layer page W22 related to "B-Phone pro new model", a specific URL is as follows while replacing "new model" to "new".

https://AAA.com/B-Phone/pro/new
https://AAA.com/B-Phone/new/pro

Two URLs are generated for the second-layer page W22 because the two first-layer pages W11 and W13 are the link sources. It is possible to create a single webpage corresponding to these two URLs so that the single webpage is accessed from either URL. Alternatively, it is possible to create two webpages corresponding to each of the two URLs. Alternatively, either one may be representatively used.

In this manner, the webpage creation means 72 creates the URL of the webpage using the word specified by the word specification means 71, thereby automatically generating a directory structure (hierarchical relationship) of the website.

[Automatic Generation of Breadcrumbs]

Similarly to the generation of the URL, the webpage creation means 72 may generate breadcrumbs on the basis of the word corresponding to each webpage (and word corresponding to the higher-layer page as necessary). The breadcrumbs are information indicating the position of the currently displayed webpage on the website having a hierarchical structure, and are illustrated in an upper right part of FIG. 22B.

For example, in a case where the webpage for which the breadcrumbs are to be generated is the first-layer page W11, the webpage creation means 72 generates description as follows in order to generate the breadcrumbs "top>B-Phone>pro" (FIG. 23B).

```
<div class="breadcrumbs">
</ul>
<li><a href=" /">top</li>
<li><a href=" /B-Phone">B-Phone</li>
<li><a href=" /B-Phone/pro">pro</li>
</ul>
</div>
```

By this, the breadcrumbs in the upper right part of FIG. 22B are displayed. Herein, for example, "B-Phone" may be linked to the top page W0.

In a case where the webpage for which the breadcrumbs are to be generated is the second-layer page W22, the webpage creation means 72 generates description as follows in order to generate the breadcrumbs "top>B-Phone>pro>new model" and "top>B-Phone>new model/pro".

```
<div class="breadcrumbs">
</ul>
<li><a href=" /">top</li>
<li><a href=" /B-Phone">B-Phone</li>
<li><a href=" /B-Phone/pro">pro</li>
<li><a href=" /B-Phone/pro/new model">new model</li>
</ul>
</div>
<div class="breadcrumbs">
</ul>
<li><a href="/">top</li>
<li><a href=" /B-Phone">B-Phone</li>
<li><a href=" /B-Phone/new model">new model</li>
<li><a href=" /B-Phone/pro/pro">pro</li>
</ul>
</div>
```

In this manner, a plurality of breadcrumbs is generated for the webpage linked from a plurality of higher-layer pages. In this case, the webpage creation means 72 may generate a plurality of breadcrumbs, or may representatively generate one breadcrumbs.

[Automatic Setting of Title and h1 Tag]

The webpage creation means 72 may automatically set a title and a h1 tag that are a part of the HTML file that describes each page. Note that, the title in which the title of the webpage is described is mainly displayed on the search result screen of the search engine, and is often not displayed in the webpage. The h1 tag used to describe the highest-layer concept out of a plurality of h tags that are head tags of the webpage, in which the title of the webpage is mainly described as is the case with the title, is often displayed in the webpage viewed by visitors.

Specifically, the webpage creation means 72 may set the title and/or h1 tag of the webpage on the basis of the word corresponding to the webpage being the creation target.

For example, in a case where the target webpage is the top page, the webpage creation means 72 sets the title and/or h1 tag of the top page on the basis of the "top word". As a specific example, this may be the "top word" itself.

In the example in FIG. 20, the webpage creation means 72 may set the title and/or h1 tag of the top page W0 to "B-Phone" being the "top word" itself. Specifically, the description is as follows (FIG. 23A).

```
<title>B-Phone</title>
<h1>B-Phone</ h1>
```

In a case where the target webpage is the first-layer page, the webpage creation means 72 sets the title and/or h1 tag of the first-layer page on the basis of the word corresponding to the first-layer page being the creation target (also using the "top word" as necessary).

In the example in FIG. 20, in a case where the target webpage is the first-layer page W11 related to "B-Phone pro", the webpage creation means 72 may set the title and/or h1 tag to "B-Phone pro" or "pro" while removing "B-Phone" being the "top word". Specifically, the description is as follows (FIG. 23B).

```
<title>B-Phone pro</title> or <title>pro</title>
<h1>B-Phone pro</h1> or <h1>pro</h1>
```

In a case where the target webpage is the second-layer page, the webpage creation means 72 sets the title and/or h1 tag of the second-layer page on the basis of the word corresponding to the second-layer page being the creation target (using the "top word" and/or the word corresponding to the first-layer page being the link source as necessary).

In the example in FIG. 20, in a case where the target webpage is the second-layer page W21 related to "B-Phone pro 2018", the webpage creation means 72 may make the title and/or h1 tag to "B-Phone pro 2018", "pro 2018" while removing "B-Phone" being the "top word", or "2018" while removing the "top word" and the "first-layer word".

The same applies to the setting of title and/or h1 tag in the third and subsequent layers.

[Automatic Setting of Description]

The webpage creation means 72 may automatically set a description (or an in-site summary) that is a part of the HTML file that describes each page. Note that, the description is a text displayed as an outline of each webpage in a search engine result page (SERP).

Specifically, the webpage creation means 72 may set the description of the webpage on the basis of the word corresponding to the lower-layer page linked to the webpage to be created.

For example, in a case where the target webpage is the top page, the webpage creation means 72 sets the description of the top page (or the in-site summary) on the basis of the word corresponding to each of the first-layer pages one layer below (using the top word as necessary).

In the example in FIG. 20, the webpage creation means 72 may make the description of the top page W0 "B-Phone pro, B-Phone mini, B-Phone new model, B-Phone used" or "pro, mini, new model, used" while removing "B-Phone" being the "top word". Specifically, the description is as follows (FIG. 23A).

```
<meta name="description" content="B-Phone pro, B-Phone mini, B-Phone new model, B-Phone used"> or
<meta name="description" content="pro, mini, new model, used">
```

Although an example in which "," is used as a combining character is described above, any other symbol may be set as the combining character. In a case where there are a large number of "first-layer words", for example, a predetermined number of them may be included in the description in descending order of economic scale or total number of searches.

The description of the top page may include the word corresponding to each of the second-layer pages linked to each of the first-layer pages in addition to the word corresponding to each of the first-layer pages, and may further include the word corresponding to each of the lower-layer pages.

In a case where the target webpage is the first-layer page, the webpage creation means 72 sets the description (or the in-site summary) of the first-layer page on the basis of the word corresponding to each of the second-layer pages one layer below (using the top word and/or the word corresponding to the first-layer page as necessary).

In the example in FIG. 20, in a case where the target webpage is the first-layer page W11 related to "B-Phone pro", the webpage creation means 72 may make the description "B-Phone pro 2018, B-Phone pro new model", or "pro 2018, pro new model" while removing "B-Phone" being the "top word", or "2018, new model" while further removing the "first-layer word".

The same applies to the setting of the description in the third and subsequent layers.

The webpage creation means 72 may set keywords in a manner similar to that of the title or description. Moreover, it is possible to automatically create a sentence using the word set in the title and description. By automatically creating the title, description, and keywords in this manner, it is possible to perform appropriate settings that match the webpage.

[Automatic Setting after h2 and Subsequent Tags]

The webpage creation means 72 may automatically set a h2 tag, a h3 tag and subsequent tags that are a part of the HTML file that describes each page. Note that, the h2 tag is a second most important tag among the h tags that are head tags and the same applies to the h3 tag and subsequent tags.

Specifically, the webpage creation means 72 sets the h2 tag and subsequent tags on the basis of the word corresponding to the webpage in the lower layer of the webpage to be created.

For example, in a case where the target webpage is the top page, the webpage creation means 72 sets the h2 tag on the basis of the word corresponding to each of the first-layer pages one layer below (using the top word as necessary), and sets the h3 tag on the basis of the word corresponding to each of the second-layer pages two layers below (using the top word and/or the word corresponding to the first-layer page as necessary).

In the example in FIG. 20, the webpage creation means 72 may set in the h2 tag of the top page W0 "B-Phone pro", "B-Phone mini", "B-Phone new model", and "B-Phone used", or "pro", "mini", "new model", and "used" while removing "B-Phone" being the "top word". The webpage creation means 72 may set in the h3 tag of the top page W0 "B-Phone pro 2018", "B-Phone pro new model", and "B-Phone new pro", or "pro 2018", "pro new model", and "new model pro" while removing "B-Phone" being the "top word". Alternatively, it is possible to set "2018", "new model", and "pro" in the h3 tag while removing "pro" and "new model" being the words of the higher layer in addition to the "top word" in order to prevent the word set in the tag from being redundant as much as possible.

Specifically, the description is as follows (FIG. 23A).

```
<h2>B-Phone pro</h2> or <h2>pro</h2>
    <h3>B-Phone pro 2018</h3> or <h3>pro 2018</h3>
    <h3>B-Phone pro new model</h3> or <h3>pro new model</h3>
<h2>B-Phone mini</h2> or <h2>mini</h2>
<h2>B-Phone new model</h2> or <h2>new model</h2>
    <h3>B-Phone new model pro</h3> or <h3>new model pro</h3>
<h2>B-Phone used</h2> or <h2>used</h2>
or <h2>pro</h2>
    or <h3>2018</h3>
    or <h3>new model</h3>
or <h2>mini</h2>
or <h2>new model</h2>
    or <h3>pro</h3>
or <h2>used</h2>
```

In a case where the target webpage is the first-layer page, the webpage creation means 72 sets the h2 tag on the basis of the word corresponding to each of the second-layer pages one layer below (using the top word and/or the word corresponding to the first-layer page as necessary).

In the example in FIG. 20, in a case where the target webpage is the first-layer page W11 related to "B-Phone pro", the webpage creation means 72 may make the h2 tag "B-Phone pro 2018" and "B-Phone pro new model", or "pro 2018" and "pro new model" while removing "B-Phone" being the "top word", or further "2018" and "new model" while removing the "first-layer word". Specifically, the description is as follows (FIG. 23B).

---

<h2>B-Phone pro 2018</h2> or <h2>pro 2018</h2> or <h2>2018</h2>
<h2>B-Phone pro new model</h2> or <h2>pro new model</h2> or <h2>new model</h2>

---

The same applies to the setting of the h2 tag in the third and subsequent layers.

[Automatic Setting of Global Navigation and Side Menu]

The webpage creation means 72 may create global navigation and a side menu that are commonly displayed in each webpage on the website by using the word corresponding to the webpage at each layer. Hereinafter, an expandable side menu is described as an example.

Figure 24A:
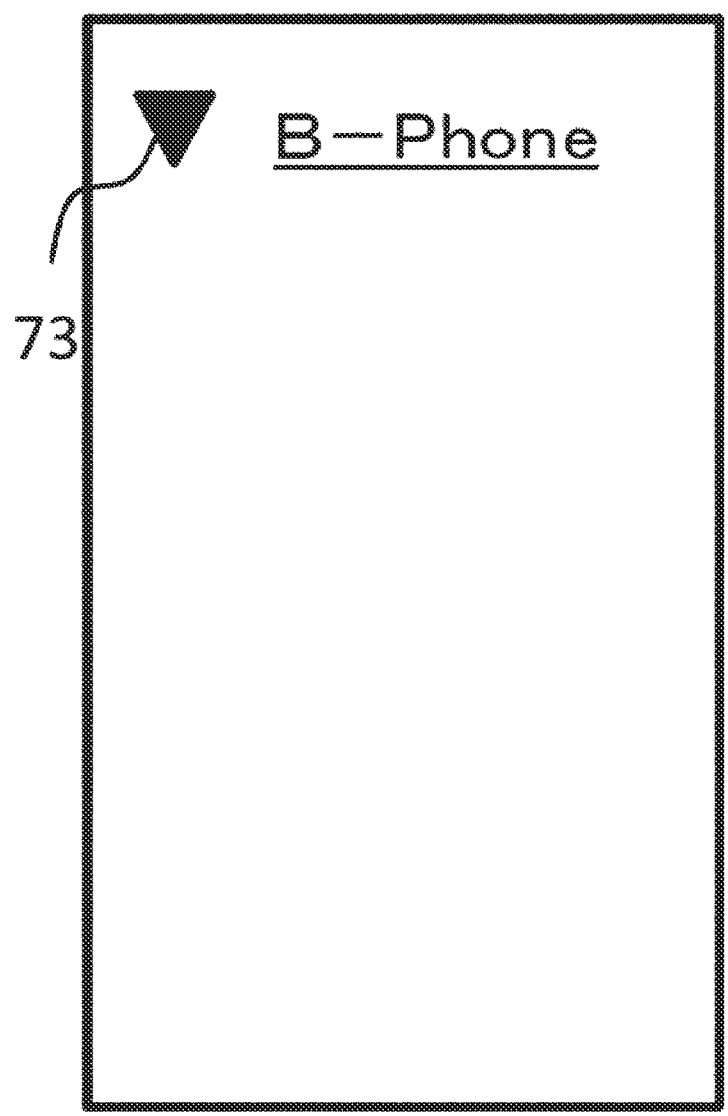
FIG. 24A is a view schematically illustrating an example of a side menu.
Figure 24B:
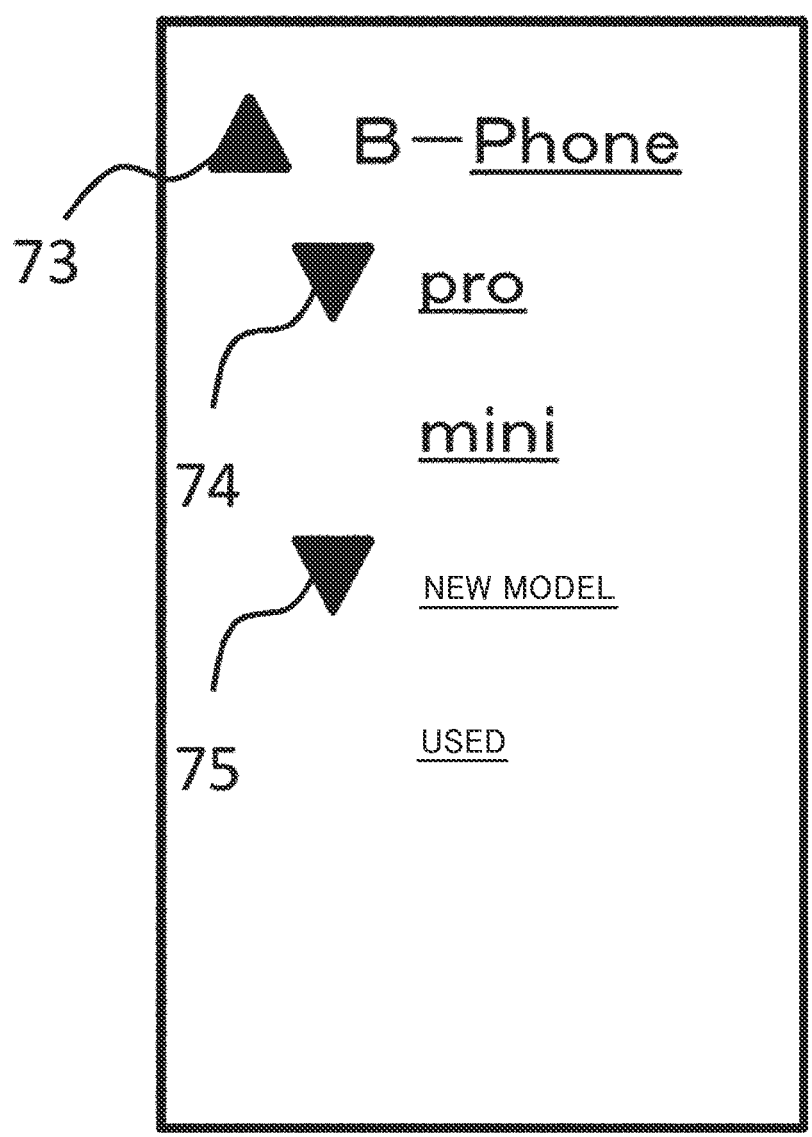
FIG. 24B is a view schematically illustrating an example of the side menu.

For example, as illustrated in FIG. 24A, in the side menu, "B-Phone" corresponding to the top page W0 is set to the highest layer. This "B-Phone" is linked to the top page W0. Herein, when an expansion mark 73 provided on the top word is selected, as illustrated in FIG. 24B, the words "pro", "mini", "new model", and "used" corresponding to the first-layer pages W11 to W14, respectively, are displayed. This "pro" is linked to the first-layer page W11. The same is true for other words.

In FIG. 24B, "pro" and "new model" are provided with expansion marks 74 and 75, respectively, but "mini" and "used" are not provided with expansion marks. This means that although the first-layer pages W11 and W13 corresponding to "pro" and "new model", respectively, have lower-layer pages, the layer pages W12 and W13 corresponding to "mini" and "used", respectively, do not have the lower-layer pages.

Figure 24C:
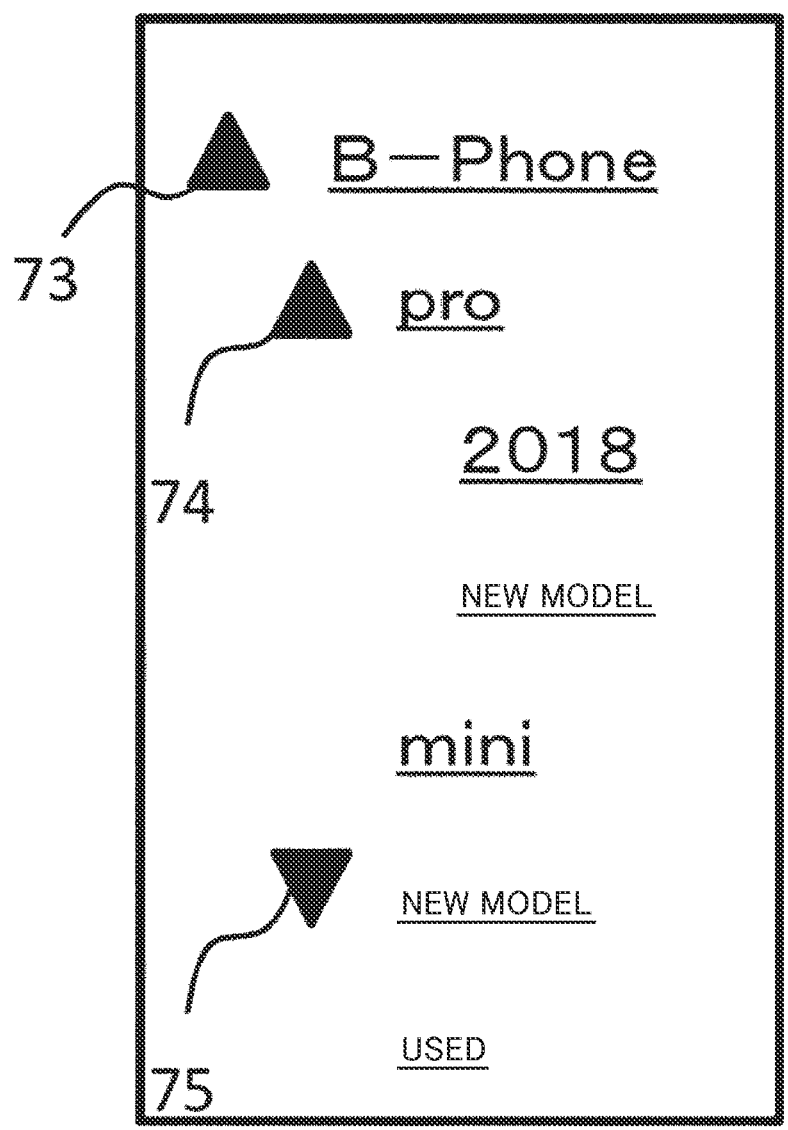
FIG. 24C is a view schematically illustrating an example of the side menu.

In FIG. 24B, when the expansion mark 74 provided on "pro" is selected, as illustrated in FIG. 24C, the word "new model" corresponding to the second-layer page W22 linked to the first-layer page W11 corresponding to "pro" is displayed. This "new model" is linked to the second-layer page W22.

Such global navigation or side menu is created as follows.

The webpage creation means 72 associates the "first-layer word" with the "top word". As a result, when the expansion mark provided in the "top word" is selected, the "first-layer word" is displayed.

The webpage creation means 72 associates the "second-layer word" with the "first-layer word" from which this is linked (does not associate with the first-layer word from which this is not linked). By this, when the expansion mark provided on a certain "first-layer word" is selected, the "second-layer word" corresponding to the second-layer page linked to the first-layer page corresponding to this "first-layer word" is displayed.

Hereinafter, it is sufficient to associate only the required layers.

As described above, according to the fourth embodiment, it is possible to automatically support the creation of the website having an appropriate structure that meets the search needs and automatically create a part of the webpages by utilizing the search trend. Although it is practically difficult to manually process the search trend related to a large number of search queries, according to the fourth embodiment, it is possible to automatically take the search trend into consideration to reflect.

Note that, the website construction support device 7 described above may be used not only for creating a new website but also for evaluating an existing website (this point is described in a sixth embodiment). That is, it is possible to compare the structure of the website proposed as described above with the existing website, and confirm, for example, whether an appropriate first-layer page exists and linked from the top page (in the example in FIG. 20, whether there are four first-layer pages related to "pro", "mini", "new model", and "used" and linked from the top page related to "B-Phone"). Moreover, the website construction support device 7 may also be used as a mode in which a search engine clearly indicates other search candidate words to a searcher, which is called a search suggestion and the like. That is, this is a method for regarding the search word entered in a search window as the theme (second word), and proposing the word using the sub-theme (first word) as the search word candidate in a manner similar to that in which the h2 tag and the h3 tag are outputted. In the conventional general search suggestion, the search word candidates are not grouped by the sub-theme (first word), and they are not displayed in display order taking the economic scale into consideration.

Fifth Embodiment

A fifth embodiment visually displays a structure of a website proposed in the fourth embodiment.

Figure 25E:
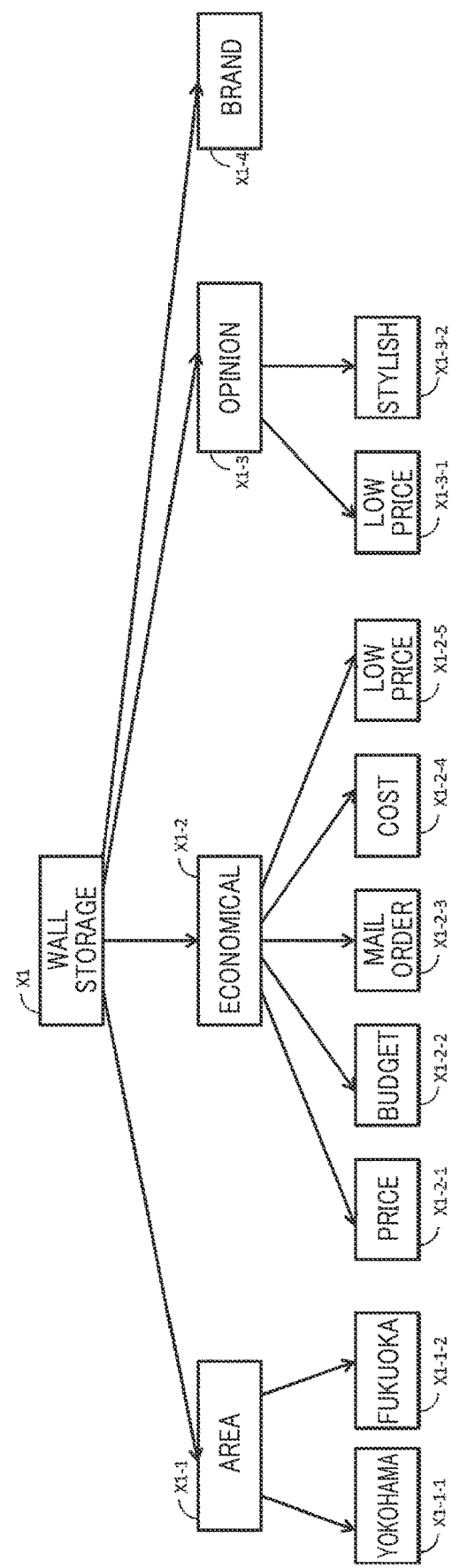
FIG. 25E is a display example of the structure of the website.

FIGS. 25A to 25C are views illustrating display examples of the structure of the website. An electronic file (electronic data) for displaying such a screen is generated by a webpage creation means 72 (outputted to the outside as necessary) and displayed on any display.

The display examples in FIGS. 25A to 25C assume the following. A top word corresponding to a top page described in the fourth embodiment is "wall storage". First-layer words corresponding to first-layer pages that should be linked from the top page are "area", "economical", and "opinion". Second-layer words corresponding to second-layer pages that should be linked from the first-layer page the first-layer word of which is "area" are "Yokohama" and "Fukuoka". Second-layer words corresponding to second-layer pages that should be linked from the first-layer page the first-layer word of which is "economical" are "price", "budget", "mail order", "cost", and "low price". Second-layer words corresponding to second-layer pages that should be linked from the first-layer page the first-layer word of which is "opinion" are "low price", "stylish", and "recommended".

In the display examples in FIGS. 25A to 25C, a symbol X1 corresponding to the top page is displayed. A shape of the symbol X1 is not limited, but is, for example, a rectangle. The symbol X1 includes the top word "wall storage".

Below the symbol X1, symbols X1-1 to X1-3 corresponding to the first-layer pages are displayed. The symbols X1-1 to X1-3 include the first-layer words "area", "economical", and "opinion", respectively. This indicates that the first-layer page the first-layer word of which is "area" corresponds to the symbol X1-1. The same applies to "economical" and "opinion".

Arrangement order of the symbols X1-1 to X1-3 may be any order, but for example, this preferably is order of economic scale, alphabetical order, and AIUEO order.

It is desirable that these symbols X1-1 to X1-3 are aligned on a straight line (in the examples in FIGS. 25A and 25B, on a horizontal straight line). This is because it is easy to understand that all of them are of the first layer. The symbols X1-1 to X1-3 are associated with the symbol X1, and three arrows (which may be simple lines) from the symbol X1 to the symbols X1-1 to X1-3 are displayed. It may be said that the symbol X1 and the symbols X1-1 to X1-3 are associated with each other.

Further below the symbol X1-1, symbols X1-1-1 and X1-1-2 corresponding to the second-layer pages associated with the symbol X1-1 are displayed. The symbol X1-1-1 includes the second-layer word "Yokohama", indicating that the second-layer page the second-layer word of which is "Yokohama" corresponds to the symbol X1-1-1. The same applies to "Fukuoka".

Similarly, further below the symbol X1-2, symbols X1-2-1 to X1-2-5 corresponding to the second-layer pages associated with the symbol X1-2 are displayed. Further below the symbol X1-3, symbols X1-3-1 to X1-3-3 corresponding to the second-layer pages associated with the symbol X1-3 are displayed.

Herein, in this premise, the second-layer page related to "low price" should be linked from the first-layer page related "economical", and should also be linked from the first-layer page related "opinion". Therefore, as illustrated in FIG. 25A, the symbol X1-2-5 associated with the symbol X1-2 ("economical") and the symbol X1-3-1 associated with the symbol X1-3 ("opinion") may be displayed separately. Alternatively, as illustrated in FIG. 25B, one symbol X1-2-5 (X1-3-1) associated with both the symbol X1-2 ("economical") and the symbol X1-3 ("opinion") may be displayed. The user may select FIG. 25A or FIG. 25B.

Note that, it is desirable that the symbols X1-1-1, X1-1-2, X1-2-1 to X1-2-5, and X1-3-1 to X1-3-3 are aligned on a straight line. This is because it is easy to understand that all of the webpages corresponding to these symbols are of the second layer.

FIGS. 25A to 25C are examples of displaying up to the second-layer page, but the third-layer page and subsequent pages may be displayed similarly. Generally, in association with a symbol corresponding to a specific nth-layer page, a symbol corresponding to an (n+1)th-layer page that should be linked from the nth-layer page is arranged. Each symbol includes a word related to a corresponding webpage. It is desirable that the symbols corresponding to the webpages at the same layer are arranged on a straight line.

All the arrows (or lines) between the symbols may have the same display mode, or the display mode (color, thickness and the like) taking the economic scale (described in the first embodiment, the same shall apply hereinafter) into consideration. For example, in a case where the economic scale of "wall storage economical" is larger than that of "wall storage area", the arrow from the symbol X1 to the symbol X1-2 may be made thicker as illustrated in FIG. 25C. Such a display makes it easier to grasp the webpage that should be created with priority.

Moreover, in a case where there are a large number of lower-layer pages that should be linked from a certain webpage, it is possible to display the symbols corresponding to all of them, or only the symbol corresponding to a part of webpages that satisfy a specific criterion. The specific criterion may be, for example, a predetermined number in descending order of economic scale of words related to the lower-layer pages, or the economic scale equal to or larger than a threshold. The display mode (color, area, long side/short side in a case where the symbol is rectangular) of each symbol may be determined according to the hierarchy, or may be determined according to the hierarchy, the economic scale and the like.

When one symbol is selected, the display mode of the symbol including the word having a high degree of similarity to the word included in the symbol may be changed.

The user may variously edit on the screens illustrated in FIGS. 25A to 25C. That is, a website construction support device 7 may variously edit according to a user operation.

As an example of editing, a link (association between webpages (symbols)) may be added or deleted. As a more specific example, by adding an arrow from the symbol X1-3 of "opinion" to the symbol X1-2 of "economical" in FIG. 25A, the link from the webpage of "opinion" to the webpage of "economical" may be added (refer to FIG. 25D). By deleting the arrow between the symbol X1-3 of "opinion" and the symbol X1-2-5 of "low price" in FIG. 25A, the link therebetween may be deleted (refer to FIG. 25D).

At that time, it is possible that only the display on the screen changes, or the webpage creation means 72 may automatically edit a part of the created webpage. For example, at least a part of the description tag, h tag, and breadcrumbs in the HTML file may be updated on the basis of the word in the webpage corresponding to the added or deleted link.

As another example of editing, the webpage may be added or deleted. As a more specific example, by adding a symbol X1-4 corresponding to "brand" not existing in FIG. 25A, the webpage having "brand" as the first-layer word may be added (refer to FIG. 25E). By deleting the symbol X1-3-3 corresponding to "recommended" existing in FIG. 25A, it is possible to delete the webpage having "recommended" as the second-layer word (refer to FIG. 25E).

When editing is performed, it is possible that only the display on the screen changes, or the webpage creation means 72 automatically edits a part of the created webpage, and outputs the edited webpage as a file group of HTML or PHP that describes the same. For example, at least a part of the description tag, h tag, and breadcrumbs in the HTML file may be updated on the basis of the word in the added or deleted webpage.

FIG. 26 is a view illustrating another display example of the structure of the website. The premise of the display example is similar to that in FIGS. 25A to 25C. Although the description is not repeated, the matters described with reference to FIGS. 25A and 25B may be appropriately applied to the display example in FIG. 26.

In the display example in FIG. 26, the symbol X1 corresponding to the top page is displayed so as to be horizontally long. The symbol X1 includes the top word "wall storage".

Below the symbol X1, horizontally long symbols X1-1 to X1-3 corresponding to the first-layer pages are displayed. It may be said that the symbol X1 and the symbols X1-1 to X1-3 are associated with each other. It is desirable that these symbols X1-1 to X1-3 fit between a left end and a right end of the symbol X1. It is desirable that the symbols X1-1 to X1-3 are arranged on a straight line. Note that, there may be a gap between the symbol X1 and each of the symbols X1-1 to X1-3, or they may be displayed in contact with each other. There may be a gap between the symbols X1-1 to X1-3, or they may be displayed in contact with each other.

Below the symbol X1-1 corresponding to the first-layer page the first-layer word of which is "area", horizontally long symbols X1-1-1 and X1-1-2 corresponding to the second-layer pages that should be linked from the first-layer page are displayed. It may be said that the symbol X1-1 and the symbols X1-1-1 and X1-1-2 are associated with each other. It is desirable that these symbols X1-1-1 and X1-1-2 fit between a left end and a right end of the symbol X1-1.

Similarly, below the symbol X1-2 corresponding to the first-layer page the first-layer word of which is "economical", horizontally long symbols X1-2-1 to X1-2-5 corresponding to the second-layer pages that should be linked from the first-layer page are displayed. However, the symbols X1-2-1 to X1-2-5 are arranged in two rows.

FIG. 26 is the example of displaying up to the second-layer page, but the third-layer page and subsequent pages may be displayed similarly. Generally, on one side of the symbol corresponding to a specific nth-layer page (one side orthogonal to a direction in which the symbol extends, for example), the symbols corresponding to an (n+1)th-layer page that should be linked from the nth-layer page are arranged. It is desirable that the symbols corresponding to the (n+1)-layer page be arranged so as to fit between one end and the other end of the symbol corresponding to the nth-layer page.

In a case where there is a plurality of lower-layer webpages that should be linked to a certain webpage, a plurality of symbols may be arranged on a straight line in one row (symbols X1-1-1 and X1-1-2 in FIG. 26), or arranged in two or more rows in a case where the number of symbols is large (symbols X1-2-1 to X1-2-5 in FIG. 26).

With such a display, the structure of the website to be created may be intuitively grasped. Especially, it is suitable for comprehensively understanding the structure of the website.

Figure 27B:
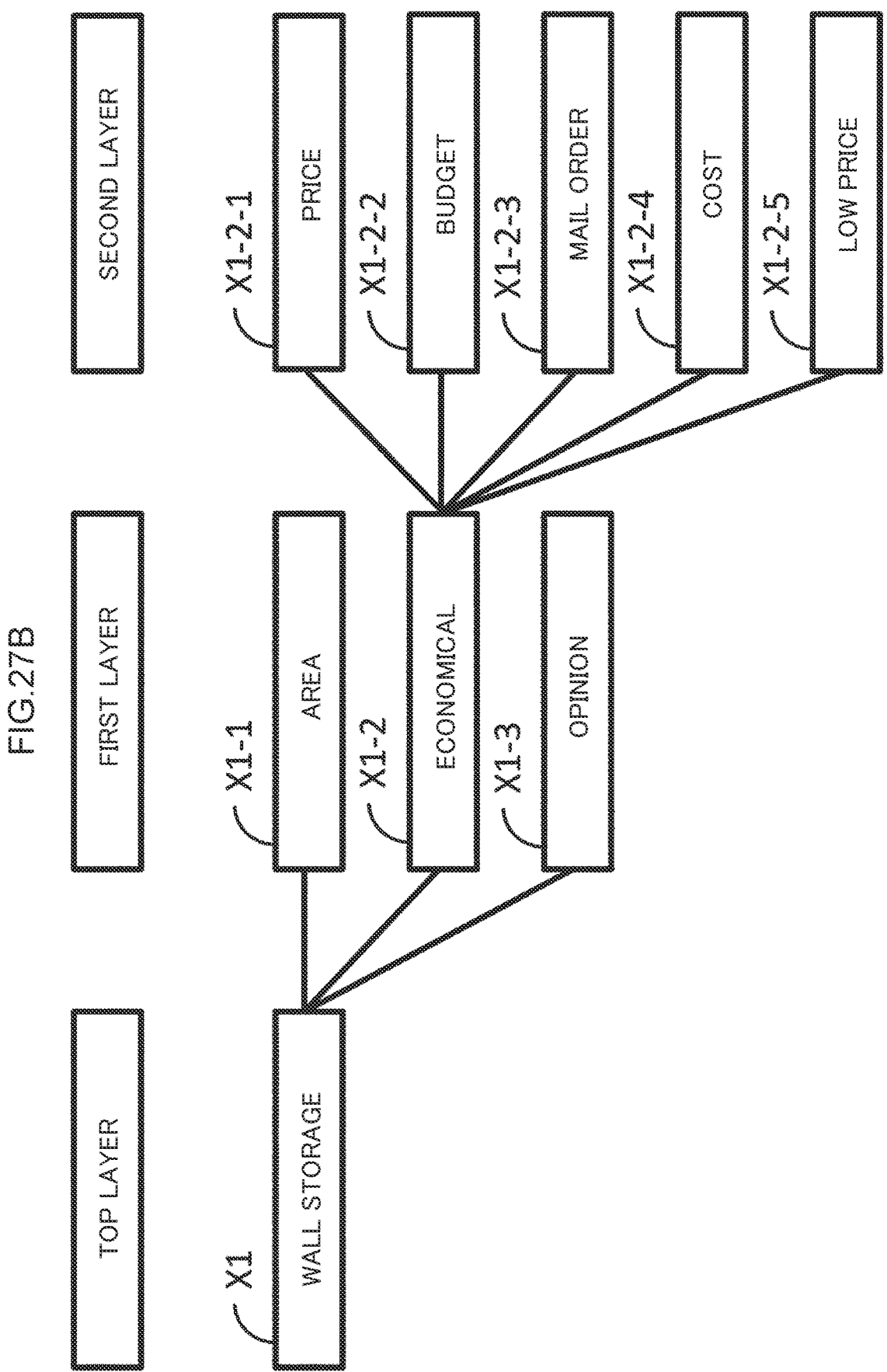
FIG. 27B is a view illustrating another display example of the structure of the website.

FIGS. 27A and 27B are views illustrating another display example of the structure of the website. The premise of the display example is similar to that in FIGS. 25A to 25C. Although the description is not repeated, the matters described with reference to FIGS. 25A, 25B, and 26 may be appropriately applied to the display example in FIGS. 27A and 27B.

In the display example in FIGS. 27A to 27B, the symbol X1 corresponding to the top page is displayed. A shape of the symbol X1 is not limited, but is, for example, a horizontally long rectangle. The symbol X1 includes the top word "wall storage".

On a right side of the symbol X1, the symbols X1-1 to X1-3 corresponding to the first-layer pages are displayed. The symbols X1-1 to X1-3 include the first-layer words "area", "economical", and "opinion", respectively. This indicates that the first-layer page the first-layer word of which is "area" corresponds to the symbol X1-1. The same applies to "economical" and "opinion".

The symbol X1 may be selected, and the symbols X1-1 to X1-3 may be displayed in a state in which the symbol X1 is selected, and the symbols X1-1 to X1-3 may be hidden in a state in which the symbol X1 is not selected.

It is desirable that the symbols X1-1 to X1-3 are aligned on a straight line (in the example in FIGS. 27A and 27B, on a vertical straight line). This is because it is easy to understand that all of them are of the first layer. The symbols X1-1 to X1-3 are associated with the symbol X1, and three lines (which may be arrows) from the symbol X1 to the symbols X1-1 to X1-3 are displayed. The symbols X1-1 to X1-3 are selectable.

FIG. 27A illustrates a state in which the symbol X1-1 is selected, and on a right side of the symbol X1-1, the symbols X1-1-1 and X1-1-2 corresponding to the second-layer pages that should be linked from the first-layer page corresponding to the symbol X1-1 are displayed. The symbol X1-1-1 includes the second-layer word "Yokohama", indicating that the second-layer page the second-layer word of which is "Yokohama" corresponds to the symbol X1-1-1. The same applies to "Fukuoka".

In a state in which the symbol X1-1 is selected illustrated in FIG. 27A, it is desirable that the symbol corresponding to the second-layer page that should be linked from the first-layer pages corresponding to the symbols X1-2 and X1-3 in an unselected state is not displayed.

FIG. 27B illustrates a state in which the symbol X1-2 is selected, and on a right side of the symbol X1-2, the symbols X1-2-1 to X1-2-5 corresponding to the second-layer pages that should be linked from the first-layer page corresponding to the symbol X1-2 are displayed. The symbol X1-2-1 includes the second-layer word "price", indicating that the second-layer page the second-layer word of which is "price" corresponds to the symbol X1-1-1. The same applies to "budget" and the like.

In a state in which the symbol X1-1 is selected illustrated in FIG. 27B, it is desirable that the symbol corresponding to the second-layer page that should be linked from the first-layer pages corresponding to the symbols X1-1 and X1-3 in the unselected state is not displayed.

For example, when the symbol X1-2 is selected in the state illustrated in FIG. 27A, the state illustrated in FIG. 27B is realized, and when the symbol X1-1 is selected in the state illustrated in FIG. 27B, the state illustrated in FIG. 27A is realized.

Although the description is omitted, the same applies to the symbols X1-3. Although FIGS. 27A and 27B are the example of displaying up to the second-layer page, the third-layer page and subsequent pages may be displayed similarly. Generally, when the symbol corresponding to a specific nth-layer page is selected, the symbol corresponding to an (n+1)th-layer page that should be linked from the nth-layer page is displayed. When the symbol corresponding to another nth-layer page is selected, the symbol corresponding to the (n+1)th-layer page that should be linked from the selected nth-layer page is displayed in place of the symbol corresponding to the displayed (n+1)th-layer page.

With such a display, the structure of the website to be created may be intuitively grasped. Especially, it is suitable for grasping the relationship between the webpages in the website.

FIG. 28A is a view illustrating another display example of the structure of the website. The premise of the display example is similar to that in FIGS. 25A to 25C. Although the description is not repeated, the matters described with reference to FIGS. 25A, 25B, 26, 27A, and 27B may be appropriately applied to the display example in FIG. 28A.

The display example in FIG. 28A is in a table format; a page ID (identification information) that specifies each webpage is displayed in a first row, and the layer of the webpage is displayed in a second row. In FIG. 28A, page ID: X1 corresponds to the top page. Page IDs: X1-1 to X1-3 correspond to the first-layer pages the first-layer words of which are "area", "economical", and "opinion", respectively. The second row indicates the layer of each webpage.

In third and subsequent rows, a part of the webpage created by the webpage creation means 72, more specifically, a part of the HTML file is displayed in association with the page ID. As an example, in FIG. 28A, tags such as URL, title, and description are illustrated; a part of them may be omitted or other information may be included.

For example, the URL or title associated with the top page the page ID of which is X1 (in other words, the URL or title in the HTML file that describes the top page) includes the top word "wall storage". The description and h2 tag include "area", "economical", and "opinion", which are the first-layer words of the first-layer pages that should be linked from the top page.

The URL or title associated with the first-layer page the page ID of which is X1-1 (in other words, the URL or title in the HTML file that describes the first-layer page) includes the corresponding first-layer word "area". The description and h2 tag include "Yokohama" and "Fukuoka", which are the second-layer words of the second-layer pages that should be linked from the first-layer page.

FIG. 28A is the example of displaying up to the first-layer page, but the second-layer page and subsequent pages may be displayed similarly. That is, in the display example in FIG. 28A, the page ID that specifies each webpage and a part of the HTML file that describes the webpage are displayed in association with each other. As a part of the HTML file, it is desirable that the word related to the webpage and the word related to a webpage that should be linked from the webpage are included.

The user may variously edit on the screen illustrated in FIG. 28A. That is, a website construction support device 7 may variously edit according to a user operation. In addition to the addition and deletion of the link already described, the screen illustrated in FIG. 28A is suitable for directly editing a part of the information of the webpage.

For example, it is possible to add "Tokyo" to the description and h2 tag the page ID of which is X1-1, and delete "mail order" from the description and h2 tag the page ID of which is X1-1 in FIG. 28A (refer to FIG. 28B). It goes without saying that the URL, title and the like may be edited in addition to the description and h tag.

With such a display, the contents of the HTML file on the website that should be created may be intuitively grasped. Therefore, a time for displaying the screen on the display may be shortened, and power consumption of the display may be reduced. It is preferable to output the electronic file that may be edited by spreadsheet software for such display.

Note that, the display example described above is merely an example. Some information may be omitted, additional information may be included, and the position, arrangement order, and direction in which the information is arranged may be changed as appropriate.

Sixth Embodiment

When formulating a customer attracting strategy using a website, it is often the case that a customer attracting effect is enhanced by effectively utilizing resources and reducing costs by making modifications on the basis of an existing website. At that time, by comparing an appropriate site structure based on search big data proposed by a system and the existing website to obtain a difference, it becomes possible to confirm a page that needs to be modified/added and a scale of a search query that should be targeted (the number of searches and economic efficiency), and to plan website modification while predicting cost performance. A sixth embodiment described next supports the customer attracting strategy based on the existing website by comparing the existing website structure with the appropriate website structure.

The website structure is a set of a plurality of webpages, and this may specifically be, a set of a plurality of websites connected by a link relationship or a set of a plurality of websites connected by a hierarchical relationship by a directory.

[Overall Configuration]

FIG. 29 is a block diagram illustrating a schematic configuration of a website construction support device according to the sixth embodiment. This website construction support device is provided with a reference site structure acquisition means 81, an existing site structure acquisition means 82, a matching means 83, and a display control means 84. At least a part of them may be implemented by a processor executing a predetermined program.

The reference site structure acquisition means 81 acquires a reference site structure indicating a plurality of reference nodes. Each reference node is associated with one or more title words, and may further be associated with one or more intra-node words. Each reference node corresponds to one webpage, and the associated title word and intra-node word indicate contents of the webpage. The title word and the intra-node word may be said to be a target of the search query for the webpage corresponding to the reference node. It is desirable that the reference site structure also indicates the link relationship in each of the plurality of reference nodes.

An example of the reference site structure is schematically illustrated in an upper stage of FIG. 30. Each rectangle corresponds to one reference node, and the word in the rectangle indicates the title word (the intra-node word is omitted). Lines between the rectangles indicate the link relationship. For example, the title word of a reference node P1 is "wall storage". Then, the reference node P1 is linked to a reference node P1-1 and the like the title word of which is "wall storage brand".

The reference site structure in this embodiment is an ideal website structure (easy to be a search target/having large economic scale), and desirably indicates the reference nodes corresponding to necessary and sufficient webpages and a necessary and sufficient link relationship thereof. An example in the upper stage of FIG. 30 may be said to be an ideal website structure of a website related to "wall storage".

Although a method for acquiring the reference site structure is any method, the reference site structure acquisition means 81 preferably acquires (generates) the reference site structure by applying a part or all of the methods described in the fourth embodiment. For example, the reference site structure acquisition means 81 specifies a word related to one or more websites that should be linked from a certain website on the basis of one or a plurality of search queries. Then, the reference node having the plurality of search queries as the title word or the intra-node word is linked to the reference node having the specified word as the title word or the intra-node word.

With reference to FIG. 29 again, the existing site structure acquisition means 82 acquires the existing site structure indicating the structure of the existing website to be evaluated. It is desirable that the existing site structure indicates a plurality of webpages and further indicates the link relationship in each of them. In the following, the webpage included in the existing site structure is also referred to as an "existing webpage".

An example of the existing site structure is schematically illustrated in a lower stage of FIG. 30. Each rectangle corresponds to one existing webpage. Lines between the rectangles indicate the link relationship. For example, an existing webpage Q1 is linked to an existing webpage Q1-1 and the like.

With reference to FIG. 29 again, the matching means 83 performs matching between each of the reference nodes included in the reference site structure and each of the existing webpages included in the existing site structure on the basis of the title word and/or the intra-node word.

Specifically, the matching means 83 specifies a correspondence relationship between each of the reference nodes and each of the existing webpages.

It may also be said that the matching means 83 determines whether a corresponding reference node exists in the reference site structure for each of the existing webpages, and whether a corresponding existing webpage exists in the existing site structure for each of the reference nodes. It may also be said that the matching means 83 classifies the existing webpages into that the corresponding reference node of which exists in the reference site structure and that the corresponding reference node of which does not exist there, and classifies the reference nodes into that the corresponding existing webpage of which exists in the existing site structure and that the corresponding existing webpage of which does not exist there.

The matching means 83 may perform matching between the link relationship among the plurality of reference nodes and the link relationship among the existing webpages. Specifically, the matching means 83 specifies a correspondence relationship between the link relationship among the plurality of reference nodes and the link relationship among the existing webpages.

It may also be said that the matching means 83 determines whether the corresponding link relationship exists in the reference site structure for the link relationship among the existing webpages, and whether the corresponding link relationship exists in the existing site structure for the link relationship among the reference nodes. It may also be said that the matching means 83 classifies the link relationships among the existing webpages into that the corresponding link relationship of which exists in the reference site structure and that the corresponding link relationship of which does not exist there, and classifies the link relationships among the reference nodes into that the corresponding link relationship of which exists in the existing site structure and that the corresponding link relationship of which does not exist there.

The display control means 84 displays a matching result on a display (not illustrated). Specific examples of the display are described later.

FIG. 31 is a flowchart illustrating an example of a processing operation of the website construction support device according to the sixth embodiment.

The reference site structure acquisition means 81 acquires the ideal reference site structure (step S51), and the existing site structure acquisition means 82 acquires the existing site structure to be evaluated (step S52). Note that, the existing site structure acquisition means 82 may acquire the existing webpage included in the existing site structure, and may further acquire the link relationship between the existing webpages. Then, the matching means 83 performs matching between each of the reference nodes and each of the existing webpages (step S53). This matching may include the matching between the link relationship in the reference site structure and the link relationship in the existing site structure. The display control means 84 displays the matching result on the display (step S54). Note that, order of steps S51 and S52 is any order. Hereinafter, each processing is described in detail.

[Existing Site Structure Acquisition Processing]

Figure 32:
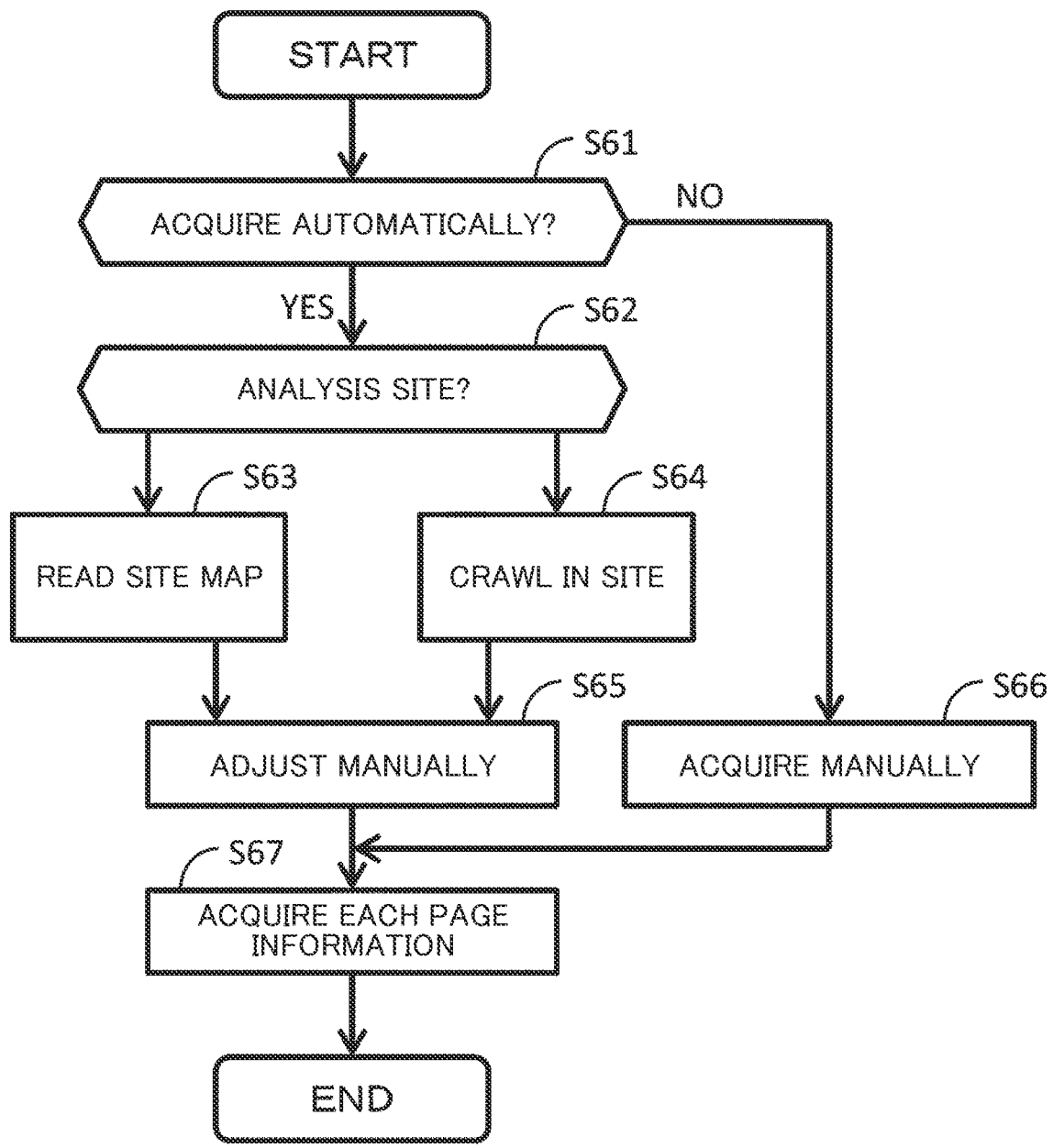
FIG. 32 is a flowchart illustrating an example of a procedure of an existing site structure acquisition processing by an existing site structure acquisition means 82.

FIG. 32 is a flowchart illustrating an example of a procedure of the existing site structure acquisition processing by the existing site structure acquisition means 82.

In the existing site structure acquisition means 82, a user sets whether to acquire the existing site structure manually or automatically (step S61).

In a case of automatic acquisition (YES at step S61), a site map or any URL of the existing site to be evaluated is designated as an analysis site by the user in the existing site structure acquisition means 82 (step S62).

In a case where the site map is designated as the analysis site, the existing site structure acquisition means 82 reads the site map (for example, XML file or HTML file) and acquires a structure indicated in the site map as a reference site structure (step S63).

Normally, it is possible to read from the site map, but in a case where the site map does not exist, or a case where the site map is old and does not reflect a current existing site structure, the user may manually designate the URL of the existing site to be evaluated as the analysis site. In this case, the existing site structure acquisition means 82 crawls in the existing site on the basis of the designated URL and acquires the site structure as the existing site structure (step S64).

The existing site structure acquisition means 82 manually adjusts the automatically acquired existing site structure on the basis of the instruction from the user as necessary (step S65).

The user may manually create the existing site structure and input the same to the existing site structure acquisition means 82. In other words, the existing site structure acquisition means 82 may acquire the existing site structure manually inputted by the user (step S66).

Then, the existing site structure acquisition means 82 acquires information of each existing webpage (step S67). This information is information for displaying a webpage on a web browser such as an HTML file, JavaScript, and CSS, for example, and the content of each existing webpage may be grasped from such information. In the following, it is described assuming that the reference site structure and the existing site structure illustrated in FIG. 30 are acquired.

[Check of Link Relation]

Figure 33:
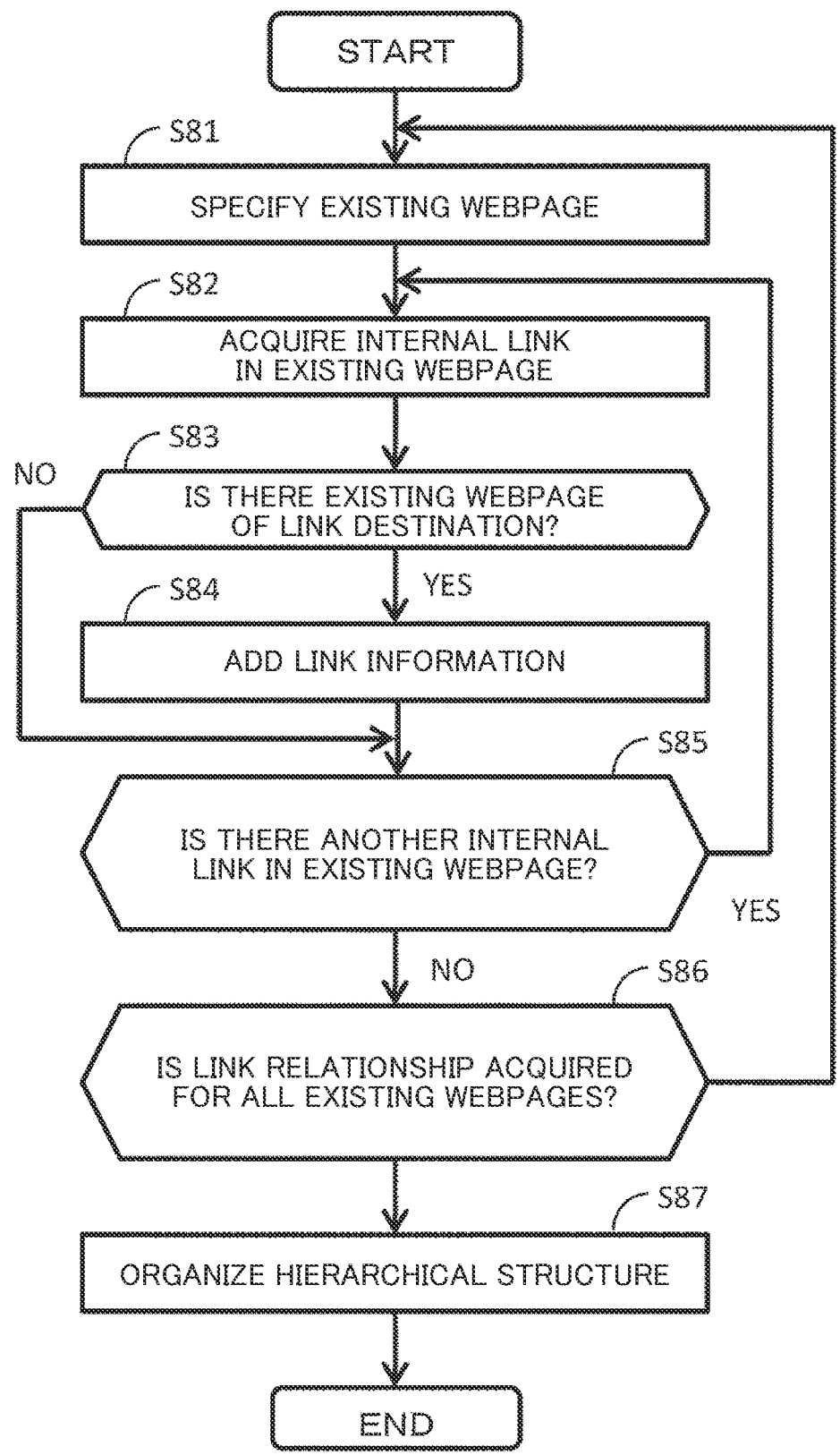
FIG. 33 is a flowchart illustrating an example of link relationship acquisition processing between existing webpages by the existing site structure acquisition means 82.

FIG. 33 is a flowchart illustrating an example of link relationship acquisition processing between the existing webpages by the existing site structure acquisition means 82. The existing site structure acquisition means 82 may acquire the link relationship between the existing webpages as follows on the basis of the information of the existing webpage.

First, the existing site structure acquisition means 82 specifies one existing webpage (step S81). Then, the existing site structure acquisition means 82 acquires an internal link in the existing webpage (step S82). Note that, the existing site structure acquisition means 82 does not have to acquire a link (external link) to a webpage that is not included in the acquired existing site structure. Subsequently, in a case where an acquired link destination is in the existing website structure (YES at step S83), the existing site structure acquisition means 82 adds information indicating that the existing webpage of the link destination is linked to the existing webpage specified at step S81 (step S84).

The above-described processing is performed for all the internal links in the existing webpage specified at step S81 (step S85). Moreover, the above-described processing is performed for all the existing websites in the existing website structure (step S86). Then, as necessary, the existing site structure acquisition means 82 organizes a hierarchical structure in response to a manual operation and the like from the user (step S87).

[Matching Processing]

Figure 34:
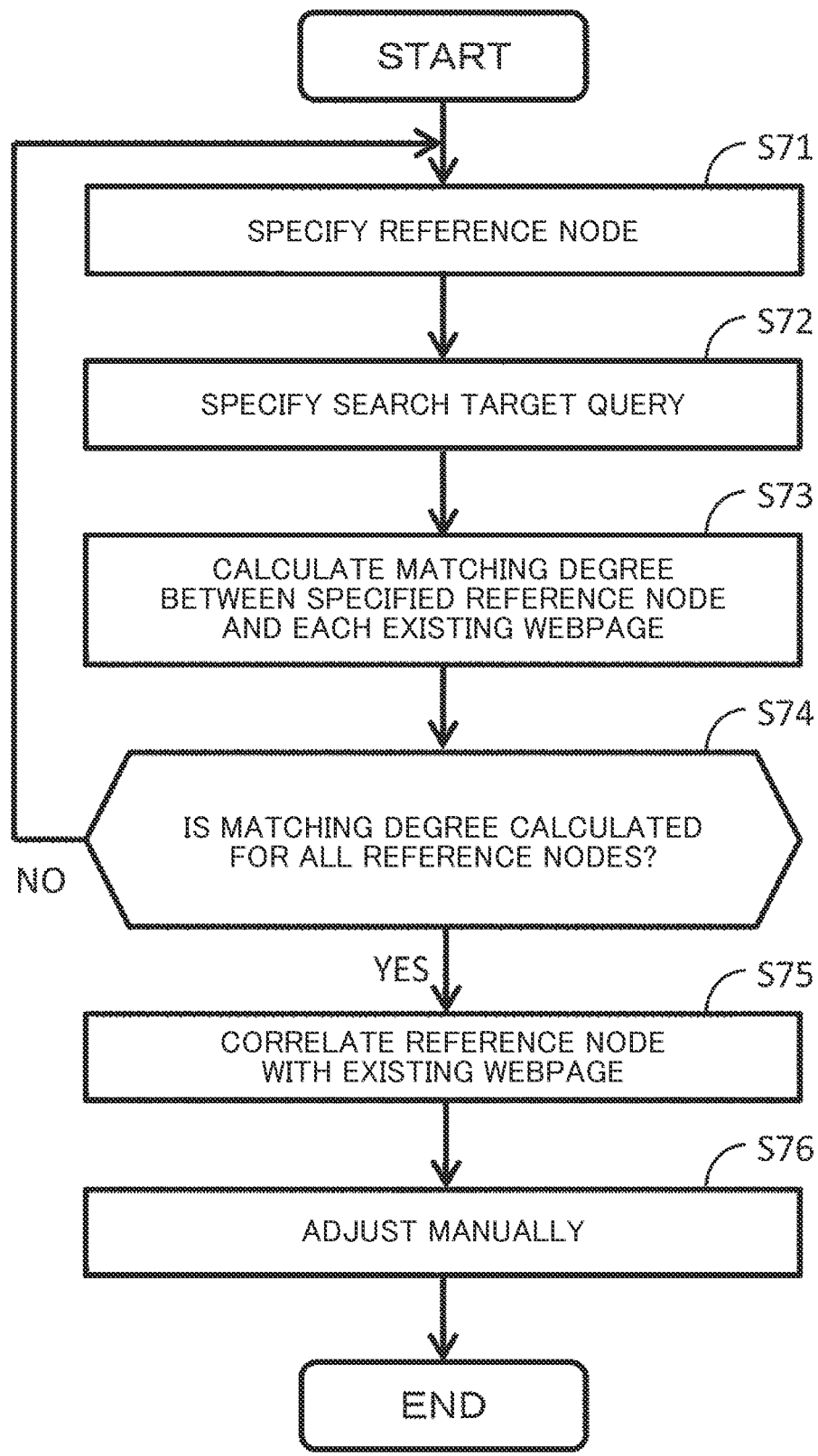
FIG. 34 is a flowchart illustrating an example of a procedure of matching processing by a matching means 33.

FIG. 34 is a flowchart illustrating an example of a procedure of matching processing by the matching means 33.

First, the matching means 33 specifies any one reference node (step S71). Then, the matching means 33 designates the title word and/or the intra-node word associated with the reference node as a search target query (step S72). Subsequently, the matching means 33 calculates a matching degree between the reference node specified at step S71 and each existing webpage on the basis of the search target query (step S73). Specific examples of matching degree calculation include a method utilizing search big data, a method using natural language processing, and a method combining them.

In a case of utilizing the search big data, it is possible to calculate the matching degree on the basis of a relationship between the designated search target query and search results by using a search engine. For example, in a case where the reference node P1-1 in FIG. 30 is specified at step S71, the search target query is "wall storage brand". In this case, the matching means 33 performs search with "wall storage brand" as the search query by the search engine. In a case where any of the existing webpages is included in the search results, the matching degree according to search ranking is assigned to the existing webpage. For example, in a case where the existing webpage Q1-1 ranks high in this search, the matching means 33 increases the matching degree between the reference node P1-1 and the existing webpage Q1-1.

The search results by the search engine reflect search needs. For example, when the search is performed with "wall storage brand" as the search query, the search engine tries to display the webpages that are highly possibly required by the searcher or the required webpages in a higher rank by content determination by the natural language processing or a behavior pattern analysis of the searchers. That is, this means that a webpage with a higher search ranking is more likely to meet the search needs of the "wall storage brand" searcher. Therefore, it is highly possible that the webpage with the higher search ranking at the time of "wall storage brand" search corresponds to the reference node P1-1 of "wall storage brand". By utilizing such a property of the search engine, it is possible to perform matching that highly possibly meets the search needs.

The search needs are also reflected to featuredsnippets displayed in the search results (those featured by the search engine at the top of the search results and the like; for example, an answer to a question such as "** is?" is made the search query is applicable). Regarding the webpage included in the search result information other than the search ranking, addition correction of the matching degree may be performed.

Note that, in addition to/in place of the search ranking, indicators such as the number of inflows, an acquired economy scale, the number of searches, a cost per click, and competitiveness related to the search query, and their statistical values (total value, average and the like) may be taken into consideration. The search target query may be only the title word of the reference node, but it is also possible to take into consideration indicators such as the number of inflows, an acquired economy scale, the number of searches, a cost per click, and competitiveness related to an intra-node word group, and their statistical values (total value, average and the like) by utilizing the intra-node word. These values may be real numbers or estimated values.

In a case of the natural language processing, the matching means 33 may calculate the matching degree with the reference node specified at S71 on the basis of how much each search query is included in or related to each existing webpage. As a specific example, the matching degree may be calculated on the basis of how much each existing webpage covers each search target query. Alternatively, the matching degree may be calculated on the basis of how many co-occurrence words required to describe each search target query are included or covered by each existing webpage. Alternatively, the matching degree between the content or description content of each existing webpage and the search target query may be calculated. Alternatively, the matching degree between a subject estimated from the content of each existing webpage and the search target query may be calculated. Alternatively, the matching degree may be calculated by performing evaluation using a model acquired by machine learning such as deep learning.

The matching means 33 calculates the matching degree between the reference node specified at step S71 and each existing webpage on the basis of the above-described examples or a combination thereof. By performing the above-described processing for all the reference nodes, the matching degree between each of the reference nodes and each of the existing webpages is calculated (YES at step S74).

Then, the matching means 33 correlates the reference site with the existing webpage on the basis of the matching degree (step S75). As an example, the matching means 33 may correlate the existing webpage with the highest matching degree with one reference node. Alternatively, the matching means 33 may correlate all the existing webpages the matching degree thereof with one reference node exceeds a predetermined threshold with the reference node. The matching means 33 may prevent, in a case where there is no existing webpage the matching degree of which with one reference node exceeds a predetermined threshold, the existing webpage from being correlated with the reference node.

Alternatively, the matching means 33 may present a plurality of existing webpages to the user for one reference node, and correlate one or a plurality of existing webpages with the one reference node on the basis of user selection. The plurality of presented existing webpages may be, for example, a predetermined number of existing webpages with a high matching degree, or may be the existing webpage with the matching degree exceeding a predetermined threshold.

By the above-described processing, the matching means 33 classifies the existing webpages into that correlated with one or a plurality of reference nodes (for example, the existing webpages Q1, Q1-1 and the like in FIG. 30) and that not correlated with any reference node (for example, an existing webpage Q1-2-1 in FIG. 30). The matching means 33 classifies the reference nodes into that correlated with one or a plurality of existing webpages (for example, the reference nodes P1, 1-1 and the like in FIG. 30) and that not correlated with any existing webpage (for example, reference nodes P1-3, P1-1-1 and the like in FIG. 30). Note that, there may be the existing webpage that is not correlated with any reference node, or there may be the reference node that is not correlated with any existing webpage.

Note that, in a lower stage of FIG. 30, for the existing webpage correlated with the reference node, the title word of the reference node is indicated in the rectangle. For the existing webpages that is not correlated with the reference node, the content of the existing webpage is indicated in the rectangle.

The existing webpage correlated with the reference node means that this includes the subject and content corresponding to the search needs, and it may be expected that the search ranking thereof may be easily raised. Hereinafter, the existing webpage correlated with the reference node is sometimes referred to as a "page with correlation".

In contrast, the existing webpage that is not correlated with any reference node may be regarded as not meeting the search needs and susceptible to be coldly treated by the search engine with those search words. Hereinafter, the existing webpage that is not correlated with the reference node is sometimes referred to as an "excessive page".

The reference node that is not correlated with any existing webpage means that there is no webpage corresponding to those search needs in the existing site, and this may be regarded as being susceptible to be coldly treated by the search engine with those search words and difficult to acquire search inflows that should be essentially acquired. Conversely, such reference node indicates desirable subject and content with which a new webpage is created. Hereinafter, the reference node that is not correlated with the existing webpage is sometimes referred to as a "lacking page".

As described with reference to FIG. 33, by acquiring the link relationship between the existing webpages, the matching means 83 may perform the matching between the link between the existing webpages and the link between the reference nodes to acquire the correspondence. That is, the matching means 83 classifies the links in the existing site structure into that correlated with any link in the reference site structure and that not correlated with any link in the reference site structure. The matching means 83 classifies the links in the reference site structure into that correlated with any link in the existing site structure and that not correlated with any link in the existing site structure.

Hereinafter, for the sake of description, it is assumed that an existing webpage A and a reference node A' correspond to each other, and an existing webpage B and a reference node B' correspond to each other.

In a case where the reference node A' and the reference node B' are linked, and the existing webpage A and the existing webpage B are linked, such link is referred to as a "link with correlation". The "link with correlation" indicates that the existing webpage A and the existing webpage B are properly linked.

In contrast, in a case where the existing webpage A and the existing webpage B are not linked though the reference node A' and the reference node B' are linked, such link is referred to as a "lacking link". The "lacking link" means that although the existing webpage A and the existing webpage B should be linked, they are not linked currently, in other words, the existing webpage A and the existing webpage B should be linked.

In contrast, in a case where the existing webpage A and the existing webpage B are linked though the reference node A' and the reference node B' are not linked, such link is referred to as an "excessive link". The "excessive link" means that this is not a necessarily important link.

Note that, the existing site structure may include a large number of links. In such a case, the matching means 83 does not perform the matching between all the links in the existing site structure and the links in the reference site structure, but may perform matching between only the link related to the page with correlation with the link in the reference site structure.

[Display Control Processing]

FIG. 35A is a screen example illustrating a matching result displayed on a display by the display control means 84. On the display, the existing site structure and the reference site structure are displayed on one screen, so that both the structures are easily compared with each other. In the illustrated example, each of the existing webpages included in the existing site structure is represented by a specific symbol (any figure, hereinafter a rectangle). The title word of the reference node correlated with the existing webpage is included therein. However, an appropriate word is included in the symbol indicating the existing webpage that is not correlated with the reference node. (For example, "wall storage outlet" in the existing webpage Q-1-2). The word may be a word included in a title or a h1 tag of the existing webpage, or a word indicating the content of the existing webpage. Alternatively, a search engine may be utilized to set the word, and as a specific example, this may be the word with which the existing webpage is hit by the search engine (preferably with a high search ranking).

The reference site structure is almost similar. However, the title word of the reference node is included in the symbol indicating the reference node.

It is desirable that the display control means 84 displays the "page with correlation" in the existing site structure and the reference site structure, the "excessive page" in the existing map site, and the "lacking page" in the reference site structure in different modes from each other. The different modes include, for example, different colors and sizes of symbols, different colors, sizes, and scripts of characters, different line types of symbols, hatching on symbols and the like.

For example, the existing webpage Q1-2-1 related to "wall storage outlet" in the existing site structure is the "excessive page" the corresponding reference node of which does not exist. Since this is displayed in a different mode from that of the "page with correlation" and the "lacking page", the user may easily grasp that the existing webpage Q-2-1 is the "excessive page".

In contrast, the reference node P1-3 related to "wall storage area" in the reference site structure is the "lacking page" the corresponding existing webpage of which does not exist. Since this is displayed in a different mode from the "page with correlation" and the "lacking page", the user may easily grasp that the reference node P1-3 is the "lacking page", in other words, the webpage corresponding to the reference node P1-3 (the webpage the content (target) of which is "wall storage area") should be newly created.

In FIG. 35A, the line connecting the rectangles indicating the existing webpages indicates the link relationship. Similarly, the line connecting the rectangles indicating the reference nodes indicates the link relationship. However, it is possible that the line indicating the link relationship is not displayed, or the user may select whether to display the line.

Moreover, there may be a case where a specific existing webpage in the existing site structure and a specific reference node in the reference site structure correspond to each other, but the link relationship does not correspond. In such a case, as illustrated in FIG. 35B, the display control means 85 may display the link with correlation, the excessive link, and the lacking link in different modes.

Figure 35B:
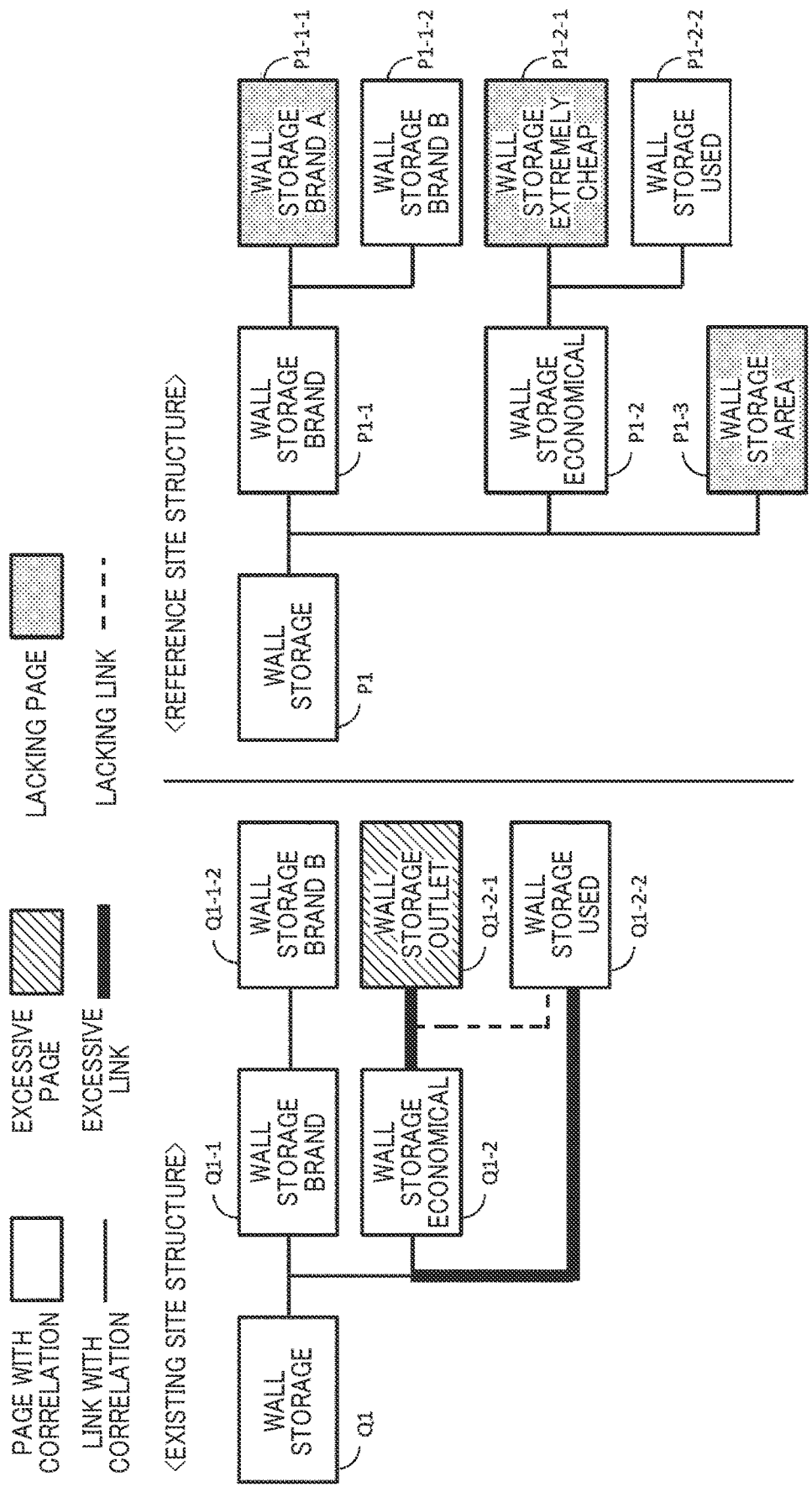
FIG. 35B is a screen example illustrating a matching result displayed on the display by the display control means 84.

For example, according to FIG. 35B, an existing webpage Q1-2-2 of "wall storage used" is an appropriate "corresponding page" corresponding to the reference node P1-2-2. However, in the reference site structure, the reference node P1-2 of "wall storage economical" is linked to the reference node P1-2-2 of "wall storage used", but the corresponding link is the "lacking link" that does not exist in the existing site structure. Therefore, the user may easily visually grasp that the existing webpage Q1-2 of "wall storage economical" and the existing webpage Q1-2-2 of "wall storage used" should be linked.

In contrast, although the reference node P1 of "wall storage" is not linked to the reference node P1-2-2 of "wall storage used" in the reference site structure, the existing webpage Q1 of "wall storage" is linked to the existing webpage Q1-2-2 of "wall storage used", so that this is the "excessive link" in the existing site structure. Therefore, the user may easily visually grasp the existence of such excessive link.

FIG. 36 is another screen example illustrating the matching result displayed on the display by the display control means 84. A screen in which the existing site structure and the reference site structure are collected is displayed on the display. In this case also, it is desirable that the display control means 84 displays the "page with correlation", the "excessive page", and the "lacking page" in different display modes.

FIGS. 37A to 37C illustrate another screen example illustrating the matching result displayed on the display by the display control means 84. In this example, it is possible to switch display/non-display of the "page with correlation", "excessive page", and "lacking page". FIG. 37A illustrates a state in which all the pages are displayed, FIG. 37B illustrates a state in which only the "page with correlation" and "lacking pages" are displayed, and FIG. 37C illustrates a state in which the "page with correlation" and "excessive page" are displayed. Note that, the display control means 84 may always display a part of the "page with correlation", "excessive page", and "lacking page", and may switch the display/non-display of another part.

As illustrated in FIGS. 37A to 37C, a check box is provided on the screen (for example, upper part of the screen) for selecting whether to display the "page with correlation". When the user checks the check box by a predetermined operation, the "page with correlation" is displayed. In contrast, when the check box is unchecked, the "page with correlation" is hidden. The same applies to other "excessive page" and "lacking page". The display control means 84 may switch display/non-display each time the check box is checked or each time the check box is unchecked. Alternatively, the display control means 84 may switch display/non-display reflecting the check state in response to a predetermined screen update operation performed by the user.

Note that, in FIGS. 37A to 37C, as in FIG. 35B, the display control means 85 may display the link with correlation, the excessive link, and the lacking link in different modes. Then, by providing check boxes similar to those in FIGS. 37A to 37C, it is possible to switch display/non-display of each of the "link with correlation", "excessive ink" and "lacking link".

Figure 38B:
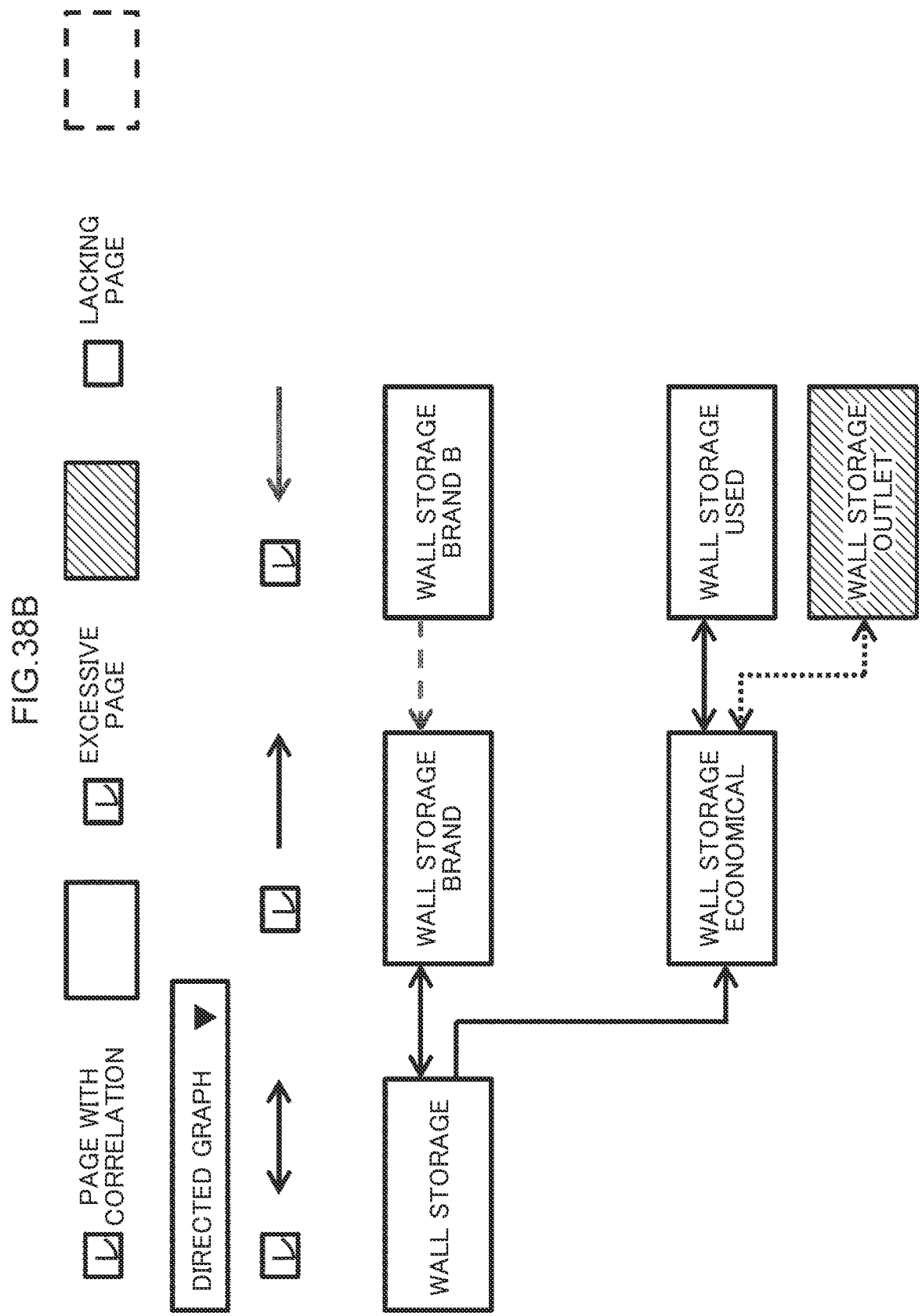
FIG. 38B is another screen example illustrating the matching result displayed on the display by the display control means 84.

FIGS. 38A to 38C illustrate another screen example illustrating the matching result displayed on the display by the display control means 84. In addition to or in place of switch of display/non-display of each page described with reference to FIGS. 37A to 37C, it is possible to switch whether to indicate the link relationship between the webpages (the line connecting the rectangles indicating the webpages) by an undirected graph or a directed graph. FIG. 38A illustrates a state by the undirected graph. FIGS. 38B and 38C illustrate the state by the directed graph.

For example, in an upper part of the screen, a pull-down menu for exclusively selecting either "undirected graph" or "directed graph" is provided. When "undirected graph" is selected by the user operation, as illustrated in FIG. 38A, a screen in which the rectangles indicating the webpages are connected by the undirected graph is displayed. The undirected graph indicates that the webpage at one end thereof and the webpage at the other end thereof are linked in both directions or in one direction.

When "directed graph" is selected in the pull-down menu, as illustrated in FIGS. 38B and 38C, a check box is provided for selecting whether to display each of a bidirectional graph, a right-pointing one-way graph, and a left-pointing one-way graph. The bidirectional graph indicates that the webpages at both ends thereof are bidirectionally linked. The right-pointing one-way graph and left-pointing one-way graph indicate that the webpage at a root of each graph is linked to the webpage at a tip.

FIG. 38B illustrates a state in which all of the bidirectional graph, right-pointing one-way graph, and left-pointing one-way graph are displayed. FIG. 38C illustrates a state in which only the bidirectional graph is displayed. Note that, in FIGS. 38B and 38C, the "lacking page" is hidden.

For example, in FIGS. 38B and 38C, the existing webpage and reference node of "wall storage" and the existing webpage and reference node of "wall storage brand" are bidirectionally linked. In FIG. 38B, the existing webpage and reference node of "wall storage" are linked to the existing webpage and reference node of "wall storage economical".

Herein, the graph indicating the link between the pages with correlation and the graph indicating the link between the page with correlation and the excessive page may be displayed in different display modes. The graph indicating the link between the pages with correlation and the graph indicating the link between the page with correlation and the lacking page may be displayed in different display modes. For example, since "wall storage outlet" is the excessive page, the graph between this and the webpage of "wall storage economical" is indicated by a dotted line.

Figure 39A:
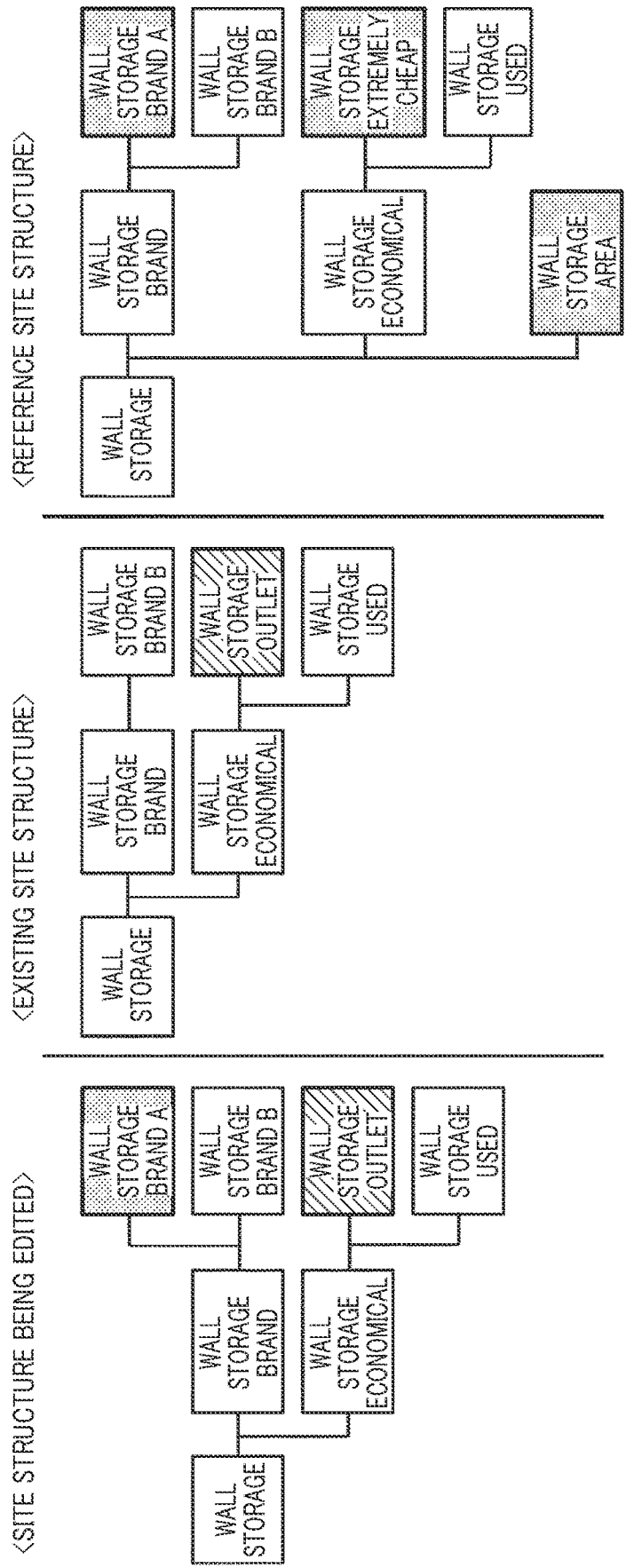
FIG. 39A is another screen example displayed on the display by the display control means 84.

FIG. 39A is another screen example displayed on the display by the display control means 84. This screen includes a site structure being edited in addition to the matching result. For example, the existing site structure is displayed in the center of the screen, and the reference site structure is displayed on a right side of the screen. Then, the site structure being edited is displayed on a left side of the screen.

The user may visually perform an edition work such as deleting any existing webpage (for example, the excessive page), adding any page (for example, the lacking page), or changing the link relationship (for example, deleting the excessive link and adding the lacking link) in the site structure being edited by a user operation such as drag on the screen. That is, the display control means 84 modifies the existing site structure according to the user operation. Alternatively, the display control means 84 may automatically perform at least a part of the above-described edition work.

The display control means 84 may output (at least a part of) an HTML file that reflects a result of the edition work. That is, a function of the webpage creation means 72 in the fourth embodiment may be provided in the display control means 84 (refer to FIGS. 23A and 23B). For example, by adding and deleting the pages and changing the link relationship, URLs, breadcrumbs and the like may be changed.

Such HTML files may be generated in real time according to the edition work, or may be collectively generated at a timing at which the user to designates the generation of the HTML files. In the former case, the display control means 84 may display the HTML file that is changed in real time according to the edition work on the screen in FIG. 39A.

According to such screen, the user may efficiently perform a work such as newly creating the lacking page or deleting the excessive page in the existing site structure while looking at the reference site structure.

Figure 39B:
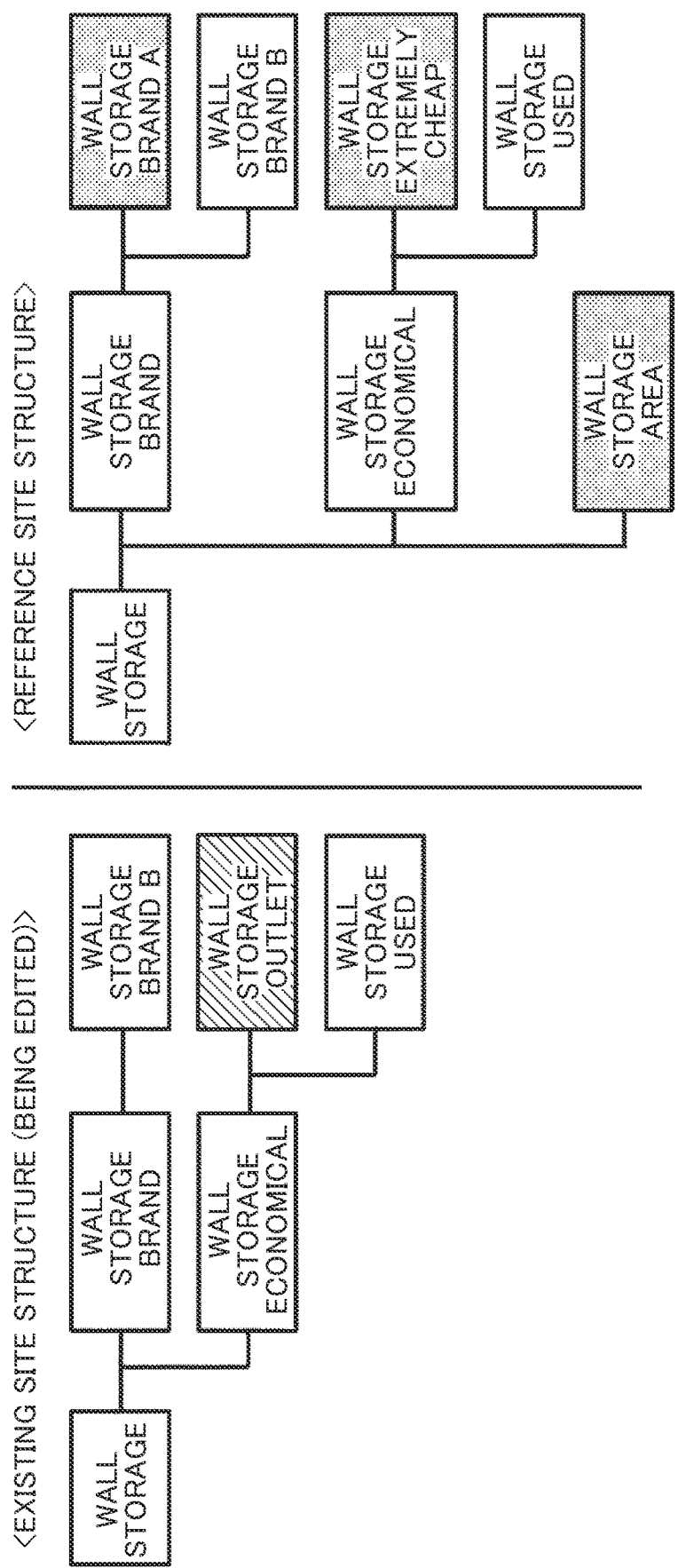
FIG. 39B is another screen example displayed on the display by the display control means 84.

By displaying in this manner, the modification of the existing site to be evaluated becomes easy. Note that, FIG. 39A is an example in which the site structure being edited is added to the screen in FIG. 35, but the display control means 84 may display the screen obtained by adding the site structure being edited to any screen displaying the matching result (for example, the screen in FIGS. 36 to 38C). As illustrated in FIG. 39B, the display control means 84 may display the existing site structure and the reference site structure so that the existing site structure may be edited.

FIG. 40 is another screen example displayed on the display by the display control means 84. This screen includes accompanying information in addition to the matching result. The accompanying information may be an indicator such as the search result of the existing webpage or the economic scale such as the (estimated) number of inflows, for example. This economic scale may be acquired, for example, by the existing site structure acquisition means (for example, from the search engine).

Note that, FIG. 40 is an example in which the accompanying information is added to the screen in FIG. 35, but the display control means 84 may display the screen obtained by adding the accompanying information to any screen displaying the matching result (for example, the screen in FIGS. 36 to 39). The display control means 84 may display the accompanying information in association with all the existing webpages, or may display the accompanying information in association with a part of the existing webpages (for example, a predetermined number of existing webpages in descending/ascending order of the economic scale, the existing webpage the economic scale of which is larger/smaller than a threshold).

Figure 41A:
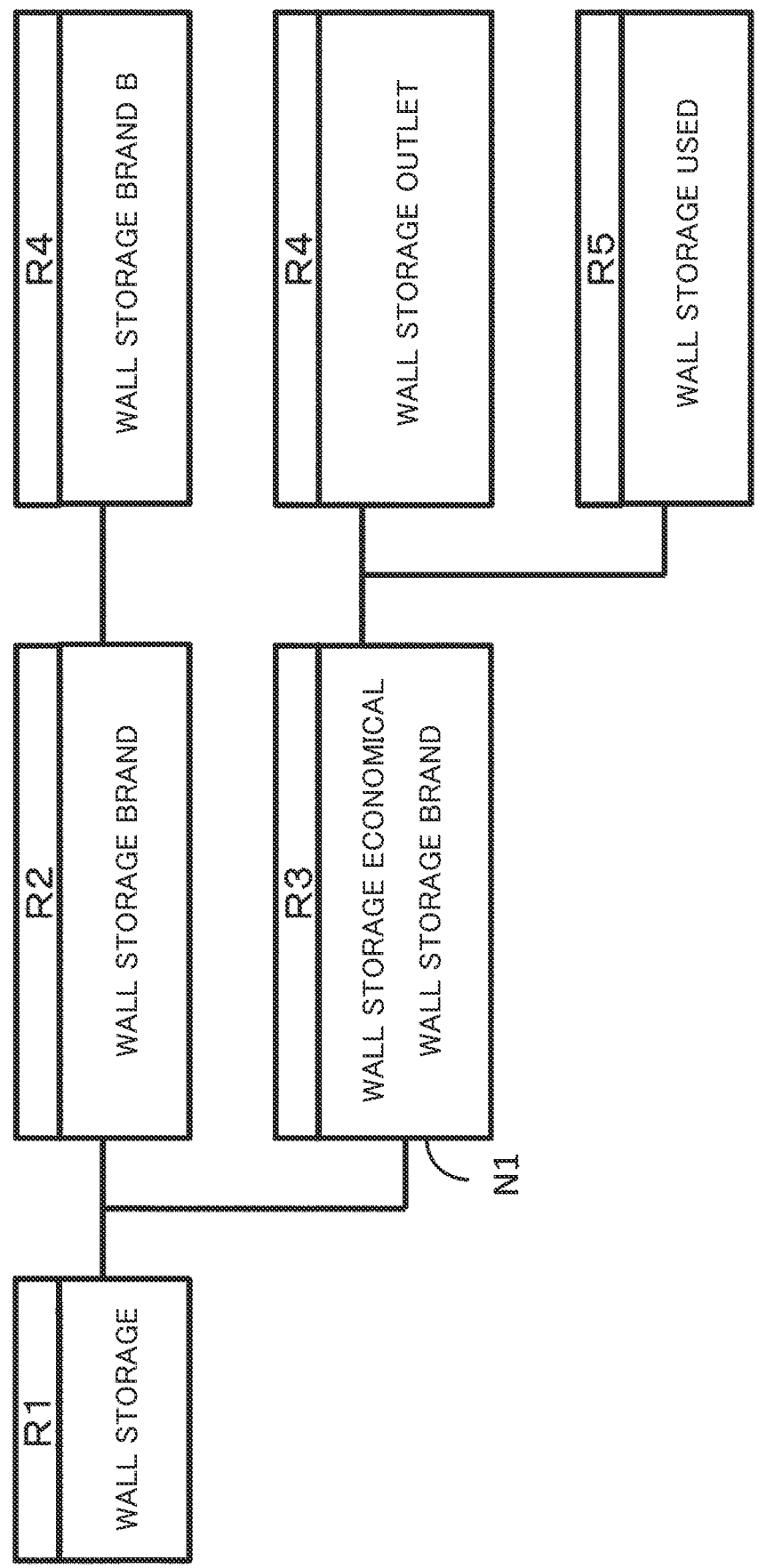
FIG. 41A is another screen example displayed on the display by the display control means 84.
Figure 41B:
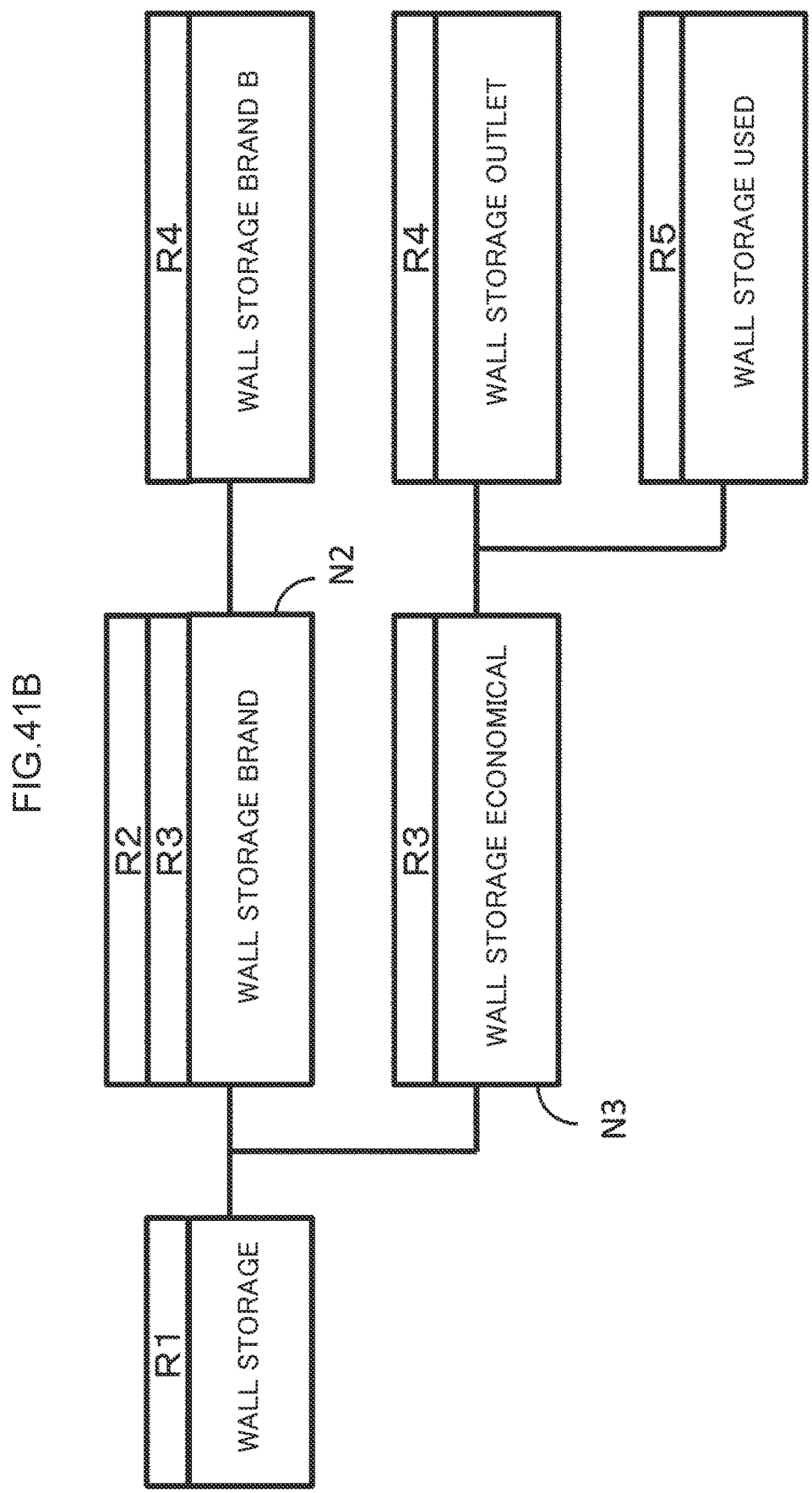
FIG. 41B is another screen example displayed on the display by the display control means 84.

FIGS. 41A and 41B illustrate another screen example displayed on the display by the display control means 84. In these drawings, it is assumed that a certain existing webpage R3 is associated with two words "wall storage economical" and "wall storage brand" (for example, correlated with two reference nodes "wall storage economical" and "wall storage brand" by the processing in FIG. 31). In this case, it may be said that the existing webpage 3 targets two search queries "wall storage economical" and "wall storage brand" (that is, this aims to be hit by these search queries). It is assumed that an existing webpage R2 is associated with "wall storage brand". It may be said that the existing webpage R2 targets "wall storage brand".

FIG. 41A illustrates an example of displaying the existing site structure on the basis of the page, and one existing webpage is represented by one symbol (figure such as a rectangle). As described above, the existing webpage R3 is associated with the two words, but since this is one existing webpage, the existing webpage R3 is displayed as one symbol N1 in this display example. Then, the two words "wall storage economical" and "wall storage brand" are displayed in the symbol N1 and it is indicated that the existing webpage R3 corresponds to the same. With such display, it is easy to grasp a formal relationship between the existing webpages in the existing site structure.

FIG. 41B illustrates an example of displaying the existing site structure on the basis of the target, and one target is represented by one symbol (figure such as a rectangle). For example, the existing webpage R2 and the existing webpage R3 are common in that the word "wall storage brand" is associated (targeted). Therefore, these two existing webpages R2 and R3 are represented by one symbol N2. Then, the word "wall storage brand" as the target is displayed in the symbol N2 and it is indicated that the existing webpages R2 and R3 correspond to the same. In this manner, a plurality of existing webpages having the common target may be represented by one symbol.

In contrast, the existing webpage R3 is also associated with the word "wall storage economical". Therefore, apart from the symbol N2, the existing webpage R3 is also represented by a symbol N3. Then, the word "wall storage economical" as the target is displayed in the symbol N3 and it is indicated that the existing webpage R3 corresponds to the same. With such a display, it is easy to grasp the relationship based on the target of each existing webpage in the existing site structure (for example, the fact that there is a plurality of existing webpages having the common target).

Note that, the display control means 84 may display only FIG. 41A, display only FIG. 41B, and switch between the display in FIG. 41A and the display in FIG. 41B according to an instruction from the user.

Figure 42A:
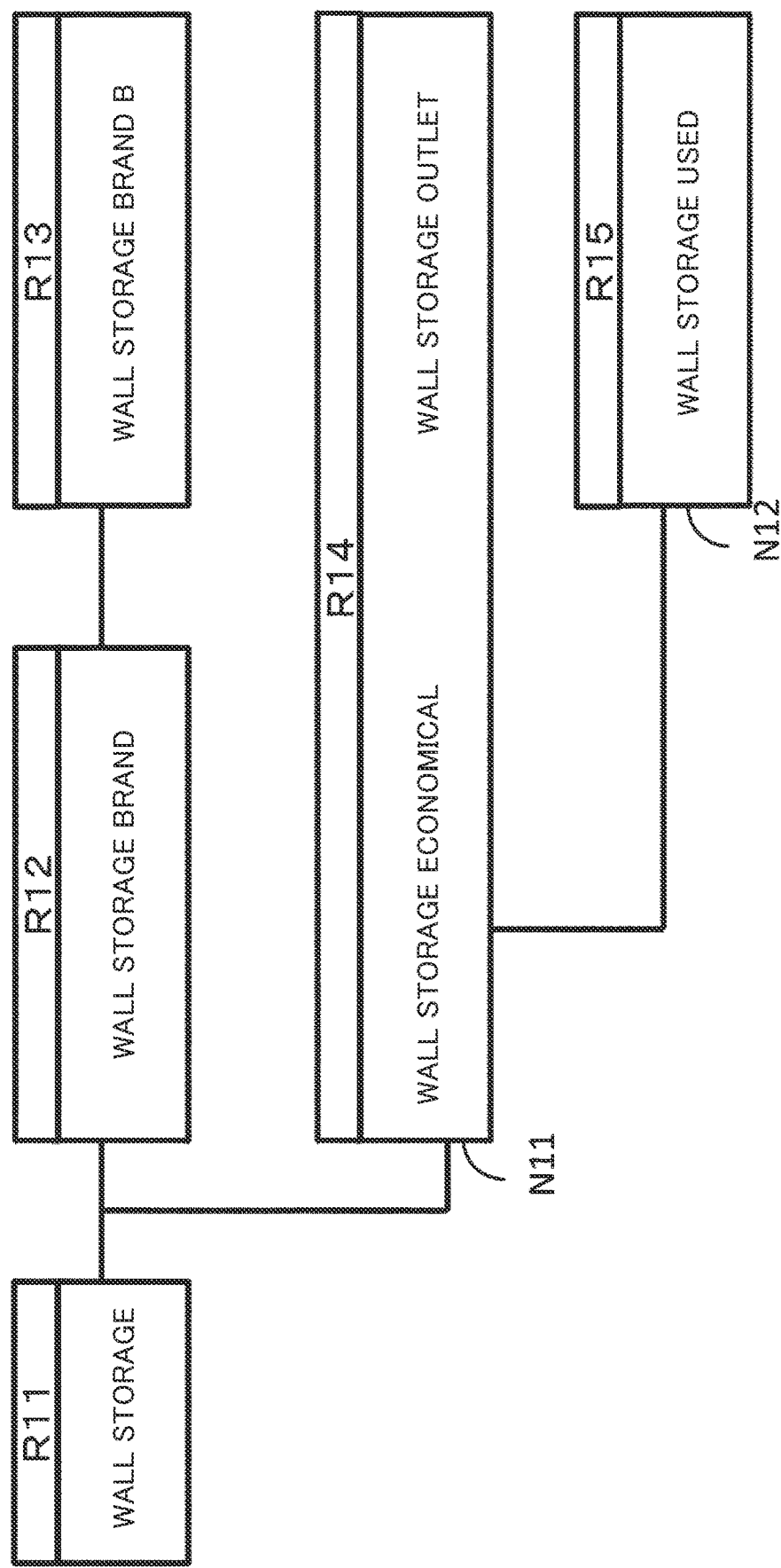
FIG. 42A is another screen example displayed on the display by the display control means 84.

FIGS. 42A and 42B illustrate another screen example displayed on the display by the display control means 84. In these drawings, it is assumed that a certain existing webpage R14 is associated with two words "wall storage economical" and "wall storage outlet". "Outlet" corresponds to a lower layer of "economical". The word "wall storage used" is associated with an existing webpage R15, and "used" also corresponds to the lower layer of "economical". "Outlet" and "used" are in the same layer, but "economical" is in the different layer from that of "outlet" and "used".

In FIG. 42A, one existing webpage is represented by one symbol (a figure such as a rectangle). However, as described above, the existing webpage R14 is associated with two words in different layers. Therefore, one symbol N11 indicating the existing webpage R14 straddles two layers. That is, the existing webpage with which a plurality of words in different layers is associated is displayed as a single symbol across the layers. Then, "wall storage economical" is displayed on an upper layer side in the symbol N11, and "wall storage outlet" is displayed on a lower layer side. A symbol N12 indicating the existing webpage R15 is connected from the upper layer side of the symbol N11. With such display, it is easy to grasp a formal relationship between the existing webpages in the existing site structure and a hierarchical relationship between the words.

In FIG. 42B, one existing webpage with which a plurality of words in the different layers is associated is represented by a plurality of symbols (shapes such as rectangles). For example, the existing webpage R14 is represented by a symbol N13 corresponding to "wall storage economical" and a symbol N14 corresponding to "wall storage outlet".

The description above is to evaluate the existing site structure (and to eventually support modification thereof) by comparing the existing site structure with the reference site structure. In this embodiment, as described below, the existing webpage in the existing site structure may be compared with the corresponding reference node in the reference site structure, and the existing webpage may be evaluated (and eventually, the modification thereof may be supported).

Figure 43A:
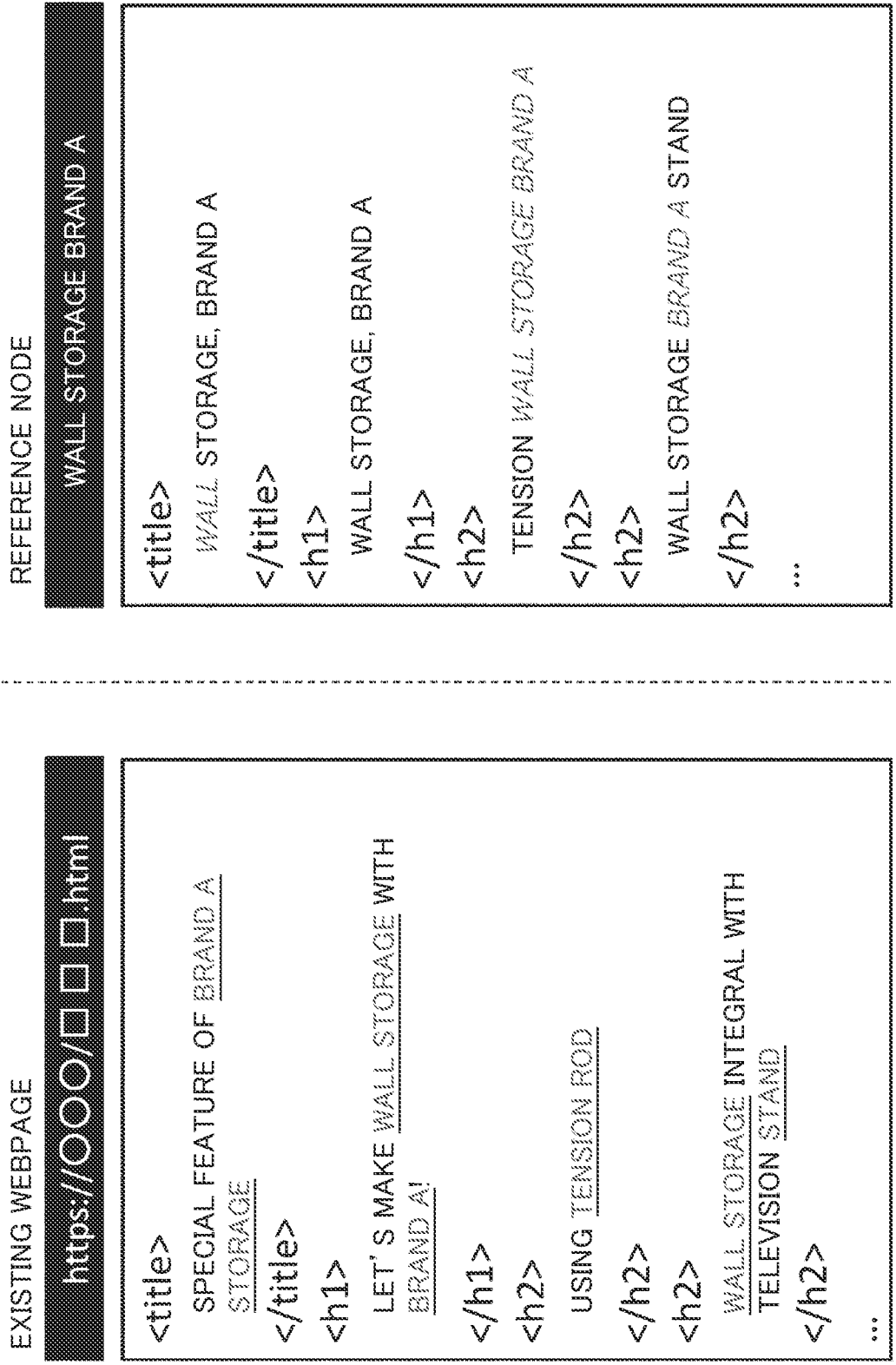
FIG. 43A is another screen example illustrating the matching result displayed on the display by the display control means 84.
Figure 43B:
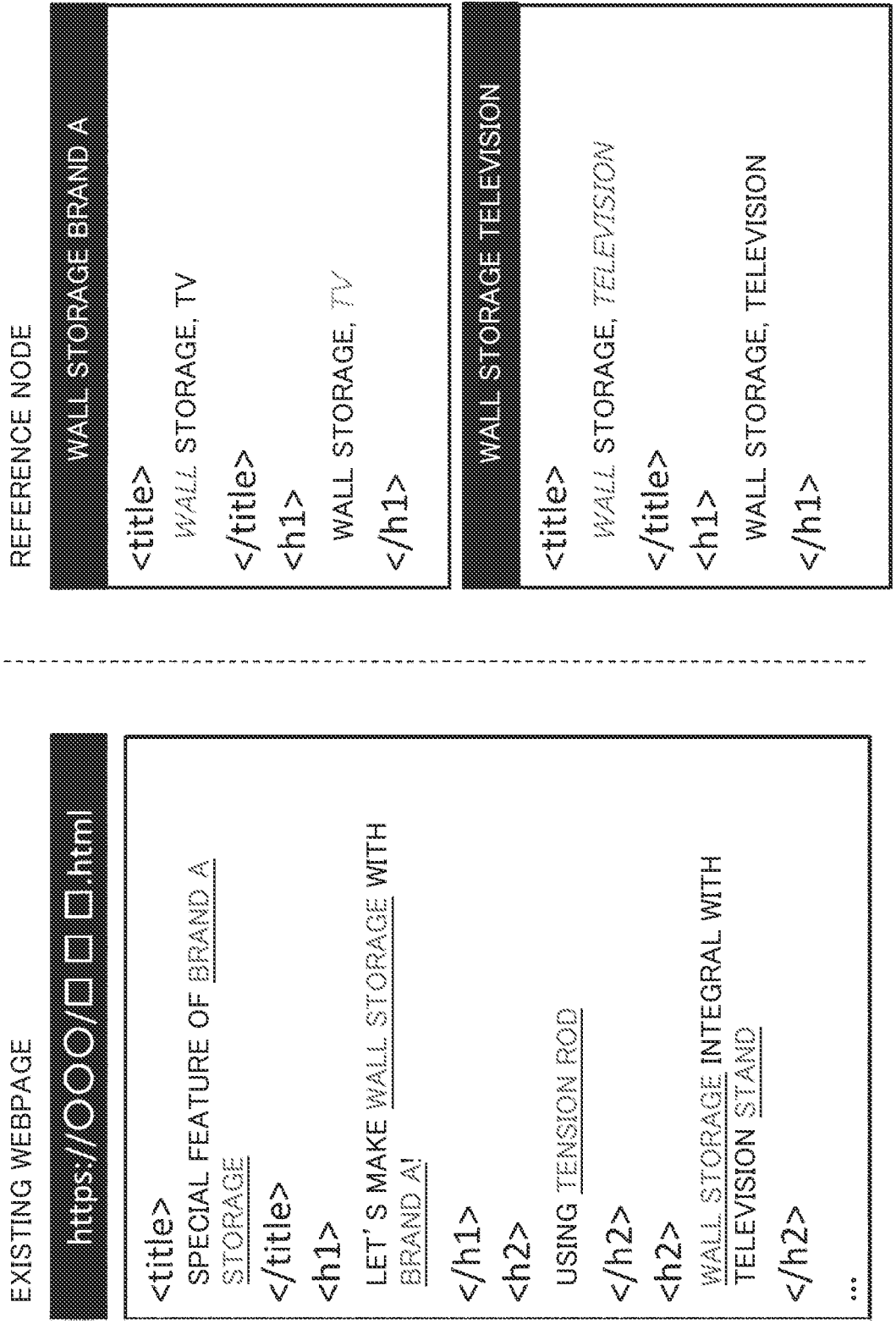
FIG. 43B is another screen example illustrating the matching result displayed on the display by the display control means 84.

FIGS. 43A and 43B illustrate another screen example illustrating the matching result displayed on the display by the display control means 84. As illustrated in FIGS. 43A and 43B, the display control means 84 may display a part of the HTML file that describes a specific existing webpage and a part of the HTML file corresponding to the reference node corresponding to this side by side. Note that, FIG. 43B illustrates a case where a plurality of reference nodes is correlated with one existing webpage.

The HTML file corresponding to the existing node may be automatically created by applying the fourth embodiment (refer to FIGS. 23A and 23B). Alternatively, this may be created by setting the title word of the existing node in a title or a h1 tag, and setting the intra-node word in a h2 tag.

Herein, focusing on a specific tag (for example, the title tag), the word included in the tag of the reference node and also included in the tag of the corresponding existing webpage is called a "word with correlation". It may be said that such "word with correlation" included in the tag of the existing webpage is an appropriate word.

In contrast, a word included in the tag of the existing webpage but is not included in the tag of the corresponding reference node is called an "excessive word". Since the reference node indicates the webpage that should exist, and such "excessive word" is not included in the reference node, it is considered that this may be deleted from the tag of the existing webpage.

A word included in the tag of the reference node but is not included in the tag of the corresponding existing webpage is called a "lacking word". Since this is included in the reference node, it may be desirable to add such "lacking word" to the tag of the existing webpage.

Therefore, the display control means 84 desirably displays the "word with correlation" in the existing webpage and the reference node, the "excessive word" in the existing webpage, and the "lacking word" in the reference node in different modes. Different modes include, for example, different colors, sizes, and scripts of characters. By doing so, the user may easily identify the difference between the existing webpage and the reference node.

For example, as illustrated in the drawing, in a case where the word corresponding to the reference node is "wall storage brand A", "wall storage" and "brand A" are set in the title in the HTML file. In contrast, it is assumed that the title in the HTML file of the corresponding existing webpage is "special feature of brand A storage".

In this case, "brand A" and "storage" are the "words with correlation", "special feature" is the "excessive word", and "wall surface" is the "lacking word". Therefore, the display control means 84 displays "brand A" and "storage" in a different mode from that of "special feature" in the existing webpage (the former is underlined in FIG. 43A). The display control means 84 displays "brand A" and "storage" in a different mode from that of "wall surface" in the reference node (the latter is indicated in italics in FIG. 43A).

Similarly for other h1 tags and the like, it is desirable that the display control means 84 displays the "word with correlation", the "lacking word", and the "excessive word" so that they may be identified from each other.

FIG. 44 is another screen example displayed on the display by the display control means 84. This screen includes the HTML file being edited in addition to a part of the HTML files of the existing webpage and reference node. For example, the HTML file of the existing webpage is illustrated in the center of the screen, and the HTML file of the reference node is illustrated on a right side of the screen. Then, the HTML file being edited is illustrated on a left side of the screen.

In the HTML file being edited, the user may visually perform the edition work such as deleting any word from any item (for example, deleting the excessive word included in the title or h tag), or adding any word to any item (for example, adding the lacking word to the title and h tag) by the user operation from the screen in the HTML file being edited. That is, the display control means 84 modifies the existing webpage according to the user operation. Alternatively, the display control means 84 may automatically perform at least a part of the above-described edition work.

Note that, it is possible that the display control means 84 does not accept the deletion or replacement of the word included in the existing webpage. This is because the word included in the existing webpage is associated so as to represent the webpage.

According to such screen, the user may efficiently perform a work such as adding the lacking word or deleting the excessive word in the existing webpage while looking at the HTML file of the reference node.

In the sixth embodiment, it is possible to automatically generate the screen to compare the existing website structure and the appropriate website structure to display. Especially, it is not realistic to manually perform the processing illustrated in FIGS. 31 to 34 because a processing amount of 8 B is large, but according to this embodiment, such processing may be automatically performed.

In the above-described embodiment, the website to be evaluated may be automatically compared with the ideal website (reference website). This may be applied to a search algorithm of the search engine.

Figure 45:
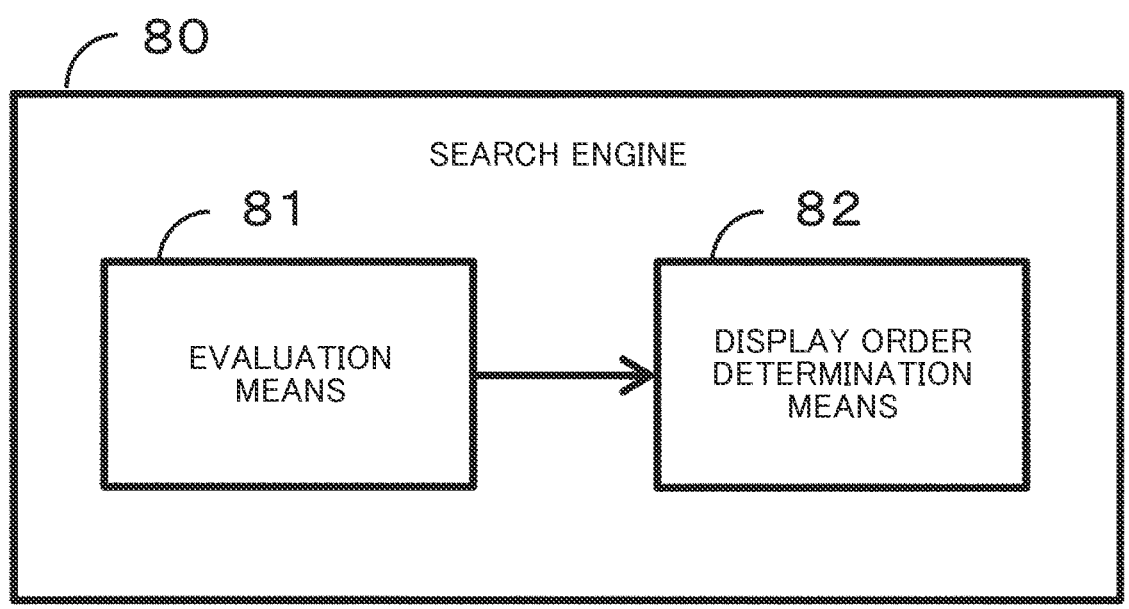
FIG. 45 is a block diagram illustrating a schematic configuration of a search engine 80.

FIG. 45 is a block diagram illustrating a schematic configuration of a search engine 80 provided with an evaluation means 81 and a display order determination means 82. Although not illustrated, the evaluation means 81 may be provided with a part or all of the functions of each means in FIG. 29. The evaluation means 81 utilizes the method described above to evaluate the existing website by comparing the same with the reference website structure. On the basis of this evaluation result, the display order determination means 82 determines the display order of the existing websites (or the display order of the webpages included in the existing website) when displaying the search result for the search query. Specifically, the closer the existing website is to the reference website structure, the higher the display order.

The evaluation result may be a value corresponding to the matching degree between the reference site structure and the existing site structure (the matching degree between the reference node included in the reference site structure and the existing webpage included in the existing site structure). For example, the existing website with more "pages with correlation" described above may have a higher evaluation value. The existing website with more "excessive pages" and "lacking pages" described above may have a lower evaluation value.

As described above, this embodiment may also be applied to the search engine.

Although the webpage (website) is described in each embodiment, similar processing may be performed in the user terminal by native application. In that case, "webpage" should be read as "screen generated by the native application". The webpage and the screen generated by the native application may be simply collectively considered as a "display screen" or a "display area".

The above-described embodiment is described for the purpose of enabling a person having ordinary knowledge in the technical field to which the present invention belongs to carry out the present invention. Various variations of the above-described embodiment may be naturally made by those skilled in the art, and the technical idea of the present invention may be applied to other embodiments. Therefore, the present invention is not limited to the described embodi-

REFERENCE SIGNS LIST

1 Search server
11 Search means
12 Search number count means
13 Advertisement control means
14 Charge means
2 Advertiser terminal
21 Input interface
22 Output interface
23 Controller
231 Information acquisition means
232 Arithmetic means
233 Output means
234 Advertisement setting means
3 Webpage providing server
31 Browsing request reception means
32 Arrangement information acquisition means
33 Content arrangement means
34 Webpage transmission means
4 Content arrangement device
41 Target content acquisition means
42 Theme setting means
43 Sub-theme setting means
44 Economic scale acquisition means
45 Arrangement information generation means
5 User terminal
51 Browsing request transmission means
52 Webpage display means
61 Target type setting field
62 Target page setting field
63 Theme setting field
64 Target content setting field
65 Sub-theme setting field
66 Economic scale setting field
67 Adjustment timing setting field
68 Preview screen
7 Website construction support device
71 Word specification means
72 Webpage creation means

The invention claimed is:

1. A non-transitory computer readable medium storing a content arrangement program which causes the computer to execute a process that allows the computer to serve as
an economic scale acquisition means that obtains, from a search server, information relating to a number of searches within a predetermined period of a search query, and an advertising fee related to advertisement display on a search result screen for the search query, the search query being associated with each first word individually corresponding to each of a plurality of contents to be arranged on a display screen, to calculate an economic scale of each content on a basis of both of the number of searches and the advertising fee, wherein the economic scale acquisition means calculates the economic scale such that the economic scale is larger as the number of the searches is larger and the advertising fee is larger, and
an arrangement information generation means that generates arrangement information indicating arrangement of each content on the display screen according to the economic scale of each content that is calculated.

2. The content arrangement program according to claim 1, wherein the economic scale acquisition means obtains information, from the search server, relating to competitiveness of the search query, and calculated the economic scale such that the economic scale is larger as the competitiveness is larger.

3. The content arrangement program according to claim 1, wherein
the economic scale acquisition means acquires the economic scale of each content on a basis of the first word and a second word commonly corresponding to the plurality of contents.

4. The content arrangement program according to claim 3, wherein
the economic scale is based on a search trend of a search query associated with the first word and the second.

5. The content arrangement program according to claim 3, that allows the computer to serve as a second word setting means that sets the second word common to the plurality of contents.

6. The content arrangement program according to claim 5, wherein
the second word setting means sets the second word on a basis of at least one of an inflow route to the display screen and information of a reader of the display screen.

7. The content arrangement program according to claim 1, that allows the computer to serve as a first word setting means that sets the first word for each of the plurality of contents.

8. The content arrangement program according to claim 1, wherein
the arrangement information generation means generates the arrangement information by determining the arrangement of each content on the display screen so that the content having a higher economic scale is arranged in a more easily viewable position on the display screen.

9. The content arrangement program according to claim 1, wherein
the arrangement information generation means displays a preview of the display screen on which each content is arranged in a position according to the arrangement information.

10. The content arrangement program according to claim 1, wherein
the arrangement information generation means displays a setting screen for setting the first word.

11. The content arrangement program according to claim 1, wherein
the display screen is a webpage or a screen generated by a native application.

12. The content arrangement program according to claim 1, wherein the arrangement information is used to arranged the content based on a setting indicating a relationship between the economic scale and a position of the content in the display screen, wherein an example of the setting is that the content whose economic scale is larger is arranged on an upper portion of the display screen.

13. The content arrangement program according to claim 1, wherein the arrangement information generating means generates the arrangement information such that
(i) the content whose economic scale is larger is arranged on an upper portion of the display screen, or
(ii) the contents are arranged in a Z-type or F-type on the display screen in an order of the economic scale.

14. The content arrangement program according to claim 1, wherein each content is a combination of one or more of a character string, a link, an image, a moving image and a table relating to the first word.

15. The content arrangement program according to claim 1, wherein
the arrangement information indicates arrangement position of each content on the display screen.

16. The content arrangement program according to claim 1, wherein
the advertising fee is a fee incurred by advertisement display itself or is a fee incurred for each click.

17. A content arrangement device comprising:
a processor which is configured to perform the operations of
an economic scale acquisition means that obtains, from a search server, information relating to a number of searches within a predetermined period of a search query, and an advertising fee related to advertisement display on a search result screen for the search query, the search query being associated with each first word individually corresponding to each of a plurality of contents to be arranged on a display screen, to calculate an economic scale of each content on a basis of both of the number of searches and the advertising fee, wherein the economic scale acquisition means calculates the economic scale such that the economic scale is larger as the number of the searches is larger and the advertising fee is larger; and
an arrangement information generation means that generates arrangement information indicating arrangement of each content on the display screen according to the economic scale of each content that is calculated.

18. The content arrangement device according to claim 17, wherein
the arrangement information indicates arrangement position of each content on the display screen.

19. The content arrangement device according to claim 17, wherein
the advertising fee is a fee incurred by advertisement display itself or is a fee incurred for each click.

20. A content arrangement method comprising:
obtaining, by a processor, from a search server, information relating to a number of searches within a predetermined period of a search query, and an advertising fee related to advertisement display on a search result screen for the search query, the search query being associated with each first word individually corresponding to each of a plurality of contents to be arranged on a display screen, to calculate an economic scale of each content on a basis of both of the number of searches and the advertising fee, wherein an economic scale acquisition means calculates the economic scale such that the economic scale is larger as the number of the searches is larger and the advertising fee is larger by an economic scale acquisition means; and
generating, by the processor, arrangement information indicating arrangement of each content on the display screen according to the economic scale of each content that is calculated by an arrangement information generation means.

21. The content arrangement method according to claim 20, wherein
the arrangement information indicates arrangement position of each content on the display screen.

22. The content arrangement method according to claim 20, wherein
the advertising fee is a fee incurred by advertisement display itself or is a fee incurred for each click.

* * * * *